(12) United States Patent
Horikoshi et al.

(10) Patent No.: US 7,744,235 B2
(45) Date of Patent: Jun. 29, 2010

(54) LIGHTING DEVICE AND LIGHT CONTROL MEMBER USED THEREFOR AND IMAGE DISPLAY DEVICE USING THE LIGHTING DEVICE AND THE LIGHT CONTROL MEMBER

(75) Inventors: Satoko Horikoshi, Ibaraki (JP); Ikuo Onishi, Ibaraki (JP); Shigeki Kikuyama, Okayama (JP); Yoshiki Mukoo, Ibaraki (JP); Tsuyoshi Kanda, Niigata (JP)

(73) Assignee: KURARAY Co., Ltd., Kurashiki-shi (JP)

( * ) Notice: Subject to any disclaimer, the term of this patent is extended or adjusted under 35 U.S.C. 154(b) by 354 days.

(21) Appl. No.: 11/994,377

(22) PCT Filed: Jun. 26, 2006

(86) PCT No.: PCT/JP2006/312698

§ 371 (c)(1),
(2), (4) Date: Dec. 31, 2007

(87) PCT Pub. No.: WO2007/000962

PCT Pub. Date: Jan. 4, 2007

(65) Prior Publication Data

US 2009/0225538 A1      Sep. 10, 2009

(30) Foreign Application Priority Data

Jun. 29, 2005 (JP) .............................. 2005-189474
Aug. 1, 2005 (JP) .............................. 2005-222824
Oct. 6, 2005 (JP) .............................. 2005-293549

(51) Int. Cl.
*G09F 13/08* (2006.01)

(52) U.S. Cl. .................. 362/97.4; 362/97.3; 362/337

(58) Field of Classification Search .................... 362/26, 362/30, 33, 97.1, 97.2, 97.4, 330, 336, 337, 362/339, 561, 608, 610, 615, 617, 618, 619, 362/620; 349/57, 62, 64, 65
See application file for complete search history.

(56) References Cited

U.S. PATENT DOCUMENTS 5,394,255 A  *  2/1995  Yokota et al. .................. 349/64
5,515,253 A  *  5/1996  Sjobom ....................... 362/244

(Continued)

FOREIGN PATENT DOCUMENTS

JP          54 155244         12/1979

(Continued)

*Primary Examiner*—Hargobind S Sawhney
(74) *Attorney, Agent, or Firm*—Oblon, Spivak, McClelland, Maier & Neustadt, L.L.P.

(57) ABSTRACT

In a lighting device, suppose a distance between centers of linear light sources is D and a distance between the linear light sources and a light control member is H and a function representing an outgoing light intensity toward a normal direction at a position coordinate X (light source position shall be X=0) and $f(X-D)+f(X)+f(X+D)$, in a range of $-D/2 \leq X \leq D/2$, a ratio between $g(X)_{min}$ and $g(X)_{max}$ is 0.6 or more, a minimum value $X_{min}$ is in a range of $-3.0D \leq X_{min} \leq -0.5D$, a maximum value $X_{max}$ is in a range of $0.5 \leq X_{max} \leq 3.0D$, and a cross-sectional shape of a given convex portion in X direction is formed of areas with $(2N+1)$ number of different gradients represented by a certain relationship obtained from D, H and X.

12 Claims, 22 Drawing Sheets

U.S. PATENT DOCUMENTS

| | | | |
|---|---|---|---|
| 7,237,930 B2 * | 7/2007 | Onishi et al. | 362/333 |
| 2003/0184993 A1 * | 10/2003 | Yamada | 362/31 |
| 2005/0002204 A1 * | 1/2005 | Lin et al. | 362/551 |

FOREIGN PATENT DOCUMENTS

| | | |
|---|---|---|
| JP | 1 169482 | 7/1989 |
| JP | 02 000017 | 1/1990 |
| JP | 10 123307 | 5/1998 |
| JP | 10 283818 | 10/1998 |
| JP | 2852424 | 11/1998 |
| JP | 2000 338895 | 12/2000 |
| JP | 2002 352611 | 12/2002 |
| JP | 3455884 | 8/2003 |
| JP | 2004006256 A * | 1/2004 |
| JP | 2004 319122 | 11/2004 |
| KR | 10-2004-0062286 A | 7/2004 |
| KR | 10-2005-0035908 A | 4/2005 |
| KR | 10-2005-0052115 A | 6/2005 |

* cited by examiner

| | EXAMPLE 29 | EXAMPLE 30 | EXAMPLE 31 | EXAMPLE 32 | EXAMPLE 33 | COMPARATIVE EXAMPLE5 | COMPARATIVE EXAMPLE6 | COMPARATIVE EXAMPLE7 | COMPARATIVE EXAMPLE8 |
|---|---|---|---|---|---|---|---|---|---|
| BASE MATERIAL | TX-800S | TX-800S | G-100C | G-100C | TX-800S | TX-800S | TX-800S | TX-800S | TX-800S |
| BASE MATERIAL REFRACTION FACTOR | 1.55 | 1.55 | 1.59 | 1.59 | 1.55 | 1.55 | 1.55 | 1.55 | 1.55 |
| LIGHT BEAM DIRECTION CONVERSION MATERIAL | MBXR-8N | MBXR-8N | SMX-8V | SMX-8V | - | MBXR-8N | MBXR-8N | - | - |
| LIGHT BEAM DIRECTION CONVERSION MATERIAL REFRACTION FACTOR | 1.49 | 1.49 | 1.55 | 1.55 | - | 1.49 | 1.49 | - | - |
| REFRACTION FACTOR DIFFERENCE (BASE MATERIAL-LIGHT BEAM DIRECTION CONVERSION MATERIAL) | 0.06 | 0.06 | 0.04 | 0.04 | - | 0.06 | 0.06 | - | - |
| ADDED AMOUNT (wt%) | 0.25 | 0.13 | 0.5 | 0.25 | - | 1.8 | 1.2 | - | - |
| $G(x)_{MIN} / G(x)_{MAX}$ | 87% | 85% | 87% | 84% | 85% | 92% | 88% | 2% | 81% |
| ARITHMETIC AVERAGE ROUGHNESS OF INCIDENT SURFACE (Ra) (µm) | 0 | 0 | 0 | 0 | 1 | 0 | 0 | 1 | 5 |
| RATIO OF LIGHT FROM LIGHT SOURCE ENTERS TO CONVEX PORTION (%) | 89 | 89 | 88 | 88 | 88 | - | - | - | - |
| RATIO OF DIRECTION CONVERSION BY LIGHT BEAM DIRECTION CONVERSION UNIT (%) | 43 | 34 | 61 | 37 | 42 | 99 | 98 | 5 | 62 |
| LUMINANCE (cd/m²) | 7190 | 7210 | 7160 | 7240 | 7010 | 5800 | 6250 | 6900 | 6200 |
| LUMINANCE NON-UNIFORMITY | N/V | M | N/V | M | M | N/V | M | V | M |
| EVALUATION | S | S | S | S | S | U | U | U | U |

LUMINANCE NON-UNIFORMITY N/V: LAMP IMAGE IS ELIMINATED, ALMOST NO OTHER LUMINANCE NON-UNIFORMITY IS VISUALLY RECOGNIZED
M: LAMP IMAGE IS MOSTLY ELIMINATED
V: CCFL IMAGE CAN BE VISUALLY RECOGNIZED

EVALUATION S: LUMINANCE 6500cd/m² OR MORE AND LUMINANCE NON-UNIFORMITY: N/V OR M
U: OTHER THAN ABOVE CONDITION

Fig. 19

LIGHTING DEVICE AND LIGHT CONTROL MEMBER USED THEREFOR AND IMAGE DISPLAY DEVICE USING THE LIGHTING DEVICE AND THE LIGHT CONTROL MEMBER

TECHNICAL FIELD

The present invention relates to a lighting device formed of a plurality of linear light sources and an image display device using thereof, and especially to a lighting device and an image display device suitably used for a lighting signboard device and a liquid crystal display etc. which are required to be large size with high luminance and luminance uniformity.

BACKGROUND ART

Taking a lighting device for an image display devices an example, there is an edge light type in which light from a light source provided to a side edge of a light guide plate is guided toward the front direction and uniformized by a diffusion sheet and a direct type in which a light source is provided to the backside of an illuminated surface and light is uniformized by a light diffusion plate.

The direct type tends to be thicker as the light source is provided to the backside of a device, thus in the fields of requiring thinness such as cellular phone and mobile personal computer, the edge light type has been the mainstream, which is advantageous by having a light source provided to the side edge.

On the other hand, the request has been increasing for larger size and higher luminance of a display centering on the market of television and personal computer monitor etc. Especially along with the larger size of a display, in the abovementioned edge light type, as the rate of the length of a periphery part where a light source can be placed to a display area decreases and the amount of light runs short, sufficient luminance cannot be obtained.

Therefore, there is a method suggested to place a plurality of films for improving luminance over a surface light source to improve light utilization efficiency (see for example Patent Document 1).

However, as the luminance improvement film leads to an increase in cost and the number of films to use, it is not necessarily advantageous in terms of productivity and thinner device. Moreover, in the edge light type, there is also a problem that the weight of the light guide plate increases along with the larger size of a display. As described above, it has become difficult for the edge light type to meet the request in the market of recent years such as larger size and higher luminance of displays.

Thus, the direct type using a plurality of light sources is attracting attention. FIG. 15 shows an example of a lighting device of this style. In this example, a lighting device has a rectangle emission surface formed of X direction and Y direction, which is vertical to the X direction, includes a plurality of linear light sources 1, a light diffusion plate 5 and a reflective plate 4. The linear light sources 1 are placed in one virtual flat surface which is parallel to the X direction and the Y direction and the linear light sources in the longitudinal direction are placed in parallel to the Y direction and also placed at a regular interval along with the X direction. The light diffusion plate 5 is placed to the emission surface side of the arranged linear light sources 1 and the principal surface is parallel to the virtual flat surface where the linear light sources 1 are arranged. The reflective plate 4 is positioned to the opposite side of the light diffusion plate across the arranged linear light sources 1 and the principal surface of the reflective plate 4 is parallel to the virtual flat surface where the linear light sources are arranged. Moreover, usually the light diffusion plate 5 is uniformly dispersed with a light diffusion material and has uniform optical performance in the principal surface.

The rectangular emission surface is the most common in many usages of this lighting device such as an image display device and a lighting signboard. In this direct type, the light utilization efficiency of light emitted from a light source, which is the ratio of luminous flux emitted from a light emitting surface to luminous flux emitted from the light source, is high and also the number of light sources can be increased freely. That is, as the amount of light can be increased freely, requested high luminance is obtained easily and there is no decrease in luminance and luminance uniformity caused by larger size. Furthermore, since the light guide plate for turning light to the front becomes unnecessary, the weight can be reduced.

Moreover, as it is easy to eliminate luminance non-uniformity with linear light source than point light source and it is also easy as the wiring is short, the linear light source is the most common for a light source of these lighting devices. Cold cathode tube etc. is often used as a linear light source. Furthermore, although it is advantageous to use the same type of linear light sources for production and for uniformizing luminance, in this case, it is desirable to arrange the linear light sources in the direction parallel to the long side of the rectangle shape of the emission surface as the number of the linear light sources can be reduced. Moreover, by placing the linear light sources at a regular interval in the same flat surface, the problematic luminance non-uniformity becomes periodical along with the arrangement of the linear light sources and it becomes easy to eliminate luminance non-uniformity in the light diffusion plate having uniform optical performance in the principal surface. Although the reflective plate is not necessary, it is advantageous in terms of improving light utilization efficiency as it has a function to reflect light emitted from the linear light sources and the light diffusion plate in the opposite direction to the emission direction and use it again as emitting light.

Moreover, in this direct type, since the light utilization efficiency emitted from a light source, which is the ratio of luminous flux emitted from an emission surface to the luminous flux emitted from a light source, is high and also the number of light sources can be increased freely, the high luminance requested is obtained easily. Furthermore, since the light guide plate for turning light to the front is unnecessary, the weight can be reduced.

Moreover, in a lighting signboard as an example of other lighting devices, the direct type using a plurality of light sources is the mainstream because the configuration is simple and high luminance can be easily obtained without using the film or the like for improving luminance.

As a typical configuration example of such lighting device of direct type, there is a known configuration in which one direction is made to be the front direction, which is the main outgoing light direction, where the direction is parallel to Z direction vertical to XY flat surface, which is parallel to X direction and Y direction and the Y direction is vertical to the X direction. At least a plurality of light sources, a reflective plate and a light diffusion plate for transmitting light from the light sources and the reflective plate to the outgoing light side are included. The reflective plate, the light sources and the light diffusion plates are placed along the Z direction to the outgoing light side in order of the reflection plate, the light sources and the light diffusion plate. The light sources are arranged regularly in one virtual flat surface which is parallel to the XY flat surface and the periphery of the principal surfaces of the reflective plate and the light diffusion plate are rectangle shapes parallel to the XY flat surface. With this configuration, the diffusion plate has a function to eliminate luminance non-uniformity of the linear light sources and the reflective plate has a function to return light traveling to the opposite direction to the target outgoing light direction back to the reflective plate by the outgoing light side.

As the light sources for this lighting device, linear light sources are often used, which have less luminance non-uniformity, less light source points and are easy to wire as compared to point light sources such as LED. The linear light sources are arranged at a regular interval in parallel and also along the X direction or the Y direction.

However, in the direct type, unique problems such as elimination of a lamp image, thinner shape and energy saving must be solved. Especially for usages to observe an illuminated surface such as an image display device and a lighting signboard, the luminance uniformity in the surface is required, not only the elimination of a lamp image. Furthermore, for usages to observe an illuminated surface mainly from the front direction such as television and personal computer monitor etc., the uniformity of the front luminance in the surface is the most important. Since the lamp image appears as luminance non-uniformity far more remarkable than in the edge light type, it is difficult to eliminate it by the means such as a diffusion film which is coated with a light diffusion material to the film surface used in the edge light type in related arts. Furthermore, reduction in the number of light sources, higher luminance and control of view angle characteristics, etc. are requested and it has been an issue of how to effectively utilize the light of the light sources.

Therefore, a light diffusion plate dispersed with a light diffusion material is widely used to a base material resin and a light diffusion plate is provided to the front surface side of a light source having a reflective plate placed to the backside. An example of the direct style display device using a light diffusion plate is already explained with reference to FIG. 15. In order to achieve favorable diffusibility and light utilization efficiency, to the base material resin such as methacrylate type resin, polycarbonate type resin, styrene type resin and vinyl chloride type resin, there are various light diffusion materials such as inorganic particulates and bridged organic particulates under consideration (for example see Patent Document 2). However, the method to use the light diffusion material is not preferable from the aspect of energy saving due to absorption of light into the light diffusion material and diffusion of light in unnecessary direction. Moreover, although a lamp image can be reduced by placing many light sources closely, there is a problem of power consumption increase.

Therefore, the method of improving front luminance using the luminance improvement films is used as in the edge light type. These films collect outgoing light toward the front direction and increase the front luminance usually requested as a lighting device so as to increase the light utilization efficiency. The front luminance can be further improved by combining a plurality of luminance improvement films and light in each direction of the X direction and the Y direction for example can be collected by placing them with different angles. However as with the edge light type, it is not necessarily advantageous in terms of productivity and thinner shape as it leads to an increase in cost and the number of films to use.

On the other hand, there is a method suggested to give a unique reflective plate shape for eliminating a lamp image (for example see Patent Document 3). However, it is not preferable because it requires to align the shape of the reflective plate with light sources and it may prevent from reducing the thickness due to the shape of the reflective plate.

Furthermore, there are methods suggested such as the method to provide a reflective member opposite to light sources (for example see Patent Document 4) and the method to provide a light beam direction conversion device like a Fresnel lens, for example, to every light source (see for example Patent Document 5). However there is a problem generated such as deterioration in productivity as an accurate alignment between the member and the light sources is required.

Moreover, a light diffusion plate with concave-convex surface is suggested (for example see Patent Document 6). Since these light diffusion plates can achieve desired diffusibility while avoiding to use or reduce light diffusion material, the light utilization efficiency can be improved. However, as there is no detailed investigation for concave-convex shape, precise adjustment of luminance non-uniformity is difficult. Likewise, it is difficult to obtain uniformity of front luminance within the emission surface.

Furthermore, there is a method suggested to give an unique shape to a reflective plate which is parallel to linear light sources so as to eliminate a lamp image (see for example Patent Document 7). However, in this case, an accurate alignment between the shape of the reflective plate and the linear light source is required. This not only causes to reduce production efficiency due to the alignment but requires to change the shape of the reflective plate if the light source arrangement differs due to a design change and a difference in specification. Moreover, the method to increase productivity by cutting out a desired shape from a large-sized shaping sheet is also not preferable as it leads to limit cutting position and a decrease in yield.

Further, a prism sheet with a small loss in the amount of light is suggested (see for example Patent Document 8). A large number of convex portions whose cross-sections are triangular or ridge shapes and continuously extending in one direction are formed to the both sides of the sheet. However, since these prism sheets aim to reduce the loss in the amount of light by turning diffused light to the front, a lamp image generated in the direct type cannot be eliminated.

In a large-sized lighting device, the request for thinner shape is not severe as compared to cellular phones and mobile personal computers etc., thus it is possible deal with it by shortening the distance between light sources and a light diffusion plate and reducing the number of optical films or the like. Moreover, it is necessary to increase the light utilization efficiency in order to realize energy saving. Although in the direct type, it is easy to increase the number of linear light sources as described above to achieve high luminance, reduction in the light utilization efficiency by using a large amount of light diffusion material for eliminating a lamp image must be suppressed in terms of energy saving.

The light diffusion plate in related arts is a simple light diffusion style in which light diffusion material particulates are kneaded in a transparent base material resin by extrusion method or injection molding process, and for the optical performance, luminance non-uniformity (transmitted afterimage of the light source) is practical usage level but there is a problem that it is difficult to control view angle. Moreover, it is necessary to consider the formation condition in order to prevent dispersion failure of the light diffusion material particulates, thus it has been difficult to increase productivity consequently.

[Patent Document 1] Japanese Unexamined Patent Application Publication No. 2-17

[Patent Document 2] Japanese Unexamined Patent Application Publication No. 54-155244

[Patent Document 3] Japanese Patent No. 2852424

[Patent Document 4] Japanese Unexamined Patent Application Publication No. 2000-338895

[Patent Document 5] Japanese Unexamined Patent Application Publication No. 2002-352611

[Patent Document 6] Japanese Unexamined Patent Application Publication No. 10-123307

[Patent Document 7] Japanese Unexamined Patent Application Publication No. 1-169482

[Patent Document 8] Japanese Patent No. 3455884

DISCLOSURE OF THE INVENTION

Problems to be Solved by the Invention

Therefore, the present invention aims to provide a lighting device, which has high luminance and light utilization efficiency, is easy to respond to an increase in size as there is no change in optical design of a light control member, decrease in luminance and expansion of luminance non-uniformity associated with the increase in size and is advantageous in terms of productivity and thinner shape as luminance non-uniformity in front direction is eliminated without precise alignment between light sources and other members, the light source and the other members are placed closer and film configuration is simplified, and an image display device using thereof. Moreover, another aim is to provide a lighting device with high front luminance according to its purpose, a light control member included in the lighting device and an image display device using the lighting device.

Means for Solving the Problems

Therefore, the inventors have found out that the above problems can be solved by replacing the light diffusion plate of the general direct type lighting device as illustrated in FIG. 15 with a light control member that we suggest. For the above problems, the present invention realizes to avoid or largely reduce using a light diffusion material by providing convex portions of a preferable shape to an emission surface of the light control member and accomplishes higher luminance by improving light utilization efficiency. Moreover, by giving uniform characteristics to control an outgoing light direction of incident light in all the points over an incident surface of the light control member, it is not only advantageous to size change, but the alignment with light sources becomes unnecessary. Furthermore, by making the distribution of outgoing light intensity toward the front direction constant, luminance non-uniformity in the front direction can be eliminated. Further, by compound functions such as elimination of luminance non-uniformity and luminance improvement in the light control member, usage of other functional optical film can be eliminated or reduced, thus it is advantageous for productivity and thinner shape. Furthermore, it is also possible to increase front intensity by increasing outgoing light ratio toward the front direction of the light control member. In addition, an image display device can be obtained by placing a transmissive display device to the emission side of these lighting devices. The front direction here means a small solid angle centering on the normal direction of the principal surface of the light control member.

Accordingly, the present invention to solve the abovementioned issues includes a rectangular emission surface formed of a X direction and a Y direction, where the Y direction being vertical to the X direction and a reflective plate, a plurality of linear light sources and a plate shape light control member. The reflective plate is placed in parallel to the X direction and the Y direction, the linear light sources are placed in one virtual flat surface, the virtual flat surface being in parallel to the X direction and the Y direction by the emission surface side of the reflective plate, the linear light sources in a longitudinal direction are parallel to the Y direction and also arranged at a regular interval along the X direction, the light control member is placed by the emission surface side of the arranged linear light sources and a principal surface is parallel to the virtual flat surface where the linear light sources are arranged, the principal surface of the light control member is formed of an incident surface opposite to the linear light sources for receiving light from the linear light sources and an emission surface for outputting light received to the incident surface, the emission surface has a plurality of ridge form convex portions to a surface thereof, a ridge form ridgeline of a top part of the convex portions is formed in parallel to the Y direction and also arranged along the X direction, with a distance between centers of the linear light sources being D, a distance between a center of any of the linear light sources and the light control member being H and a function representing an outgoing light intensity of light entered from one linear light source to the light control member to a normal direction of the emission surface at a position coordinate X (light source position shall be X=0) in the X direction being f(X), $$g(X)=f(X-D)+f(X)+f(X+D) \quad (1),$$

in a range of $-D/2 \leqq X \leqq D/2$, a ratio $g(X)_{min}/g(X)_{max}$ between $g(X)_{min}$ and $g(X)_{max}$ is 0.6 or more, $g(X)_{min}$ being the minimum value of $g(X)$ and $g(X)_{max}$ being the maximum value of $g(X)$, $X_{min}$, a minimum value of X, is in a range of $-3.0 D \leqq X_{min} \leqq -0.5 D$, $X_{max}$, a maximum value of X, is in a range of $0.5 \leqq X_{max} \leqq 3.0 D$ (where $X_{min}$ and $X_{max}$ are coordinates of both ends when a value of f(X) declines centering near one linear light source in which the value of f(X) is X=0 and becomes practically 0) and a cross-sectional shape of a given convex portion in the X direction is formed of areas $-N$ to $N$ with $(2N+1)$ number of different gradients represented by following formulas:

$$\delta=(X_{max}-X_{min})/(2N+1) \quad (2)$$

$$X_i=i \times \delta \quad (3)$$

$$\alpha_i=\text{Tan}^{-1}(X_i/H) \quad (4)$$

$$\beta_i=\text{Sin}^{-1}((1/n_2)\sin \alpha_i) \quad (5)$$

$$\gamma_i=\text{Sin}^{-1}((1/n_2)\sin \alpha_i) \quad (6)$$

$$a_i \propto f(X_i+T \cdot \tan \gamma_i) \cdot \cos \Phi_i \cdot \cos \beta_i / \cos \beta_i / \cos(\Phi_i-\beta_i) \quad (7)$$

$$\Phi_i=\text{Tan}^{-1}((n \cdot \sin \beta_i)/(n \cdot \cos \beta_i - 1)) \quad (8)$$

where
N: Natural number
i: Integer from $-N$ to $N$
n: Refractive index of a convex portion of the light control member
$n_2$: Refractive index of a base material of the light control member $a_i$: Width of an area i in the X direction $\Phi_i$: A gradient of a slope to an emission surface of the area i T: Thickness from the incident surface to a bottom part of a convex portion of the light control member.

Further, the present invention is the abovementioned lighting device and a lighting device which is characterized that the areas −N to N indicating cross-sectional shapes of the convex portions in the X direction are aligned in order of position coordinate of a X axis. Furthermore, the cross-sectional shape of the convex portion in the X direction is a shape made by approximating shapes of at least one pair of adjacent two areas among the areas with (2N+1) number of different gradients forming the convex portion to a curve. Moreover, in a cross-section parallel to the X direction and a normal direction of the principal surface of a light control member, a ratio of light output in a range of 30 degrees from a normal direction of the emission surface is 50% or more of all outgoing light.

Furthermore, the present invention is the abovementioned lighting device and a lighting device characterized that the convex portions are formed of a material with a refractive index of 1.58 or more, an angle made by a trough part of the convex portions to the principal surface of the light control member can be made small and this enables to solve issues of a decrease in detachability of resin at the time of manufacturing and a decrease in mass productivity.

Moreover, the present invention is a light control member included in the abovementioned lighting device. Further, the present invention is an image display device characterized by providing a transmissive display device by the emission surface side of the abovementioned lighting device.

The means provided by the present invention is explained hereinafter in detail.

The lighting device provided in the present invention is a lighting device having a rectangle emission surface formed of X direction and Y direction, which is vertical to the X direction. The lighting device includes a reflective plate, a plurality of linear light sources and a plate shape light control member. The reflective plate plays a role to receive light from the linear light sources, lets it enter to the light control member as diffused light, receives the reflected light again from the light control member and lets it again enter to the light control member as diffused light. Moreover, this light control member is a member for eliminating luminance non-uniformity in the front direction. It is preferable because with the plate shape, the device can be thinner and at the same time ensures an appropriate machinery strength. If distribution of the outgoing light intensity is almost constant, luminance non-uniformity can be eliminated and the uniformity of luminance can be obtained. In the lighting device in which the linear light source are arranged as mentioned above, distribution of the outgoing light intensity is total of the distribution of the outgoing light intensity for each linear light source. If distribution is almost constant in a given position by the observed surface side, luminance non-uniformity is eliminated.

The lighting device of the present invention eliminates luminance non-uniformity in the front direction by making the distribution of outgoing light intensity toward the front direction almost constant.

The lighting device according to the present invention is the abovementioned lighting device, where the reflective plate is placed in parallel to the X direction and the Y direction, the linear light sources are placed in one virtual flat surface which is parallel to the X direction and the Y direction of the emission surface side of the reflective plate, and also the linear light sources are placed so that the longitudinal direction is parallel to the Y direction and arranged at a regular interval along the X direction. The light control member is placed to the emission surface side of the arranged linear light sources and also the principal surface is parallel to the virtual flat surface where the linear light sources are arranged.

Since the distance from the linear light sources to the light control member is uniform because the principal surface is parallel to the virtual flat surface where the linear light sources are placed, distribution of incoming light intensity of each linear light source to the light control member becomes equal. Thus it is easy to eliminate luminance non-uniformity as distribution of the entire incoming light intensity becomes periodical distribution according to the position of the linear light sources along the X direction, which is the arrangement direction of the linear light sources.

The principal surface of the light control member is formed of an incident surface which is placed opposite to the linear light sources and receives light from the linear light sources and an emission surface which outputs the light received to the incident surface.

The emission surface has a plurality of ridge form convex portions to its surface. The ridge form ridgeline which is the top part of the convex portions is formed in parallel to the Y direction and also arranged along the X direction. Moreover, a gradient $\Phi_i$ of an area i of the convex portions which is an important element to determine the shape of the convex portions in a distribution f(X) of the outgoing light intensity to a desirable front direction and a width $a_i$ in the X direction occupied by this are selected based on the configuration such as the arrangement of the linear light sources and refractive index of the light control member. The convex portions play a role to control light from the linear light sources and make the distribution of the outgoing light intensity in the front direction of emission light constant.

The ridge form ridgeline which is the top part of the convex portions is placed to be in parallel to the Y direction, meaning that the convex portions are positioned in parallel to each other and the incident surface, which is the principal surface of the light control member, and the emission surface is placed in parallel to the virtual flat surface where the linear light sources are placed. Thus light from the linear light sources is efficiently received to the principal surface and this enables direction control of light in the X direction where luminance non-uniformity is remarkable. In the direct style lighting device, while luminance non-uniformity is the most remarkable in the X direction which is vertical to the longitudinal direction of the linear light sources, by making the shape of the convex portions of the light control member preferable in the lighting device of the present invention, it is characterized that distribution of the outgoing light intensity toward the front direction is made constant so as to eliminate luminance non-uniformity in the front direction. This capability is the highest in the direction where the width of the convex portions becomes minimum, therefore by providing the ridge form ridgeline which is the top part of the convex portions in parallel to the linear light sources, specifically in parallel to the Y direction, the luminance non-uniformity can be efficiently eliminated. Accordingly, it is possible to greatly reduce or avoid using a diffusion material, which causes to reduce light utilization efficiency.

Moreover, by arranging similar shaped convex portions in parallel, optical property of the light control member becomes uniform. Thus it eliminates the need for an alignment and enables to quickly respond to a change in display size, the number of linear light sources and the arrangement, thereby enabling to manufacture a lighting device with high productivity. Therefore, any position of a large-sized plate shape molded product provided with desired convex portions which is prepared by a large-sized extrusion molding device for example, can be cut out to any size to be the light control member. Thus it is not only advantageous for production but also enables to easily respond to a size change of a lighting device.

Light from the linear light sources and the light from the linear light sources reflected to the reflective plate as diffused light enters to the incident surface of the light control member. Among these, as for the light entered to the light control member from the linear light sources, the distance between centers of the linear light sources shall be D and the distance between the center of a given linear light source and the light control member shall be H. At this time, the function expressing the position coordinate X in the X direction and outgoing light intensity in the normal direction of the emission surface, which is the front direction, where the light source position is X=0 shall be f(X).

Suppose that $g(X)=f(X-D)+f(X)+f(X+D)$  (1)

in the range of $-D/2 \leq X \leq D/2$, it is characterized that the ratio $g(X)_{min}/g(X)_{max}$ between $g(x)_{min}$, which is the minimum value of $g(X)$, and $g(x)_{max}$, which is the maximum value, is 0.6 or more.

In the lighting device of the present invention, same linear light sources are used for each linear light source. Therefore, the function $g(X)$ is the total of three adjacent linear light sources $f(X)$. The range of $-D/2 \leq X \leq D/2$ is a range between the central linear light source and each middle point of adjacent linear light sources. When $g(X)$ regarding given three adjacent linear light sources satisfies the abovementioned condition, the luminance non-uniformity in the front direction can be eliminated in the entire surface.

Light is received under the same condition for each cycle of the linear light sources and also the light control member performs the same outgoing light direction control for the light entered to a given point over the incident surface, thus by controlling the distribution of the outgoing light intensity in the range of $-D/2 \leq X \leq D/2$, which is one cycle, the distribution of the entire outgoing light intensity can be controlled. Moreover, as already mentioned, the distribution of the outgoing light intensity is a total of the distribution of the outgoing light intensity for each linear light source, and if the distribution is almost constant in a given position by the observed surface side, luminance non-uniformity is eliminated. The lighting device of the present invention eliminates luminance non-uniformity in the front direction by making the distribution of the outgoing light intensity in the front direction almost constant.

As the intensity of the light of the linear light sources is in inverse proportion to the distance, the influence of the light from the linear light sources is small. Therefore, by making the function $g(x)$ which considers only the outgoing light intensity from three adjacent linear light sources to be in an appropriate range, the distribution of the outgoing light intensity in the front direction can be controlled and the luminance non-uniformity in the front direction can be eliminated. By making the ratio $g(X)_{min}/g(X)_{max}$ between $g(x)_{min}$, which is the minimum value of $g(X)$, and $g(x)_{max}$, which is the maximum value to be in the range of 0.6 or more, with the effect of the reflective plate, the distribution of the actual outgoing light intensity becomes further uniform and the total of the distribution of the outgoing light intensity in the front direction of each linear light source becomes almost constant in a given position by the observed surface side, thus enabling to eliminate the luminance non-uniformity in the front direction.

FIG. 9 shows f(X) and g(X) of the lighting device according the present invention in which the linear light sources are arranged with D=30 mm, which is shown for f(X) in FIG. 7. The position coordinate in the X direction of the linear light source located in the center is set to 0, and distance (mm) in the X direction is set to be X coordinate.

Furthermore, the inventors have found out about the shape of the convex portions for making almost uniform distribution of the outgoing light intensity toward the front direction. Accordingly, in the present invention, it is characterized that the minimum value of X, $X_{min}$, is in the range of $-3.0 D \leq X_{min} \leq -0.5 D$, the maximum value $X_{max}$ is in the range of $0.5 D \leq X_{max} \leq 3.0 D$ and the cross-sectional shape in the X direction of a given convex portion is formed of areas $-N$ to $N$ with $(2N)+1$ number of different gradients represented by the following formulas (2) to (8). Among these areas, the area 0 has a gradient 0, which is parallel to the incident surface, and is able to efficiently emit light entered directly beneath toward the front direction.

$\delta = (X_{max} - X_{min})/(2N+1)$  (2)

$X_i = i \times \delta$  (3)

$\alpha_i = \text{Tan}^{-1}(X_i/H)$  (4)

$\beta_i = \text{Sin}^{-1}((1/n)\sin \alpha_i)$  (5)

$\gamma_i = \text{Sin}^{-1}((1/n_2)\sin \alpha_i)$  (6)

$a_i \propto f(X_i + T \cdot \tan \gamma_i) \cdot \cos \Phi_i \cdot \cos \beta_i / \cos \alpha_i / \cos(\Phi_i - \beta_i)$  (7)

$\Phi_i = \text{Tan}^{-1}((n \cdot \sin \beta_i)/(n \cdot \cos \beta_i - 1))$  (8)

N: Natural number i: Integer from $-N$ to $N$ n: Refractive index of a convex portion of a light control member $n_2$: Refractive index of a base material of the light control member $a_i$: Width of area i in X direction $\Phi_i$: Gradient of a slope to an emission surface of the area i T: Thickness from incident surface to a bottom part of a convex portion of the light control member Here, the angles such as such as $\alpha$, $\beta$, $\gamma$ and $\Phi$ have an absolute value of less than 90 degrees and angles of clockwise direction from the reference line shall be positive and angles of counterclockwise direction shall be negative.

Firstly, the formula (7) is explained with reference to FIG. 4.

$X_{min}$ and $X_{max}$ are coordinates of both ends when the value of f(X) declines centering near one linear light source in which the value of f(X) is X=0 and becomes practically 0. When evenly dividing between $X_{min}$ to $X_{max}$ into $(2N+1)$, a width $\delta$ of each divided element is represented by the formula (2). At this time, a center coordinate $X_i$ of a given element can be represented by the formula (3). An incident angle from the linear light source at the position of X=0 to the incident surface of the light control member of coordinate $X_i$ is an angle $\alpha_i$ represented by the formula (4) to the normal direction.

Here, light is refracted and travels inside the light control member at the angle $\gamma_i$ represented by the formula (4) to the normal direction. When the light reaches to the bottom part of the convex portions, it is refracted again, travels inside the light control member at the angle $\beta_i$ represented by the formula (5) and enters to the convex portions 3. Here, refractive index of the convex portions of the light control member and that of the base material where the convex portions are provided may be the same, and in this case no refraction occurs in the bottom part of the convex portions and becomes $\beta_i = \gamma_i$. Then, only the light that reached to the slope with the gradient $\Phi_i$ to the emission surface represented by the formula (8) travels toward the front direction.

Suppose that the length of the slope of the area i occupied by the slope with the angle $\Phi_i$ is $b_i$ and the length of the projection from the slope of the area i to the direction vertical to the light beam direction inside the convex portions of the light control member is $e_i$, the angle $\xi_i$ made by the angle of the slope of the area i in a cross-section which is parallel to the X direction and the normal direction of the principal surface of the light control member to an angle vertical to a light beam direction inside the convex portions of the light control member is $(\Phi_i - \beta_i)$, thus it is;

$$e_i = b_i \cdot \cos(\Phi_i - \beta_i) \tag{9}$$

Here, the length of the projection to the surface which is parallel to the incident surface of the area i occupied by the slope with the angle $\Phi_i$, that is the width in the X direction of the area i, shall be $a_i$, it is;

$$b_i = a_i / \cos \Phi_i \tag{10}$$

From the formula (9) and the formula (10)

$$e_i = a_i / \cos \Phi_i \cdot \cos(\Phi_i - \beta_i) \tag{11}$$

Here, as shown in FIG. 17, suppose that the width of the convex portion in the X direction, which is the total of $a_i$, is P, the ratio of light traveling to the area i among light 9 which enters the light control member 2 at the angle $\alpha_i$, transmits inside the light control member and travels to the convex portion 3 is $e_i/(P \cdot \cos \beta_i)$.

On the other hand, the intensity of the light per unit area which enters to the light control member at the angle $\alpha_i$, that is illuminance, is proportional to $\cos^2 \alpha_i$, as described later in detail.

Moreover, as shown in FIG. 18, the angle $\Delta \alpha_i$ which assumes the diameter of the light source in the point of coordinate $X_i$ is proportional to $\cos \alpha_i$. Therefore, the intensity of the light per unit area and unit angle which enters to the coordinate $X_i$ is proportional to $\cos^2 \alpha_i / \Delta \alpha_i$, and thereby is proportional to $\cos^2 \alpha_i / \cos \alpha_i$, which is $\cos \alpha_i$. Accordingly, for the intensity per unit angle of light from the linear light sources entered to a unit convex portion at a point of $X=0$, the ratio of the intensity per unit angle of light entered to a unit convex portion at a point of coordinate $X=X_i$ is $\cos \alpha_i$. Therefore, the light output to the front is $\cos \alpha_i \cdot e_i/(P \cdot \cos \beta_i)$, and from the formula (11), $$a_i / \cos \Phi_i \cdot \cos(\Phi_i - \beta_i) \cdot \cos \alpha_i / (P \cdot \cos \beta_i).$$

When the thickness of the light control member 2 is T, light entered to the coordinate $X_i$ is emitted to the coordinate $(X_i + T \cdot \tan \gamma_i)$, thus the outgoing light intensity toward the front direction at that time is $(X_i + T \cdot \tan \gamma_i)$ Furthermore, as the emitting light intensity toward the front direction is proportional to emitting light intensity of the linear light sources and emission ratio toward the front direction, according to;

$$f(X_i + T \cdot \tan \gamma_i) \propto a_i / \cos \Phi_i \cdot \cos(\Phi_i - \beta_i) \cdot \cos \alpha_i / (P \cdot \cos \beta_i) \tag{12}$$

it is;

$$a_i \partial P \cdot f(X_i + T \cdot \tan \gamma_i) \cdot \cos \Phi_i \cdot \cos \beta_i / \cos \alpha_i / \cos(\Phi_i - \beta_i) \tag{13}$$

Suppose that the width of the convex portion 3 is P, the total of $a_i$ is the width P of the convex portion,

[Equation 1]

$$\sum_{i=-N}^{N} a_i = P \tag{14}$$

As P is the convex portion width and is a constant, $$a_1 \propto f(X_i + T \cdot \tan \gamma_i) \cdot \cos \Phi_i \cdot \cos \beta_i / \cos \alpha_i / \cos(\Phi_i - \beta_i) \tag{7}$$

The convex portion has a shape formed of the area i with the width $a_i$ that satisfies the relationship of the (formula 7). As is well known, since proportional magnification optical type shows almost the same directional characteristics, the pitch of the convex portions can be selected freely.

Here, the relationship between the incident degree to the light control member and the incident intensity is described with reference to FIG. 5.

When considering a small angle $\Delta \theta$ centering on the incident angle $\theta$ from the linear light source to the light control member, if the $\Delta \theta$ is small enough, the following formulas (15), (16) and (17) are satisfied.

$$U = H' \cdot \Delta \theta \tag{15}$$

$$H' = H / \cos \theta \tag{16}$$

$$V = U / \cos \theta \tag{17}$$

Therefore, $$V = H \cdot \Delta \theta / \cos^2 \theta \tag{18}$$

Accordingly, since V is in inverse proportion to $\cos^2 \theta$, if the intensity of emitting light in $\Delta \theta$ from the linear light source is constant regardless of $\theta$, the intensity of incident light per unit area to the light control member, which is illuminance, is proportional to $\cos^2 \theta$.

Next, the formula (8) is explained.

FIG. 6 shows the principle for turning light to the front by the lighting device of the present invention.

Incident light 7 which enters to the light control member 2 with refractive index n at an angle $\alpha$ from the linear light source is refracted at an incident surface 6 of the light control member, transmits inside the light control member, and this light 9 is refracted at the convex portion 3 by the emission surface side and emitted to the observed surface side. However emitting light 8 is output toward the front direction if the gradient is a desired angle $\Phi$ in the convex portion 3. In the present invention, by adjusting the ratio of the angle $\Phi$ so that the outgoing light intensity toward the front direction becomes constant with a consideration over the distribution of $\alpha$ based on the arrangement and the intensity of the incident light 7, it is possible to adjust the outgoing light intensity toward the front direction.

The gradient $\Phi$ of the convex portion 3 of the emission surface for turning the incident light 7 to the front is determined by the refractive index of the light control member 2 and the incident angle of light to the light control member 2.

The angle in which light enters to the incident surface 6 to the normal of the incident surface 6 shall be α, the angle made by light which is refracted at the incident surface 6 and passes the convex portion 3 part inside the light control member to the normal of the incident surface 6 shall be β, the angle made by light traveling inside the light control member to the normal of the slope by the emission side shall be ε, the angle made by light refracted at the slope by the emission side and emitted to the observed surface side to the normal of the slope of light shall be ω and the refractive index of the light control member shall be n. At this time, the angle of the slope of the convex portion in which light output from the emission surface travels toward the front direction, which is the normal direction of the incident surface shall be Φ.

The following relationship is satisfied at this time.

$$B = \sin^{-1}(1/n \cdot \sin \alpha) \qquad (5)$$

$$\Phi = \beta - \epsilon \qquad (19)$$

$$-n \cdot \sin \epsilon = -\sin \omega = \sin \Phi (\omega = -\Phi) \qquad (20)$$

From the formula (19) and the formula (20), $$-n \cdot \sin(\beta - \Phi) = \sin \Phi \qquad (21)$$

$$-n \cdot \{\sin \Phi \cdot \cos \beta - \cos \Phi \cdot \sin \beta\} = \sin \Phi \qquad (21)'$$

When dividing both sides of the formula (21)', it is cos Φ

(sin Φ/cos Φ=tan Φ)

$$-n\{\tan \Phi \cdot \cos \beta - \sin \beta\} = \tan \Phi \qquad (21)''$$

Then Φ can be expressed as follows;

$$\Phi = \tan^{-1}(n \cdot \sin \beta)/(n \cdot \cos \beta - 1) \qquad (21)'''$$

From the formula (5)' and the formula (21)'''

$$\Phi = \tan^{-1}(\sin \alpha/(n \cdot \cos(\sin^{-1}((1/n)\sin \alpha)) - 1)) \qquad (21)''''$$

The relationship of α, n and Φ will be as indicated above, and with the refractive index n of the light control member 2 and the gradient Φ of the convex portion 3, light with a desired incident angle α can be emitted toward the front direction. According to the formula (21)''', it can be explained that light entered to the incident surface at the angle $\alpha_i$ can be emitted toward the front direction from the area i of the convex portion by the gradient $\Phi_i$ of each area of the convex portion satisfying the formula (8).

As described above, in the distribution f(X) of outgoing light intensity to a desired front direction, the gradient $\Phi_i$ of the area i of the convex portion and the width $a_i$ occupied by this in the X direction can be selected based on the configurations such as the arrangement of the linear light sources and the refractive index of the light control member.

Furthermore, the lighting device according to the present invention is the abovementioned lighting device, and is a lighting device characterized by areas −N to N, which represent cross-sectional shapes of the convex portion in the X direction and are placed in order of X coordinate. Then, as the areas −N to N, which represent cross-sectional shapes of the convex portion in the X direction, being placed in order of X coordinate, it is possible to provide a lighting device which is easy to control the emission direction of light and to shape, which is advantageous for production.

At this time, the cross-sectional shape of the unit convex portion has no inflection point and the entire convex portion is formed to be almost convex shape. With many inflection points, before reaching to an area over a desired convex portion, light may reach to an area over a different convex portion and the direction of light beam changes by reflection and refraction. Thus it may be difficult to control the emission direction of light. Moreover, since the shape without inflection point is simpler than the shape with inflection points, it is easier to shape and advantageous for production.

Furthermore, the lighting device according to the present invention is the abovementioned lighting device and a lighting device which is characterized that the cross-sectional shape of the convex portion in the X direction is a shape made by approximating shapes of at least one pair of adjacent two areas among areas with different (2N+1) number of gradients forming the convex portion to a curve. The convex portion in the configuration of the above-mentioned lighting device is formed of a slope with (2N+1) number of angles $\Phi_i$ and shows a shape made by approximating shapes of at least one pair of adjacent two areas among those areas to a curve. This further smoothens the distribution of the outgoing light intensity toward the front direction and the distribution of outgoing light angle, which is desirable. Moreover, as this makes easier to shape, it is advantageous at the time of manufacturing the light control member and is desirable. Furthermore, it is desirable in the point that the joints between the areas are not sharp and are hardly damaged. Damage of the joint is not desirable because it may cause a change in the emission direction of light and generation of unnecessary scattering.

Furthermore, the lighting device according to the present invention is the abovementioned lighting device, and is a lighting device which is characterized that the ratio of light output in the range with an angle within 30 degrees from the normal direction of the emission surface is 50% or more to all the outgoing light, in a cross-section which is parallel to the X direction and the normal direction of the principal surface of the light control member. Since this lighting device has relatively high outgoing light ratio toward the front direction, bright illuminated light can be efficiently obtained in the usage to observe the illuminated surface mainly from the front direction such as television and personal computer monitor. Moreover, in a cross-section which is parallel to the X direction and the normal direction of the principal surface of the light control member, the ratio of light output in the range with an angle within 30 degrees from the normal direction of the emission surface can be adjusted by adjusting the angle of the slope of the convex portion in the light control member. The angle of the slope of this convex portion can be adjusted by adjusting the width of $X_{max}$ to $X_{min}$.

Furthermore, the lighting device according to the present invention is the abovementioned lighting device, and is a lighting device which is characterized that the convex portion is formed of a material with refractive index of 1.58 or more. If the trough part gradient angle of the convex portion to the principal surface of the light control member is large, the angle which makes groove apex portion becomes too small. Therefore, collapse of the groove apex portion poses a problem at the time of cutting a female mold using a tool bit. Furthermore, in the resin mold process of extrusion molding, injection molding and 2P molding, decrease in mass productivity and endurance of mold become problems as the detachability of resin falls. To these issues, the refractive index of a resin forming the convex portion of the light control member is made to be 1.58 or more. This enables to reduce the angle made by the trough part of the convex portion to the principal surface of the light control member and the abovementioned issues such as decrease in the detachability of resin and mass productivity can be solved.

Furthermore, the lighting device according to the present invention is the abovementioned lighting device, and a lighting device which is characterized that a light beam direction conversion unit for converting a light beam direction is provided to the light control member. The light beam direction conversion unit converts the direction of 80% to 10% of light entered from the normal direction to the incident surface and also 80% or more of light entered to the incident surface from the linear light source passes the light beam direction conversion unit and reaches to the convex portion formed to the emission surface. In this case, by the light beam direction conversion unit converting the light direction of 80% to 10% of the light entered to the incident surface from the normal direction, light beam direction of a preferable ratio can be changed, thus the uniformity of luminance can be further increased. Especially, as 80% or more of the light entered from the light sources to the incident light passes the light beam direction conversion unit and reaches to the outgoing light control unit, the light utilization efficiency is high and more outgoing light can be controlled. Thus it is possible to preferably control outgoing light with high luminance.

Furthermore, by using a light beam direction conversion material as the light beam direction conversion unit in the base material part of the light control unit, the uniformity of the emitting light can be increased. Especially, to a base material 100 parts per mass which forms the light control member, 0.01 to 1 parts per mass of the light beam conversion material having particle diameter of 1 to 50 µm is contained and also a difference in the refractive index of the base material part and that of the light beam direction conversion material is 0.05 to 0.08. This suppresses a loss of light by the light beam direction conversion material to minimum while realizing to improve the uniformity of effective emitting light. Moreover, the light beam direction conversion unit is concave-convex structure over the incident surface. In this case, the light control member can be easily prepared by general forming method such as injection molding.

Furthermore, the lighting device according to the present invention is the abovementioned lighting device, and is a lighting device which is characterized that the incident surface has a reflective member formed to its surface and 5 to 20% of light from the linear light sources is refracted to the light source side. This enables to avoid or greatly reduce using light diffusion material particulates, which causes dispersion failure, while eliminating luminance non-uniformity and attempting to improve view angle characteristics.

In the present invention, the incident surface has a reflective material formed to its surface and 5 to 20% of the light from the linear light source is reflected to the light source side. By placing a reflective unit for covering a part of the incident surface, the diffusibility is increased while eliminating luminance non-uniformity by the shape of the convex portion provided to the emission surface of a plate shape member and also view angle can be controlled.

Specifically, light from the light sources is reflected to the light source side at the reflective unit formed to a part of the incident surface and travels to the reflective plate provided to the backside of the light sources. A part of light which passed the incident surface and inside the plate shape member to have reached the convex portion of the emission surface travels to the incident surface side by total reflection. When the light reaches to the portion not provided with the reflective unit among the incident surface, a part of the light is reflected and a part of the light transmits. However, when the light reaches to the portion provided with the reflective unit, the light does not transmit but is reflected. By the operation of the incident surface placed to the reflective unit as described above, reflection of light is intensified and consequently, increasing diffusibility. This avoids or greatly reduces using the light diffusion material particulates while achieving enough light diffusibility to eliminate luminance non-uniformity.

Moreover, among the light transmitting to the emission surface side from the light source side in the incident surface, the ratio of perfect diffused light increases and the ratio of direct light from the light source decreases. As a result, the ratio of the perfect diffused light entered to the incident surface relatively increases as compared to the direct light from the light sources. Here, if the perfect diffused light enters to the plate shape member having a emission surface convex portion in the flat incident surface, light collection capability increases and consequently showing the effect of improving the front luminance.

In addition, as described above, the reflective unit provided over the incident surface desirably has reflectivity also inside which is in contact with the incident surface, not only to the surface which is placed opposite to the light sources. This can be realized by a means such as evaporating a metal with high reflectivity, attaching resin foam and printing a reflective paint.

Furthermore, with a diffusive reflective ink coated to the incident surface, the effective reflection factor of the reflective member to incident light is 90% or more. Further, the aperture ratio of the portion not coated with the diffusive reflective ink in the incident surface to the surface area of the incident surface is 85% or more and 95% or less. This enables to relatively suppress the amount of usage of the reflective ink and also further increases the light utilization efficiency.

Further, the reflective material is formed of stripe shape reflective pattern printing and the stripe shape reflective pattern can be printed efficiently.

Moreover, the direction of the stripe of the reflective pattern is parallel to the X direction. In this configuration, as a plurality of ridge form convex portions with its longitudinal direction being parallel to the Y direction are included to the emission surface of the light control member, the outgoing light direction in the X direction can be efficiently controlled. For example, when placing the X direction to the bottom and the top, light in up-and-down direction, which has low importance in many image display devices, is efficiently collected, and a bright image display device can be efficiently obtained. Furthermore, as the longitudinal direction of the stripe of reflective pattern printing is parallel direction to the X direction which is vertical to the Y direction, generation of moiré between the reflective pattern and the ridge form convex portions can be easily prevented.

Further, the direction of the stripe of the reflective pattern printing is parallel to the Y direction and also the width of the stripe is 1/10 or more and also 1/3 or less of the width of the ridge form convex portions in the X direction of the emission surface. In this configuration, as a plurality of ridge form convex portions with its longitudinal direction being parallel to the Y direction are included to the emission surface of the light control member, the outgoing light direction in the X direction can be efficiently controlled. For example, when placing the X direction to the bottom and the top, light in up-and-down direction, which has low importance in many image display devices, is efficiently collected, and a bright image display device can be efficiently obtained Furthermore, the longitudinal direction of the stripe of the reflective pattern printing is parallel to the Y direction and also the width of the stripe is 1/10 or more and also 1/3 or less of the width of the ridge form convex portions in the X direction of the emission surface, thus generation of moiré between the reflective pattern and the ridge form convex portions can be easily prevented.

Moreover, the reflective pattern printing is dot pattern and also the representative size of the dot is 1/30 to 1/10 or less of the interval of the ridge form convex portion of the emission surface. Accordingly, by the reflective pattern printing being dot pattern, light uniformly transmits the incident surface. Further, as the representative size of the dot is 1/30 to 1/10 or less of the interval of the ridge form convex portion of the emission surface, generation of moiré between the reflective pattern and the ridge form convex portion can be easily prevented.

Furthermore, the lighting device according to the present invention is the abovementioned lighting device, and is a lighting device which is characterized that the light control member includes other convex portions different from the convex portions functioning as a first light beam direction control means, where the convex portions function as a second light beam direction control means to the other convex portion, the reflective plate is placed in parallel to the X direction and the Y direction to the side opposite to light emitting surface for the linear light sources. The first light beam direction control means is placed to the emission surface side than the virtual flat surface where the linear light sources are placed so that light from the light sources may be received by both of the first light beam direction control means and the second light beam direction control means. The first light beam direction control means refracts received light, collects light dispersed in the Y axis direction of light and lets it pass to the emission surface side. The second light beam direction control means reflects and refracts received light, increases positional uniformity of light in the X axis direction and lets it pass to the emission surface side.

Preferably, a plurality of the other convex portions are formed in parallel to the X axis of the surface by the side where light is emitted. The maximum value of the gradient of the slope for a cross-sectional shape of the other convex portions which are vertical to the X axis and parallel to the Y axis is 30 degrees or more and 60 degrees or less. Accordingly, by making the light beam control member be a plate shape structure, mechanical strength can be ensured and a change in optical characteristics generated along warpage in the state of film can be reduced.

FIG. 25 explains the effect of the first light beam direction control means provided in the light control member. Propagation of light in a surface vertical to the X direction is considered.

For light entered from the surface by the linear light sources side of the plate shape structure which forms the first light beam direction control means, by refraction at the surface where light enters and refraction of the convex portion slope provided to the emission surface side, light to be emitted is generated with its absolute value smaller than an incident angle. Accordingly, it is possible to narrow emission angle distribution. Depending on the shape of the convex portion, light may be reflected to the light source side again by total reflection at the convex portion slope. The reflected light is reflected by the reflective plate provided to the light source backside, enters again to the first light beam direction control means, and the abovementioned phenomenon is repeated.

The maximum gradient angle of the convex portion slope is desirably 30 to 60 degrees. If it is 30 degrees or less, light refracted toward the front direction is reduced and light collection function deteriorates. If it is 60 degrees or more, emitting light to an oblique direction increases and also the light collection function deteriorates.

Furthermore, the maximum value of the gradient of the slope for the cross-sectional shape which is vertical to the X axis and parallel to the Y axis of the other convex portion is 10 degrees or more and 40 degrees or less. At this time, the principal surface of the plate shape structure is formed of an incident surface having the first light beam direction control means and an emission surface which is placed opposite thereto.

FIG. 29 explains the effect of the first light beam direction control means provided in the light control member. Advance of light in a surface parallel to the normal direction and the Y direction the plate shape structure is considered. For the convenience of explanation, one side of the Y direction shall be plus and the other side shall be minus. In FIG. 29, the right direction indicates plus and the left direction indicates minus. Moreover, the region in the plus direction from the top part of the convex portion W shall be s and the region in the minus direction shall be t.

In the surface parallel to the normal direction and the Y direction of the light beam control member, if entered in the plus direction to the normal direction of the light beam control member, when light enters to the region s, it is emitted at an angle close to the normal direction than the incident angle by refraction effect on the surface where light enters. On the other hand, if light enters to the region t, it is emitted at an angle away from the normal direction.

It is possible to adjust the angle distribution of the light which passes the first light beam direction control means by adjusting the shape of the convex portion W. Accordingly, it is possible to narrow the angle distribution of emitting light by selecting a preferable shape. Moreover, if there is an increase in an incident angle to the side of the surface where light of the plate shape structure enters, light is again reflected to the light source side by total reflection on the emission surface. The reflected light enters again to the light beam control member by the reflective plate provided to the light source backside and the abovementioned phenomenon is repeated.

Therefore, by forming the ridge form convex portion W which is parallel to the Y direction to the side of the surface where light of the light beam control member enters, the emitting light angle distribution in the X direction can be narrowed and luminance in the front direction can be increased. When the height of the convex portion W increases, the ratio of the region s observed obliquely to the X direction reduces and conversely, the ratio of the region t increases. Accordingly, if the height of the convex portion increases too much, light is not collected and has a wider emission light distribution, and conversely luminance in the front direction decreases.

The maximum gradient angle of the convex portion W slope is preferably 10 to 40 degrees. Further, 20 to 30 degrees is more preferable. Moreover, the top part of the cross-sectional shape of the convex portion W in the Y axis direction is desirably formed of curved surface. If the top part of the cross-sectional shape is formed of straight line, crack and collapse are easily generated, and bright spot and black spot along with this cause to reduce appearance quality.

Furthermore, the cross-sectional shape in the Y axis direction is desirably symmetric with respect to the normal line of the principal surface of the light beam control member which passes the top part. This makes the emitting light angle distribution in the X direction be symmetric in the plus and the minus directions with respect to 0 degree direction. Thus balanced view angle characteristics in the plus direction and the minus direction can be obtained.

Moreover, the first light beam direction control means and the second light beam direction control means can be provided in the same plate shape structure. This removes an interface between the members in the first light beam direction control means and the second light beam direction control means and also reduces loss of light due to the reflection at the interface.

Furthermore, the plate shape structure is desirably formed of a transparent resin with water absorption rate of 0.5% or less in the atmosphere of the temperature 60 degrees Celsius and humidity 80%. In this case, the surface area differs in the surface where light enters and an emission surface by forming concave-convex to the surface of the plate shape structure. However by making the water absorption rate be 0.5% or less in the abovementioned atmosphere, warpage generated due to expansion difference by water absorption can be reduced.

Furthermore, the lighting device according to the present invention is the abovementioned lighting device, and is a lighting device which is characterized by having a projection which is in contact with the light control member and holds the light control member. The projection is formed of a light transmissive material, horizontal cross-section of the projection is circular shape and the diameter of the projection apical part which is in contact with the light control member is 1 mm or less.

With this configuration, as the projection is formed of a light transmissive material, the horizontal cross-section of the projection is circular shape and the diameter of the projection apical part which is in contact with the light control member is 1 mm or less, even when employing a light control member with high light transmittance, a shade of the projection cannot be seen easily and a bright lighting device with high luminance can be provided. In this case as in related arts, warpage and flexure of the light control member can be suppressed by the projection.

Furthermore, the lighting device according to the present invention is the abovementioned lighting device, and is a lighting device which is characterized that the reflective plate, the linear light sources and the light control member are placed toward the front direction in order of the reflective plate, the linear light sources and the light control member, the periphery of the principal surfaces of the reflective plate and the light control member is rectangular shape which is parallel to the XY flat surface, almost the entire surface of the outgoing light side surface of the principal surface of the reflective plate is parallel to the X axis and is regular concave and/or convex form stripe shape along the Y axis. Preferably, the light control member is a light diffusion plate which transmits light from the linear light sources and the reflective plate to the outgoing light direction.

According to this configuration, as the control member and the reflective plate included in the lighting device has the outer shape of the principal surface over a rectangle which is parallel to the XY flat surface which is vertical to the front direction, that is the main outgoing direction of the lighting device, light can be emitted toward the front direction efficiently. Moreover, as almost the entire surface of the outgoing light side surface of the principal surface of the reflective plate is parallel to the X axis and concave and/or convex form stripe shape along the Y axis, outgoing light angle distribution in the Y axis direction of light received by the reflective plate can be controlled.

Furthermore, the convex portion is formed of a plurality of regular stripe shape ridge portions which are parallel to the Y direction and are along the X direction.

According to this configuration, as this lighting device has a plurality of stripe shape ridge portions which are parallel to the Y direction and are along the X direction, it is possible to efficiently eliminate luminance non-uniformity in the X direction which is remarkable in the linear light sources placed in parallel similarly to the Y direction and to control the outgoing light angle distribution.

Furthermore, suppose that the distance between a given linear light source and another linear light source which is closest to the linear light source is D and the distance between the given light source and the light control member is H. In a cross-section parallel to ZX flat surface which is parallel to the X direction and the Z direction, total light transmittance of light entered to a given point over the incoming light surface at the angle of $\alpha=\text{Tan}^{-1}\{(D/2)/H\}$ to the Z direction is 50% or more, and also the total light transmittance is 1.05 to 5 times of total light transmittance of light when entering to the point over the incoming light surface from the normal direction.

With this configuration, as the total light transmittance differs according to the incident position of light to the light control member and the physical relationship of the linear light sources, outgoing light energy can be uniformed in the outgoing light surface. Therefore, it is possible to provide a lighting device which emits illuminated light with eliminated luminance non-uniformity and high quality.

Moreover, with the ridge portions in the outgoing light surface of the light control member, the ratio between the minimum and maximum value of the function G(x) with the outgoing light intensity toward the front direction for given adjacent three linear light sources with the position in the X direction and the distance D will be 60% or more.

According to this configuration, outgoing light direction in the X direction can be controlled by the function of the light control member. That is, by adjusting the shape of the ridge portion of the light control member according to the relationship between the position in the X direction and the outgoing light intensity of the given three adjacent linear light sources in the front direction, the outgoing light intensity toward the front direction in the X direction can be uniformed.

With such configuration, it is possible to provide a direct style lighting device using linear light sources, which is able to provide high quality illuminated light without luminance non-uniformity that sets one direction as a main outgoing light direction, increase front luminance, adjust view angle, has high light utilization efficiency, simplifies film configuration and is useful in many usages such as television and illuminated signboard, a reflective plate which can be used in the lighting device and an image display device with high quality and luminance using this lighting device. Moreover, it is also possible to greatly reduce or avoid the usage of the light diffusion agent. Furthermore, as an alignment between the member and the linear light sources is practically unnecessary, production speed and yield will not be reduced and it is possible to respond to a design change and difference in specification without problems.

The inventors considered that by eliminating luminance non-uniformity of the linear light sources and controlling the outgoing light direction, it is possible to provide a lighting device and an image display device which can increase front luminance, adjust angle view and has high quality. Moreover, as a means for that, by using the functions of the light control member and the reflective plate, the inventors thought that the usage of optical films such as luminance improvement film can be reduced.

On the other hand, it is another purpose for the light control member to improve light utilization efficiency. The inventors thought it is important to increase total light transmittance of the light control member for that. However, increasing the total light transmittance of the light control member also leads to raise the issue of luminance non-uniformity. That is, there will be more light emitting from the outgoing light surface without reflection at the reflective plate, thus there is a limit in eliminating luminance non-uniformity by the function of the reflective plate. Then, among the two large issues of the elimination of luminance non-uniformity of the linear light sources and the control of outgoing direction, the elimination of luminance non-uniformity is to be solved mainly by the function of the light control member.

Therefore, another issue of the control of outgoing light direction is to be performed mainly by the reflective plate. The inventors thought that besides the main function for uniformizing the outgoing light energy in the X axis direction for eliminating luminance non-uniformity, it is possible for the light control member to partly have the outgoing light direction control function in the X axis direction, and especially the main function of the reflective plate is to be the outgoing direction control in the Y axis direction. Therefore, the reflective plate is to have concave and/or convex form stripe shape in which almost the entire surface of the outgoing light side surface is parallel to the X axis.

The light control member according to the present invention is a light control member included in the abovementioned lighting device having various configurations. The light control member is plate shape having a principal surface of an incident surface and an emission surface, and reflects a part of light entered to the incident surface from the incident surface side and transmits a part of the light. The luminance non-uniformity of emitting light is reduced by this function. The light transmitting the incident surface is refracted at the incident surface, collected near the normal direction of the incident surface and travels to the emission surface. The light transmitting the incident surface and traveling to the convex portion of the emission surface is refracted according to a gradient of each area in the convex portion. The light traveled to the area of an appropriate angle travels toward the front direction. Moreover, by appropriately selecting the ratio of each areas in the convex portions with different gradient, the outgoing light intensity in a given point over the emission surface to the front direction can be made constant. By the function of the incident surface and the emission surface convex portion, luminance non-uniformity of the emitting light toward the front direction, which is the normal direction of the emission surface, can be eliminated by various configurations to place the linear light sources to the incident surface side.

Moreover, this light control member is not only preferably used in the abovementioned lighting device, but also can be used in a lighting device having a reflective plate and a light control member placed in parallel and a single light source placed between them for emitting light to the light control member and a lighting device having a singe or a plurality of light sources between a plurality of light control members. These lighting devices can also be preferably used for display usages such as a lighting signboard.

The image display device according to the present invention is an image display device characterized by providing a transmissive display device to the emission surface side of the abovementioned lighting device having various configurations. The lighting device is a lighting device in which the distribution of outgoing light intensity toward the front direction is constant and the distribution of outgoing light intensity toward the front direction is uniform, being able to increase the ratio of the outgoing light intensity toward the front direction and can be used as a preferable image display device by providing a transmissive display device to the emission side. To be more specific, as a transmissive display device such as a liquid crystal panel is provided over the lighting device, light which is efficiently collected or diffused by the light control member transmits the transmissive display device. As a result, it is possible to easily obtain an image display device which does not require to adjust light source position, is able to eliminate a lamp image and also has an excellent uniform brightness in an emission surface with a simple configuration.

Here, the image display device indicates a display module combining a lighting device and a display device, and further a device having at least an image display function using this display module such as a television and personal computer monitor.

The distribution of the outgoing light intensity toward the front direction can be evaluated by measuring the distribution of front luminance. The distribution of the front luminance is measured by moving a luminance meter by regular interval in the X direction while keeping the distance between the luminance meter and a measuring point by the emission surface side of the light control member. Moreover, the outgoing light ratio toward the front direction is measured by firstly measuring luminance of the measuring point with different angles. At this time, the angle is changed along the normal direction of the principal surface of the light control member and the cross-section which is parallel to the X axis direction. At this time, the distance between the luminance meter and the measuring point in the emission surface side of the light control member is kept constant. Next, the obtained luminance value for each angle is converted into a value of energy so as to calculate the ratio of energy emitted within 30 degrees of the front direction, which is the normal direction of the principal surface of the light control member, to all emission energy.

ADVANTAGES OF THE INVENTION

The present invention provides a lighting device in direct type which has high light utilization efficiency and has no luminance non-uniformity in the front direction such as a lamp image by making the distribution of the outgoing light intensity toward the front direction constant. Moreover, the emission ratio toward the front direction is high, which is 50% or more, thus high front luminance can be obtained. Moreover, by approximating the cross-sectional shape of the convex portion to a curve, a smooth distribution of outgoing light intensity toward the front direction and a desired distribution of outgoing light angle can be obtained. Furthermore, it is possible to deal with thinner shape by locating the linear light sources closely to other members and simplifying the film configuration. Further, same optical control can be performed to light entered to the incident surface in all places, thus it eliminates the need for alignment between the linear light sources and the light control member and enables to quickly respond to a change in display size, the number of the linear light sources and the arrangement, thereby enabling to manufacture a lighting device with high productivity. Moreover, the present invention provides an image display device using thereof.

BRIEF DESCRIPTION OF THE DRAWINGS

FIG. 19 is a table showing the measurement result of examples 29 to 33 and comparative examples 5 to 8;

DESCRIPTION OF REFERENCE NUMERALS

Figure 1:
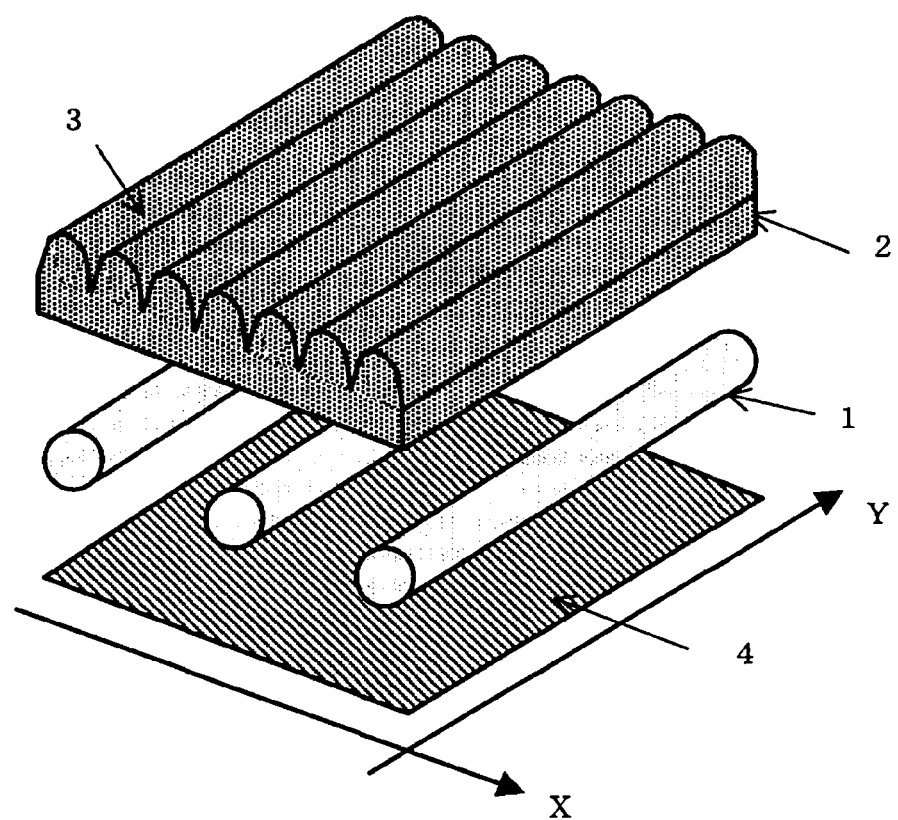
FIG. 1 is a schematic diagram of a preferable example of a lighting device according to the present invention.

1: LINEAR LIGHT SOURCE, 2: LIGHT CONTROL MEMBER, 3: CONVEX PORTION, 4: REFLECTIVE PLATE, 5: LIGHT DIFFUSION PLATE, 6: INCIDENT SURFACE
7: INCIDENT LIGHT, 8: EMITTING LIGHT, 9: LIGHT PASSING INSIDE LIGHT CONTROL MEMBER, 10: REFLECTED LIGHT
11: PRISM SHEET
D: DISTANCE BETWEEN CENTERS OF ADJACENT LINEAR LIGHT SOURCES
H: DISTANCE BETWEEN CENTER OF LINEAR LIGHT SOURCE AND INCIDENT SURFACE OF LIGHT CONTROL MEMBER
f(X): FUNCTION OF DISTRIBUTION TO OUTGOING LIGHT INTENSITY IN ARRANGEMENT DIRECTION X OF LINEAR LIGHT SOURCE AND IN FRONT DIRECTION TO EMIT FROM CONVEX PORTION OF LIGHT CONTROL MEMBER
N: NATURAL NUMBER
n: REFRACTIVE INDEX OF CONVEX PORTION OF LIGHT CONTROL MEMBER
$n_2$: REFRACTIVE INDEX OF BASE MATERIAL OF LIGHT CONTROL MEMBER
$X_{max}$: X COORDINATE IN POSITIVE DIRECTION WHEN f(X) IS 0
$X_{min}$: X COORDINATE IN NEGATIVE DIRECTION WHEN f(X) IS 0
g(X): f(X−D)+f(X)+f(X+D); FUNCTION FOR DISTRIBUTION TO OUTGOING LIGHT INTENSITY IN ARRANGEMENT DIRECTION X OF LINEAR LIGHT SOURCES AND IN FRONT DIRECTION WHERE LIGHT FROM ADJACENT THREE LINEAR LIGHT SOURCES EMITS FROM LIGHT CONVEX PORTION OF LIGHT CONTROL MEMBER
$g(X)_{min}$: MINIMUM VALUE OF g(X) BETWEEN $X_{min}$ to $X_{max}$
$g(X)_{max}$: MAXIMUM VALUE OF g(X) BETWEEN $X_{min}$ to $X_{max}$
δ: $\epsilon$=SMALL INTERVAL SATISFYING $(X_{max}$ to $X_{min})$/(2N+1)
$\Phi_i$: GRADIENT OF SLOPE TO EMISSION SURFACE OF AREA i OF CONVEX PORTION
$X_i$: CENTER VALUE OF X COORDINATE OF EACH ELEMENT WHEN EQUALLY DIVIDING BETWEEN $X_{min}$ to $X_{max}$ INTO (2N+1)
$a_i$: WIDTH OF AREA i OF CONVEX PORTION IN X DIRECTION
T: THICKNESS FROM INCIDENT SURFACE TO CONVEX PORTION OF LIGHT CONTROL MEMBER
$\alpha_i$: ANGLE TO NORMAL OF INCIDENT SURFACE MADE BY LIGHT BEAM DIRECTION FROM LINEAR LIGHT SOURCE FOR LIGHT ENTERED FROM LINEAR LIGHT SOURCES TO INCIDENT SURFACE, PASSING INSIDE LIGHT CONTROL MEMBER AND EMITTED FROM AREA i, IN CROSS-SECTION WHICH IS PARALLEL TO X DIRECTION AND NORMAL DIRECTION OF PRINCIPAL SURFACE OF THE LIGHT CONTROL MEMBER
$\beta_i$: ANGLE TO NORMAL OF INCIDENT SURFACE MADE BY LIGHT BEAM DIRECTION INSIDE CONVEX PORTION OF LIGHT CONTROL MEMBER FOR LIGHT ENTERED FROM LINEAR LIGHT SOURCES TO INCIDENT SURFACE, PASSING INSIDE LIGHT CONTROL MEMBER AND EMITTED FROM AREA i, IN CROSS-SECTION WHICH IS PARALLEL TO X DIRECTION AND NORMAL DIRECTION OF PRINCIPAL SURFACE OF THE LIGHT CONTROL MEMBER
$\gamma_i$: ANGLE TO NORMAL OF INCIDENT SURFACE MADE BY LIGHT BEAM DIRECTION INSIDE BASE MATERIAL OF LIGHT CONTROL MEMBER FOR LIGHT ENTERED FROM LINEAR LIGHT SOURCES TO INCIDENT SURFACE, PASSING INSIDE LIGHT CONTROL MEMBER AND EMITTED FROM AREA i, IN CROSS-SECTION WHICH IS PARALLEL TO X DIRECTION AND NORMAL DIRECTION OF PRINCIPAL SURFACE OF THE LIGHT CONTROL MEMBER
$b_i$: LENGTH OF SLOPE OF AREA i IN CROSS-SECTION WHICH IS PARALLEL TO X DIRECTION AND NORMAL DIRECTION OF PRINCIPAL SURFACE OF LIGHT CONTROL MEMBER
$e_i$: LENGTH OF PROJECTION OF SLOPE OF AREA i BY LIGHT ENTERED FROM NORMAL DIRECTION LIGHT SOURCE TO INCIDENT SURFACE, PASSING INSIDE LIGHT CONTROL MEMBER AND EMITTED FROM AREA i IN DIRECTION VERTICAL TO LIGHT BEAM DIRECTION INSIDE LIGHT CONTROL MEMBER, IN CROSS-SECTION WHICH IS PARALLEL TO X DIRECTION AND NORMAL DIRECTION OF PRINCIPAL SURFACE OF THE LIGHT CONTROL MEMBER
$\epsilon_i$: ANGLE MADE BY ANGLE OF SLOPE OF AREA i TO ANGLE VERTICAL TO LIGHT BEAM DIRECTION INSIDE CONVEX PORTION OF LIGHT CONTROL MEMBER IN CROSS-SECTION WHICH IS PARALLEL TO X DIRECTION AND NORMAL DIRECTION OF PRINCIPAL SURFACE OF LIGHT CONTROL MEMBER
θ: INCIDENT ANGLE TO NORMAL OF INCIDENT SURFACE MADE BY LIGHT BEAM DIRECTION FROM LINEAR LIGHT SOURCE FOR LIGHT ENTERED FROM LINEAR LIGHT SOURCES TO INCIDENT SURFACE, PASSING INSIDE LIGHT CONTROL MEMBER AND EMITTED FROM EMISSION SURFACE, IN CROSS-SECTION WHICH IS PARALLEL TO X DIRECTION AND NORMAL DIRECTION OF PRINCIPAL SURFACE OF THE LIGHT CONTROL MEMBER
Δθ: ANGLE MADE BY SMALL RANGE CENTERING LIGHT WITH INCIDENT ANGLE θ TO BE THE CENTER OF LINEAR LIGHT SOURCE, IN CROSS-SECTION WHICH IS PARALLEL TO X DIRECTION AND NORMAL DIRECTION OF PRINCIPAL SURFACE OF THE LIGHT CONTROL MEMBER
H': LENGTH OF PROJECTION OF A PATH CONNECTING BETWEEN A POINT ON INCIDENT SURFACE OF LIGHT CONTROL MEMBER PASSED BY LIGHT EMITTED FROM LINEAR LIGHT SOURCE AT ANGLE (θ−Δθ) AND CENTER OF LINEAR LIGHT SOURCE TO A PATH IN WHICH LIGHT EMITTED FROM LINEAR LIGHT SOURCE AT ANGLE θ, IN CROSS-SECTION WHICH IS PARALLEL TO X DIRECTION AND NORMAL DIRECTION OF PRINCIPAL SURFACE OF THE LIGHT CONTROL MEMBER (ALMOST SAME AS DISTANCE BETWEEN A POINT OVER INCIDENT SURFACE OF LIGHT CONTROL MEMBER IN WHICH LIGHT EMITTED FROM LINEAR LIGHT SOURCE AT ANGLE theta PASSES AND CENTER OF LINEAR LIGHT SOURCE)

V: LENGTH OF AREA OVER INCIDENT SURFACE OF LIGHT CONTROL MEMBER WHERE LIGHT OF $\Delta\theta$ CENTERING THE INCIDENT ANGLE $\theta$ FROM LINEAR LIGHT SOURCE PASSES, IN CROSS-SECTION WHICH IS PARALLEL TO X DIRECTION AND NORMAL DIRECTION OF PRINCIPAL SURFACE OF THE LIGHT CONTROL MEMBER U: PROJECTION TO ANGLE VERTICAL TO INCIDENT ANGLE $\theta$ FOR LINE WITH LENGTH V OF AREA OVER INCIDENT SURFACE OF LIGHT CONTROL MEMBER WHERE LIGHT OF $\Delta\theta$ CENTERING THE INCIDENT ANGLE $\theta$ FROM LINEAR LIGHT SOURCE PASSES, IN CROSS-SECTION WHICH IS PARALLEL TO X DIRECTION AND NORMAL DIRECTION OF PRINCIPAL SURFACE OF THE LIGHT CONTROL MEMBER $\alpha$: INCIDENT ANGLE TO NORMAL OF INCIDENT SURFACE MADE BY LIGHT ENTERED TO LIGHT CONTROL MEMBER IN CROSS-SECTION WHICH IS PARALLEL TO X DIRECTION AND NORMAL DIRECTION OF PRINCIPAL SURFACE OF LIGHT CONTROL MEMBER $\beta$: ANGLE TO NORMAL OF INCIDENT SURFACE MADE BY LIGHT BEAM DIRECTION INSIDE CONVEX PORTION OF LIGHT CONTROL MEMBER FOR LIGHT ENTERED FROM LINEAR LIGHT SOURCES TO INCIDENT SURFACE, PASSING INSIDE LIGHT CONTROL MEMBER AND EMITTED FROM CONVEX PORTION, IN CROSS-SECTION WHICH IS PARALLEL TO X DIRECTION AND NORMAL DIRECTION OF PRINCIPAL SURFACE OF THE LIGHT CONTROL MEMBER $\gamma$: ANGLE TO NORMAL OF INCIDENT SURFACE MADE BY LIGHT BEAM DIRECTION INSIDE BASE MATERIAL OF LIGHT CONTROL MEMBER FOR LIGHT ENTERED FROM LINEAR LIGHT SOURCES TO INCIDENT SURFACE, PASSING INSIDE LIGHT CONTROL MEMBER AND EMITTED FROM CONVEX PORTION, IN CROSS-SECTION WHICH IS PARALLEL TO X DIRECTION AND NORMAL DIRECTION OF PRINCIPAL SURFACE OF THE LIGHT CONTROL MEMBER $\epsilon$: ANGLE TO NORMAL OF SLOPE OF CONVEX PORTION MADE BY LIGHT BEAM DIRECTION INSIDE LIGHT CONTROL MEMBER FOR LIGHT ENTERED FROM LINEAR LIGHT SOURCES TO INCIDENT SURFACE, PASSING INSIDE LIGHT CONTROL MEMBER AND EMITTED FROM CONVEX PORTION, IN CROSS-SECTION WHICH IS PARALLEL TO X DIRECTION AND NORMAL DIRECTION OF PRINCIPAL SURFACE OF THE LIGHT CONTROL MEMBER $\omega$: ANGLE TO NORMAL OF SLOPE OF CONVEX PORTION MADE BY LIGHT BEAM DIRECTION EMITTED FROM CONVEX PORTION FOR LIGHT ENTERED FROM LINEAR LIGHT SOURCES TO INCIDENT SURFACE, PASSING INSIDE LIGHT CONTROL MEMBER AND EMITTED FROM CONVEX PORTION, IN CROSS-SECTION WHICH IS PARALLEL TO X DIRECTION AND NORMAL DIRECTION OF PRINCIPAL SURFACE OF THE LIGHT CONTROL MEMBER P: WIDTH OF CONVEX PORTION IN CROSS-SECTION WHICH IS PARALLEL TO X DIRECTION AND NORMAL DIRECTION OF PRINCIPAL SURFACE OF LIGHT CONTROL MEMBER $\Delta\alpha_i$: ANGLE ASSUMING DIAMETER OF LINEAR LIGHT SOURCE FROM COORDINATE $X_i$

BEST MODE OF CARRYING OUT THE INVENTION

First Embodiment

FIG. 1 shows an example of the best mode of a lighting device provided by the present invention. It is a lighting device having a rectangle emission surface formed of X direction and Y direction which is vertical to the X direction, and is a lighting device in which linear light sources 1 are placed in one virtual flat surface, which is parallel to the X direction and the Y direction, in parallel to the Y direction and also along the X direction. A light control member 2 is placed to an emission surface side of the arranged linear light sources and a principal surface is parallel to the virtual flat surface where the linear light sources are arranged and a plurality of ridge form convex portions 3 are formed to the surface by the emission surface side. A ridgeline of the ridge form, which is the top part of the convex portions 3, is formed in parallel to the Y direction and also is arranged along the X direction. The reflection factor of a reflective plate 4 which is placed to the backside in parallel to the X direction and the Y direction is desirably 95% or more. The light utilization efficiency is high because light traveling from the linear light sources 1 to the backside and light reflected at the light control member 2 and traveling to the backside is further reflected to the emission side and the light is effectively used. As the material of the reflective plate, there are metal foils such as aluminum, silver and stainless, white paint and resin PET foam etc. For the reflective plate, the one with high reflection factor is preferable in order to increase light utilization efficiency. From this point of view, silver and resin PET foam etc. are desirable. Moreover, the one which diffuses and reflects light is desirable in order to increase uniformity of emitting light. From this point of view, resin PET foam etc. is desirable.

As the linear light sources of the present invention are placed to be held between the reflective plate and the light control member, an approximately half of light emitted from the linear light sources travels to the direction of the light control member and approximately remaining half travels to the direction of the reflective plate. Among these, the light traveled to the reflective plate, diffused and reflected by the reflective plate enters to the light control member as diffused light. Moreover, a part of the light from the linear light sources entered to the light control member is returned by total reflection and travels to the reflective plate. The light emitted from the linear light sources and traveled to the reflective plate and the light returned by total reflection at the light control member and traveled to the reflective plate is diffused and reflected by the reflective plate and enters again to the light control member as diffused light. The light entered as the diffused light is emitted with equal front luminance and angle distribution at all points over the emission surface of the light control member. Therefore, the ratio $G(X)_{min}/G(X)_{max}$ between the minimum value $G(X)_{min}$ and the maximum value $G(X)_{max}$ of an emitting light intensity in the front direction including the diffused light at the state in which the reflective plate is placed is larger than the ratio $g(X)_{min}/g(X)_{max}$ not including the reflected light. Moreover, by appropriately selecting the reflective plate, 50% or more of the light entering to the light control member becomes diffused light.

A simple estimation is performed hereinafter for effect of luminance non-uniformity elimination by the reflective plate. It is assumed that after 50% of the light emitted from the linear light sources is diffused and reflected by the reflective plate, it enters to the light control member. Supposing that the reflection factor of the reflective plate is 95%, light of the same amount as the light traveled from the linear light sources to the light control member and output toward the front direction is reflected from the linear light sources by the reflective plate and after that, enters to the light control member and is output toward the front direction. Assuming that among the light traveled from the linear light sources to the light control member, the light output toward the front direction is an average of $g(X)_{max}$ and $g(X)_{min}$, $(g(X)_{max}+g(X)_{min})/2 \times 0.95$ is reflected from the linear light sources by the reflective plate, enters to the light control member as the diffused light and emitted toward the front direction. This is respectively added to $g(X)_{max}$ and $g(X)_{min}$, and when calculating $G(X)_{min}$, which is the minimum value, $G(X)_{max}$, which is the maximum value of the outgoing light intensity when placing the reflective plate, and the ratio $G(X)_{min}/G(X)_{max}$ between them, it will be;

$$G(X)_{max}=g(X)_{max}+g(X)_{max}+g(X)_{min}/2\times0.95 \quad (22)$$

$$G(X)_{min}=g(X)_{min}+g(X)_{max}+g(X)_{min}/2\times0.95 \quad (23)$$

$$G(X)_{min}/G(X)_{max}=\{g(X)_{min}+g(X)_{max}+g(X)_{min}/2\times 0.95\}/\{g(X)_{max}+g(X)_{max}+g(X)_{min}/2\times0.95\} \quad (24)$$

In order for the ratio $G(X)_{min}/G(X)_{max}$ to be 0.8 or more, it is;

$$g(X)_{min}/g(X)_{max}\geq0.65 \quad (25)$$

As described above, as the diffused light component among the incident light to the light control member is in fact 50% or more, it can be;

$$g(X)_{min}/g(X)_{max}\geq0.6 \quad (26)$$

Figure 16:
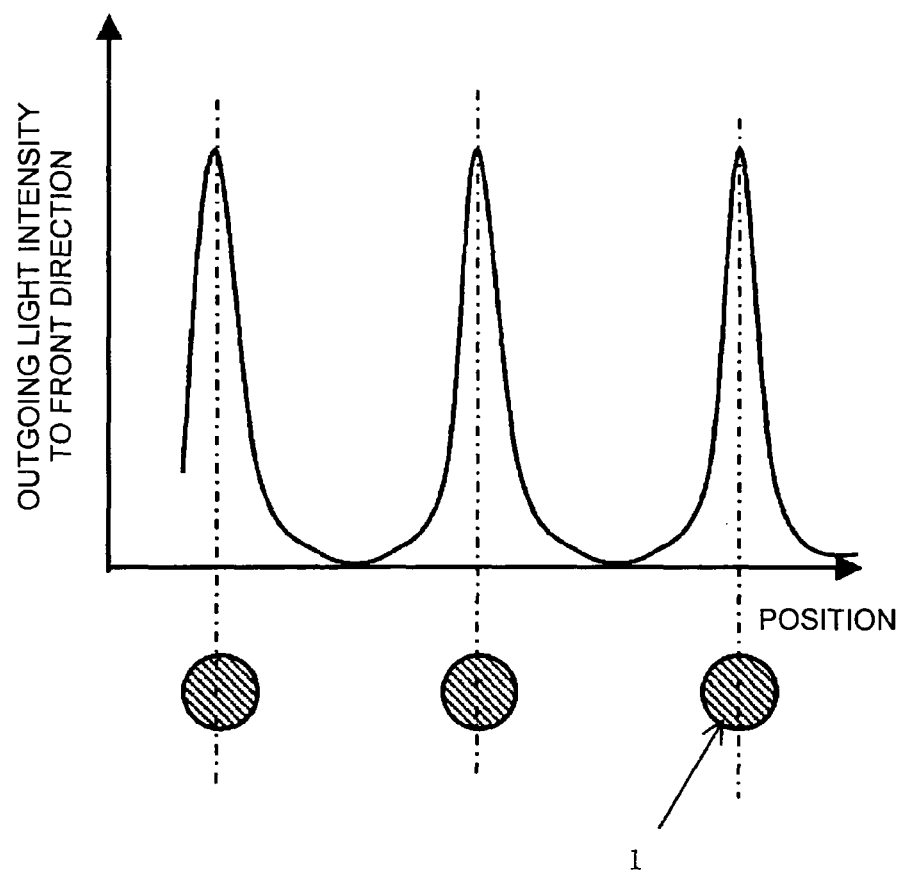
FIG. 16 is a view showing a distribution of an outgoing light intensity from linear light sources arranged in parallel toward a front direction.
Figure 17:
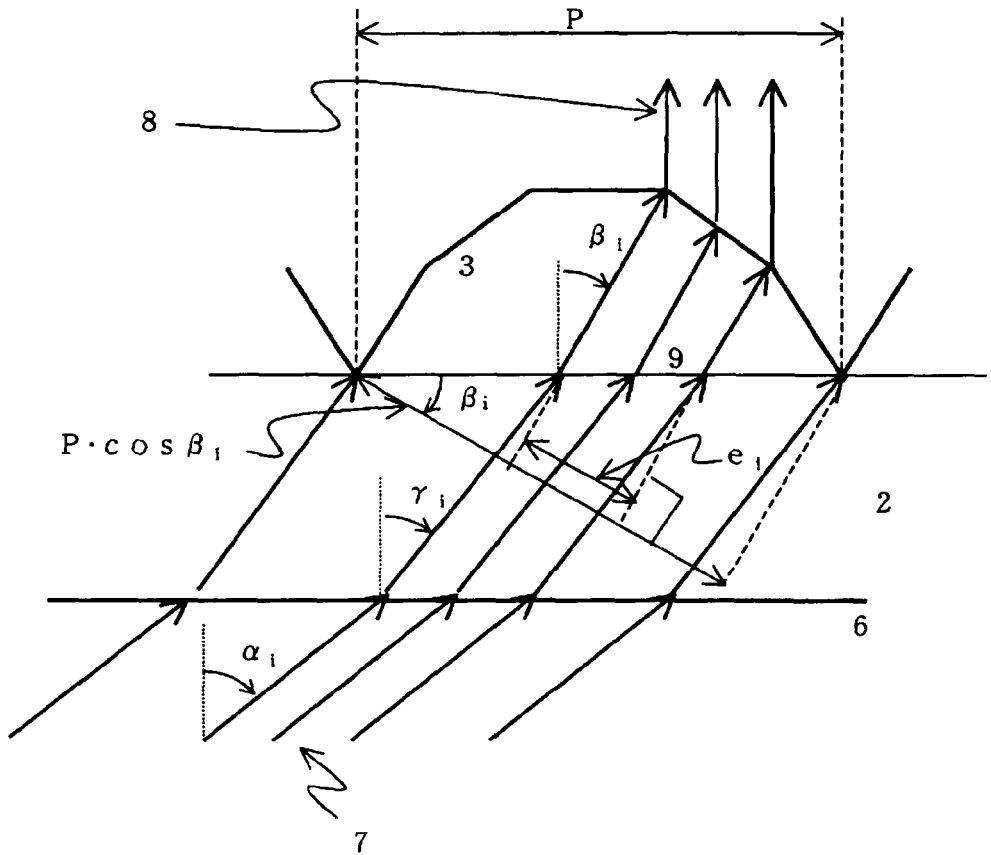
FIG. 17 is a view showing the ratio of light traveling to an area i among light traveling to a convex portion at an angle $\alpha_i$.
Figure 18:
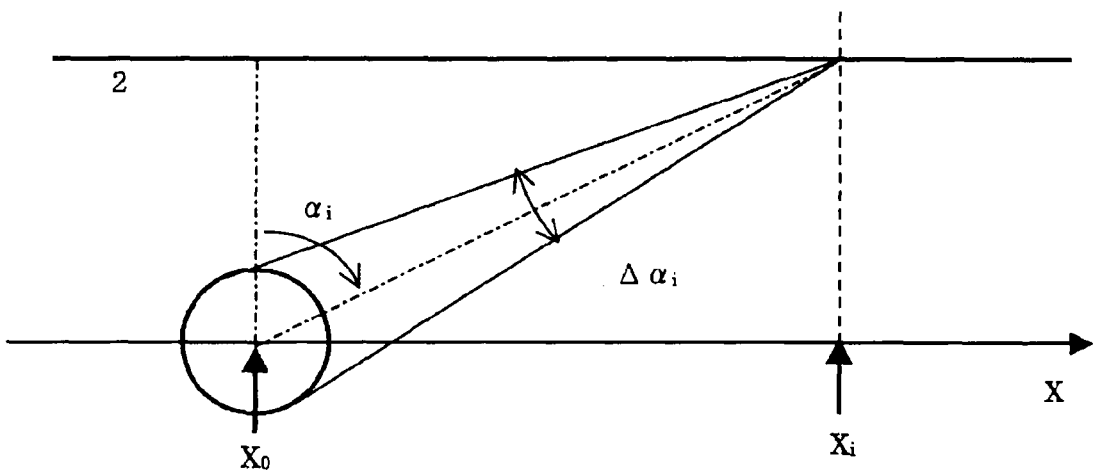
FIG. 18 is a view showing an angle $\Delta\alpha_i$ which assumes the diameter of a light source in a point of coordinate $X_i$.

FIG. 16 is a view showing a relationship between an outgoing light intensity toward the front direction and the position of the linear light sources when arranging the linear light sources in parallel. As shown here, in the lighting device formed by placing a plurality of the linear light sources 1, the outgoing light intensity toward the front direction (upward in the drawing) largely differs in the immediate above part of each linear light source 1 and in the part between immediate above of the linear light sources 1 (oblique upward in the drawing) which is adjacent to the immediate above part. This means that in the lighting device of the present invention, the incident intensity in the front direction to the incident surface of the light control member largely differs in the immediate above part and the oblique upward part of each linear light source 1.

Figure 2:
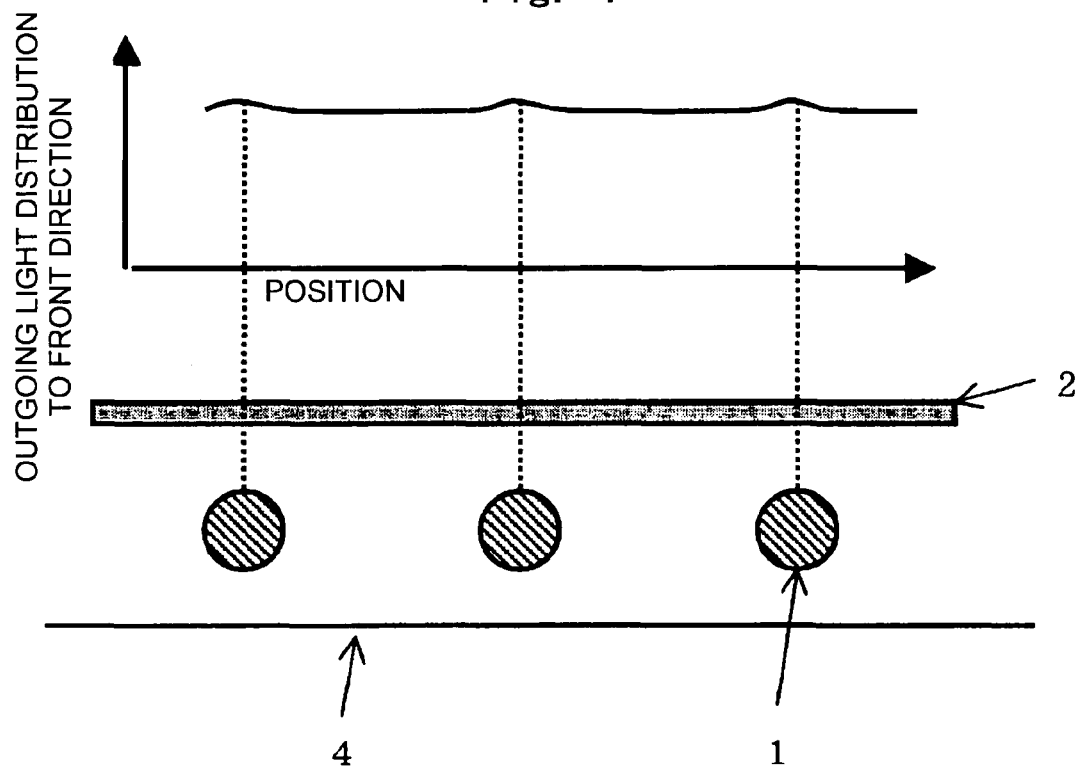
FIG. 2 is a view showing a relationship between the position of linear light sources and an outgoing light intensity to a front direction of the lighting device of FIG. 1.

FIG. 2 is a view showing a relationship between the position of the linear light sources and an outgoing light intensity toward the front direction of the lighting device of FIG. 1. In this way, as the distribution of the outgoing light intensity toward the front direction becomes almost constant, luminance non-uniformity in the front direction is eliminated.

Figure 3:
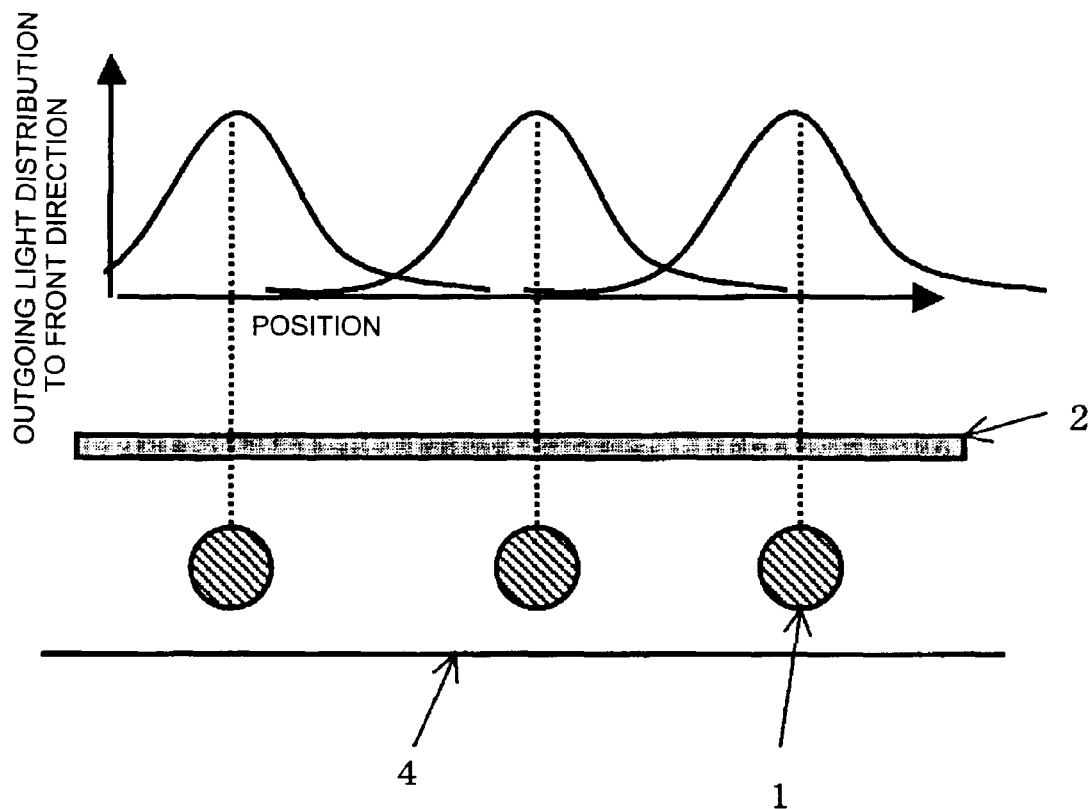
FIG. 3 is a view showing the position of linear light sources and each distribution of an outgoing light intensity toward the front direction when placing three adjacent linear light sources.
Figure 4:
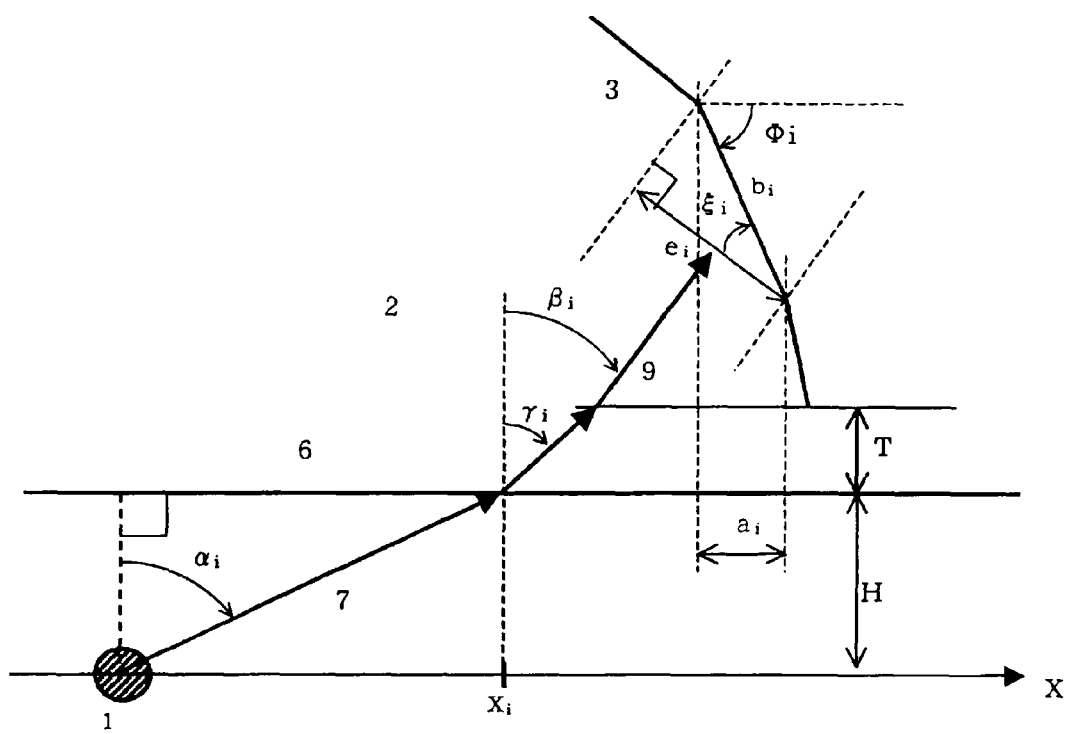
FIG. 4 is a view showing a relationship between an incident angle $\alpha_i$ of light from a linear light source, an angle $\Phi_i$ of a gradient of a slope of an area i of a convex portion and a width $a_i$ of the area i in X direction.
Figure 5:
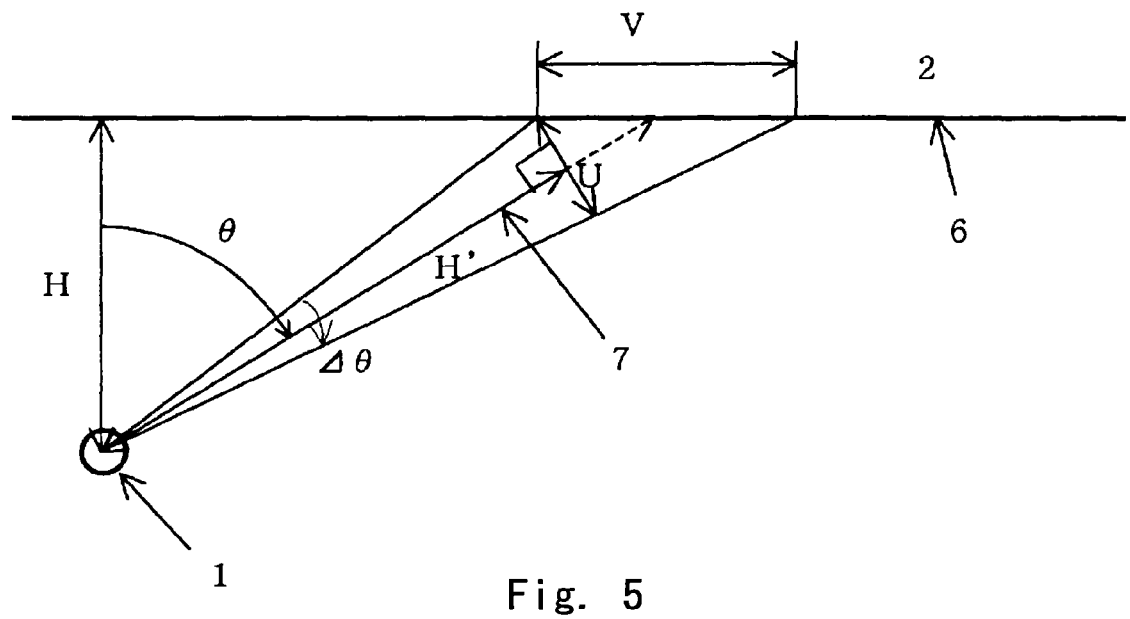
FIG. 5 is a view explaining a relationship between an incident angle to a light control member and an incident intensity.
Figure 6:
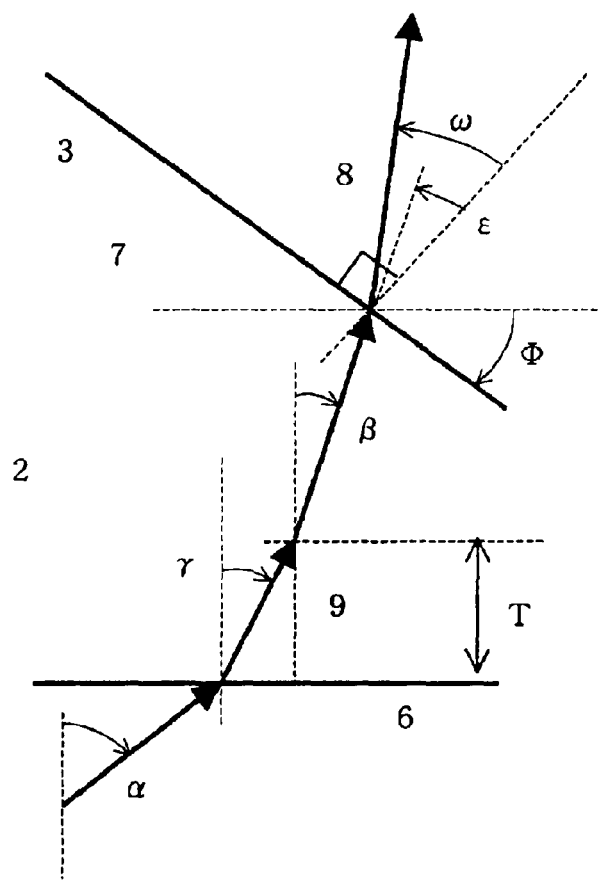
FIG. 6 is a view showing a principle for turning light to the front by the lighting device of the present invention.

FIG. 3 is a view showing the position of the linear light sources and each distribution of the outgoing light intensity toward the front direction when placing three adjacent linear light sources and the reflective plate. If the total of these is almost constant, luminance non-uniformity in the front direction can be said to be eliminated. As shown in FIG. 2 by the light control member 2 of the present invention, as the distribution of the outgoing light intensity toward the front direction becomes almost constant, the luminance non-uniformity in the front direction is eliminated.

Figure 7:
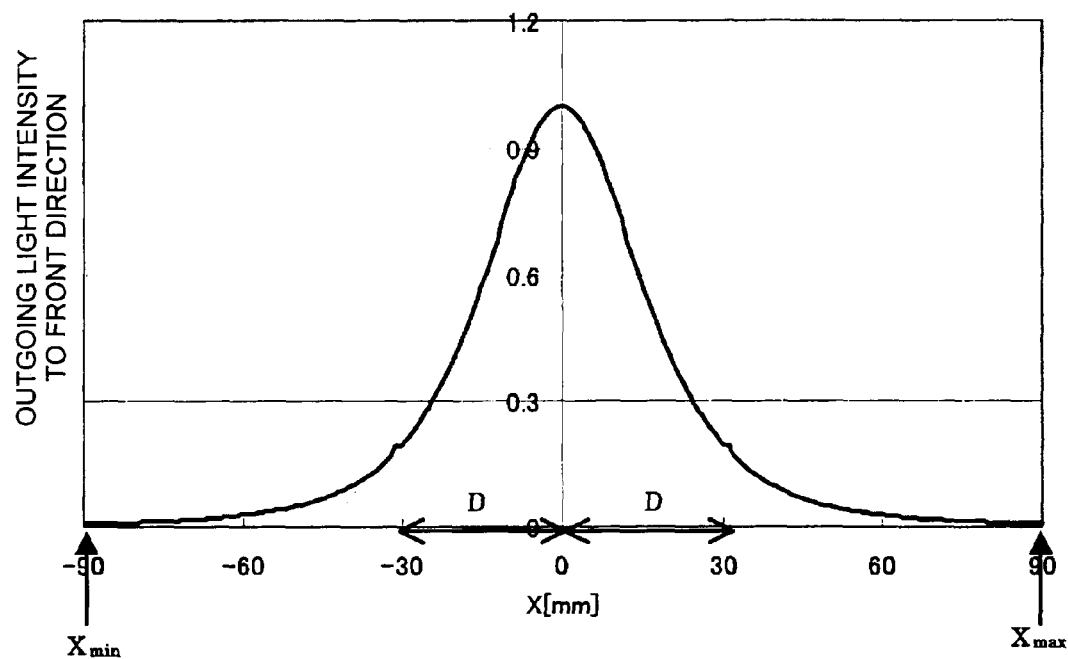
FIG. 7 is a view showing an example of a distribution of an outgoing light intensity in the X direction by light from one linear light source.

FIG. 7 shows an example of a distribution of the outgoing light intensity toward the front direction in the X direction by light from a given one linear light source of the lighting device according to the present invention in which linear light sources are arranged with D=30 mm. The outgoing light from one linear light source toward the front direction is in the range of $X_{min}$ to $X_{max}$. When exhibiting a gradual decline as shown in FIG. 7, it can be substituted with the value of X when f(X) becomes 1/100 of the maximum value. The value of f(X) for determining $X_{min}$ and $X_{max}$ is preferably the same, it is not a problem if 1/20 or less of the maximum value and is further desirable to be 1/100 or less. In FIG. 7, it is $X_{min}=-3D$ and $X_{max}=3D$ and is $f(X_{min})=f(X_{max})$, which is 1/100 or less of f(X). In such shape, as the outgoing light intensity toward the front direction is not precisely determined by the total of only three adjacent linear light sources, g(X) near the center where X=0 is desired to be slightly higher than in periphery rather than g(X) being constant.

Figure 8:
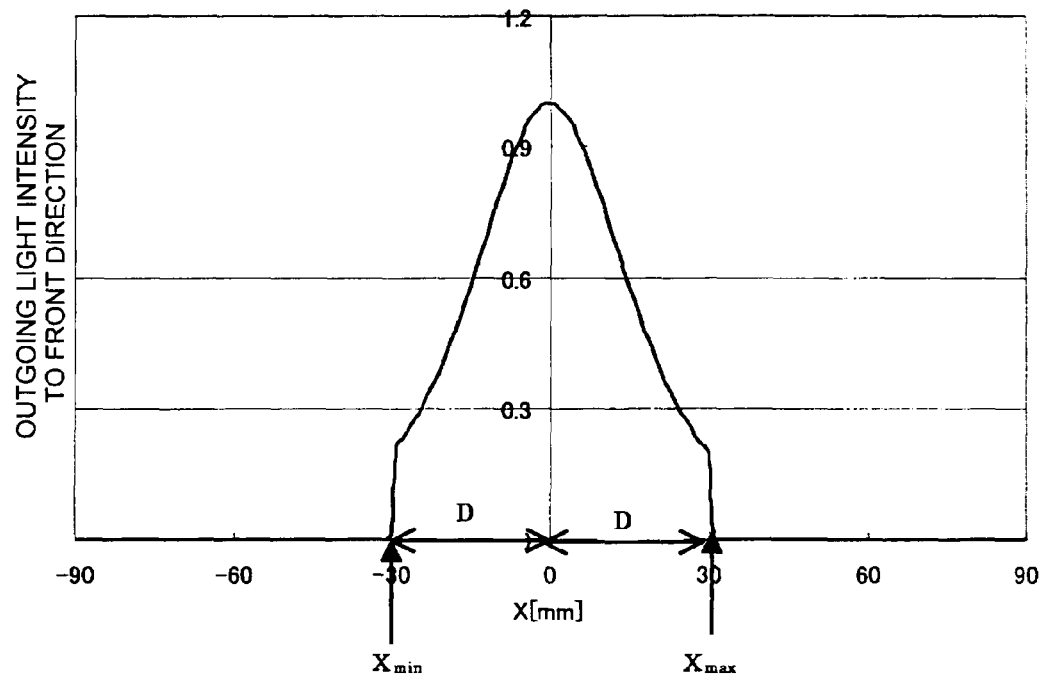
FIG. 8 is a view showing a example different from FIG. 7 of a distribution of an outgoing light intensity in the X direction by light from one linear light source.
Figure 9:
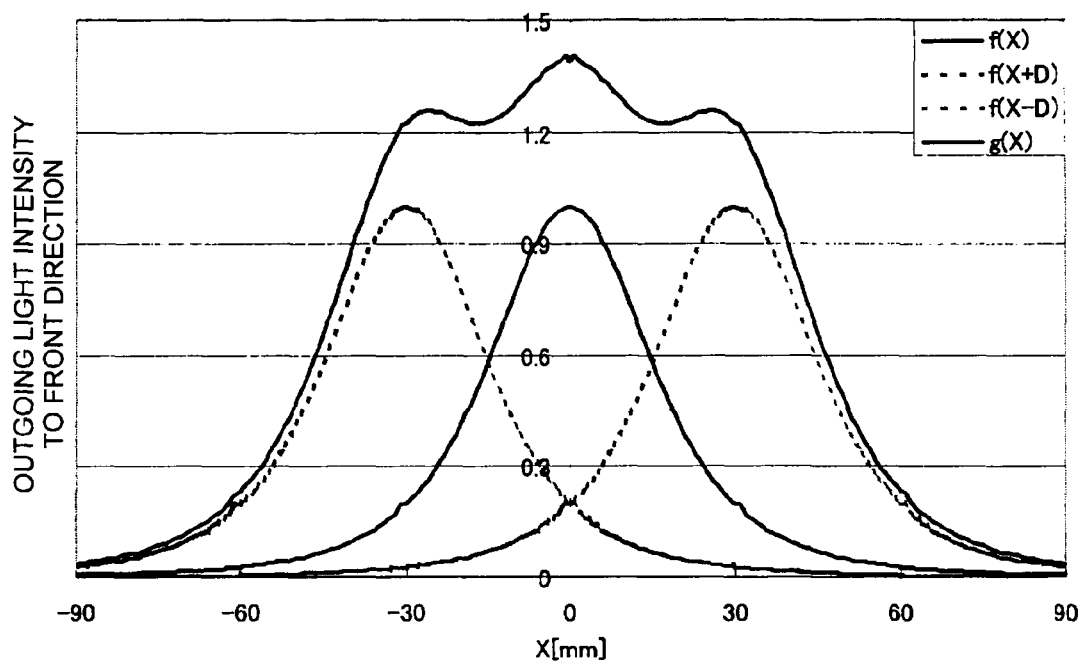
FIG. 9 is a view showing f(X) and g(X) corresponding thereto of the lighting device shown in FIG. 7.

In FIG. 8, an example is shown for a distribution of the outgoing light intensity toward the front direction in the X direction by light from a given one linear light source of the lighting device according to the present invention in which linear light sources are arranged with D=30 mm as in FIG. 7 and a different light control member is used. In this example, it is $X_{min}=-D$ and $X_{max}=D$. As light with a given incident angle or more does not travel to the front depending on the shape of the convex portion, the distribution is that the outgoing light intensity drastically decreases in the part which is certain distance away from the linear light sources as in this way. With such shape, the outgoing light intensity toward the front direction is determined by the total of only three adjacent linear light sources, thus g(X) is most desirable to be constant. At this time, light is output toward the front direction in the range of $X_{min}$ to $X_{max}$ and the distribution thereof is f(X). When comparing the case of $X_{min}=-3D$ and $X_{max}=3D$ which is shown in FIG. 7 and the case of $X_{min}=-D$ and $X_{max}=D$ which is shown in FIG. 8, the distribution of the outgoing light intensity toward the front direction is determined by allocation of the angle Φ of the gradient of the slope because the convex portion width is limited. The front luminance improves for the convex portion shape formed of the angle Φ which turns only light entered in the range of $-D<X<D$ to the front without having the angle Φ which turns light from distant to the front as shown in FIG. 8, rather than having a gradient angle for turning light with weak energy to the front direction that enters to an oblique direction from distant as shown in FIG. 7. Reducing the width of $X_{max}$ to $X_{min}$ produces an effect of increasing the outgoing light ratio toward the front direction by turning stronger light efficiently to the front.

On the other hand, increasing the width of $X_{max}$ to $X_{min}$ produces an effect of increasing the outgoing light ratio toward the front direction by turning light of a distant linear light source to the front. Therefore, in order to increase the front luminance, the width of $X_{max}$ to $X_{min}$ is desirably in the appropriate range. Although a desirable width of $X_{max}$ to $X_{min}$ changes according to f(X), the range of X in which the outgoing light intensity is 1/2 or more of the maximum value can be a guide, for example. If the range is large, it is desirable to have a comparative larger width for $X_{max}$ to $X_{min}$, and if it is small, it is desirable to have a small width. By preferably determining the width of $X_{max}$ to $X_{min}$, the front luminance can be increased.

Figure 10:
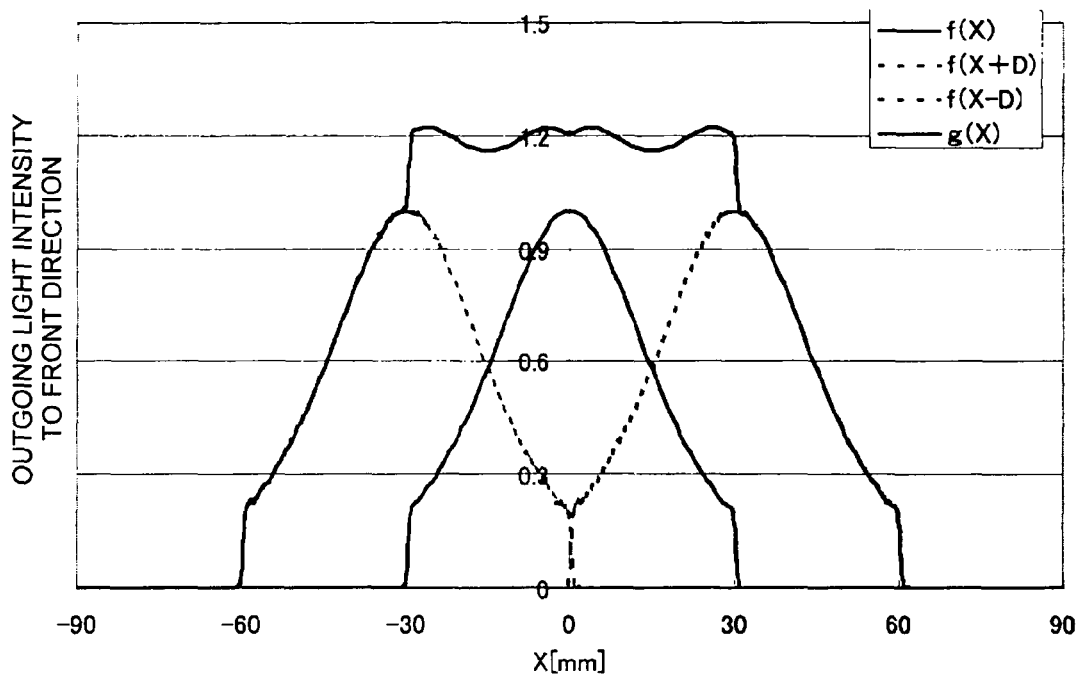
FIG. 10 is a view showing f(X) and g(X) corresponding thereto of the lighting device shown in FIG. 8.

FIG. 10 shows g(X) of the lighting device in which f(X) was shown in FIG. 8. As already shown, if g(X) is constant in the range of $-D/2 \leqq X \leqq D/2$, which is one cycle of the linear light source, the luminance non-uniformity in the front direction is eliminated. Further, if $X_{min}$ and $X_{max}$ are the optimal, light with strong energy near the linear light sources is turned to the front, thus the luminance in the front direction further increases.

The distribution of the outgoing light intensity toward the front direction can be evaluated by measuring the distribution of the front luminance. The distribution of the front luminance is measured by moving a luminance meter by regular interval in the X direction while keeping the distance between the luminance meter and the measuring point by the emission surface side of the light control member. Moreover, the outgoing light ratio toward the front direction is measured as follows.

Firstly, the luminance of a measuring point is measured with different angles. At this time, the angle is changed along the normal direction of the principal surface of the light control member and the cross-section which is parallel to the X axis direction. At this time, the distance between the luminance meter and the measuring point in the emission surface side of the light control member is kept constant.

Next, the obtained luminance value for each angle is converted into a value of energy so as to calculate the ratio of energy emitted within 30 degrees of the front direction, which is the normal direction of the principal surface of the light control member, to all emission energy.

The arrangement order of areas $-N$ to $N$ does not necessarily need to be along the X axis. However, if it is not along the X axis, inflection point exists in the convex portion depending on the arrangement of each area and before reaching to the slope of the convex portion with the angle $\Phi_i$ which turns light entered at the angle $\Phi_i$ to the front, light reaches to a slope with a different angle and light beam direction changes by refraction or reflection, thus the light may not reach to the slope with the angle $\Phi_i$ or reach to a slope with the angle $\Phi_i$ at an undesirable angle $\Phi_i$. Then it becomes difficult to control emission direction of light and the performance may become insufficient. If the areas of $-N$ to $N$ are arranged in order of the position coordinate of the X axis, the shape of the convex portion will usually have no inflection point and the entire convex portion is formed to be almost convex shape. With such shape, usually light will not reach to an area over a different convex portion before reaching to an area over a desired convex portion and thereby to change the direction of light beam by reflection or refraction, thus it is easy to control the light beam direction and is advantageous.

Moreover, it is a characteristic of the lighting device according to the present invention that the width $a_i$ of each area of the convex portion in the X direction is in proportional to $f(X_i+T \cdot \tan \beta_i) \cdot \cos \Phi_i \cos \beta_i / \cos \alpha_i / \cos(\Phi_i - \beta_i)$. Although preferable width may slightly shift due to the influence of the height from the bottom part to the surface of the convex portion, there is no large influence.

Figure 12:
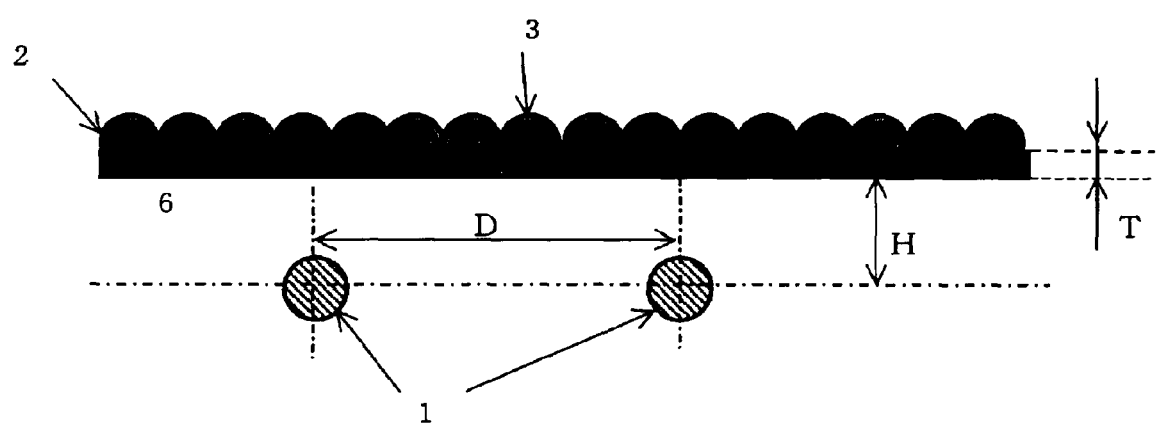
FIG. 12 is a view showing the arrangement of a light control member and linear light sources that can be used in the present invention.

Here, FIG. 12 is a cross-sectional diagram showing the arrangement of the light control member 2 and the linear light sources 1. In the drawing, a thickness T from an incident surface 6 to the bottom part of the convex portion, a distance H from the center of the linear light sources 1 to the incident surface 6 of the light control member and a distance D between centers of the linear light sources 1 are shown. The thickness T from the incident surface 6 to the convex portion bottom is desirably 1 mm to 3 mm. If T is small, it is desirable as the thickness of the light control member is thin and the thickness as the lighting device is thin, however if it is too thin, the strength is low and bending is generated, thus the outgoing light direction changes and this disables to control, thereby generating luminance non-uniformity in the front direction. Moreover, dynamic strength may become weak and it may be damaged. Further, if it is too thick conversely, the thickness of the lighting device becomes thick and this is against the request of thinner shape, which is not desirable.

Moreover, N is desirably 2 or more. If N is large, the convex portion has a complicated shape with many gradients. With many gradients, the control of outgoing light toward the front direction can be efficiently and accurately performed, and thus the uniformity of the distribution of the outgoing light intensity toward the front direction is high. N is better to be larger in light of accuracy but if it is too large, the shape becomes too complicated and difficult to manufacture. N is desirably 100 or less in terms of the ease of manufacture and further desirable to be 10 or less.

Figure 11:
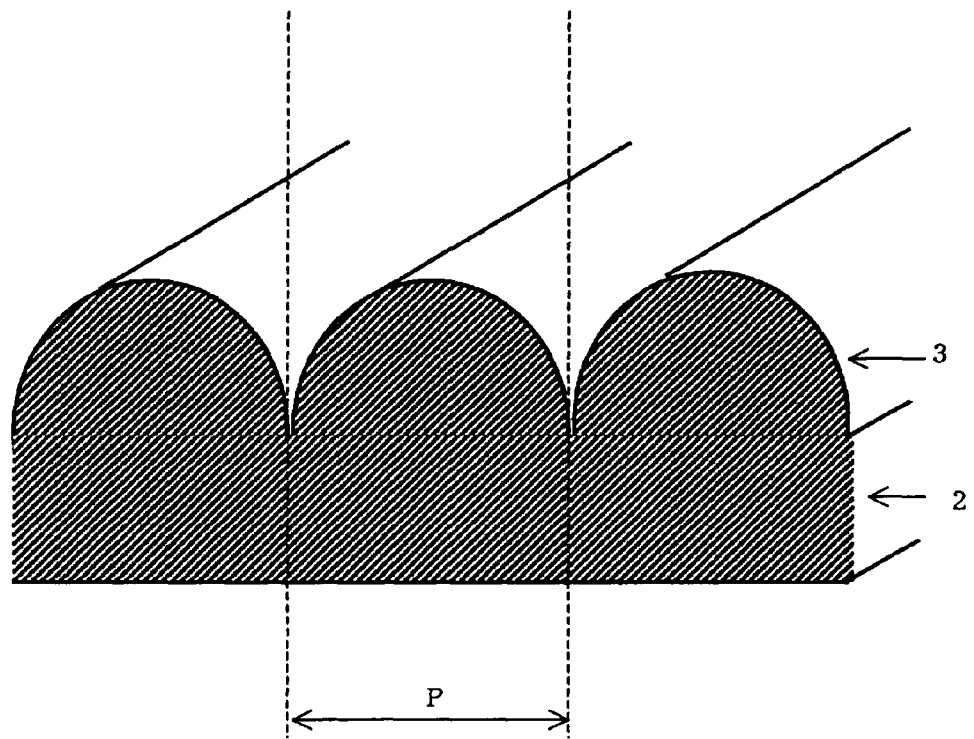
FIG. 11 is a view showing an example of a cross-sectional shape of a light control member in the X direction when shapes of all areas of a convex portion are approximated to a curve.

The shape of at least one pair of adjacent areas among the areas forming the convex portion may be approximated to a curve. Moreover, the shapes of two or more pairs of adjacent areas may be approximated to a curve. Furthermore, the shapes of three or more adjacent areas may be approximated to a curve or the shape of the entire convex portion may be approximated to a curve. FIG. 11 is a view showing an example of a cross-sectional shape of the light control member in the X direction when approximating the shape of the entire areas of the convex portion to a curve. When approximating shapes of many areas to a curve, effects by approximating the shape of adjacent areas further increases such as smoothing the distribution of the outgoing light intensity toward the front direction and the distribution of outgoing light angle, being easy to shape and hard to damage, which is desirable. There is no limit especially as an approximation method to a curve, and usually well known methods such as least square method, spline interpolation method and Lagrange interpolation method can be used. At least one point is selected from an area to be approximated for the point used for approximation. Usually, points more than the number of areas to approximate are taken. For example, contact points between both ends of continuous plurality of areas and each area can be selected. In addition, middle points of each area can be used for approximation.

If the ratio of light output in an angle within 30 degrees from the front direction, which is the normal direction of the emission surface, in a cross-section parallel to the X direction and the normal direction of the principal surface of the light control member, is 50% or more, it is a lighting device with high front luminance. In display devices such as a personal computer with which high front luminance is demanded, it is more desirable to be 60% or more and further desirable to be 80% or more. As for display devices such as a lighting signboard with which wide view angle is demanded, if the outgoing light ratio toward the front direction is too high, light turns only toward the front direction and the view angle is narrowed, which is not desirable. Therefore, 60% to 80% is desirable.

As shown in FIG. 12, in the lighting device of the present invention, the linear light sources are placed in the same flat surface in parallel to the Y direction at the interval D, and the incident surface of the light control member is placed to the position with H distance apart. Here, it is desirable if D is smaller as the distribution of the outgoing light intensity toward the front direction becomes constant. However, if D is too small, in case of the same screen size, the number of the linear light sources and energy consumption increase, which is not desirable. The desirable range of D is 10 mm to 100 mm and further desirable range is 15 mm to 50 mm. Moreover, it is desirable as H is larger because the distribution of outgoing light intensity toward the front direction becomes constant.

However, if H is too large, the thickness becomes thick and it is against the thinner shape which is requested as a lighting device, thus it is not desirable. The desirable range of H is 5 mm to 50 mm and further desirable range is 10 mm to 30 mm. Furthermore, the ratio D/H is desirably 0.5 to 3 for the balance between D and H, and further desirable to be 1 to 2.

The height of the convex portion formed over the emission surface is desirably 1 μm to 500 μm. If exceeding 500 μm, the convex portion is easily recognized when observing the emission surface and this causes to reduce the quality. Moreover, with 1 μm or less, coloring will occur by diffraction phenomenon of light and this causes to reduce the quality. Furthermore, in the image display device of the present invention which provided with a transmissive liquid crystal panel as a transmissive display device, the width P of the convex portion in the X direction is desirably 1/100 to 1/1.5 of the pixel pitch of the liquid crystal. With the width more than this, moiré with the liquid crystal panel is generated and image quality will be reduced greatly.

Although there is no limitation in shaping the convex portions, there are for example extrusion molding, injection molding and 2P molding using an ultraviolet curing type resin. The molding method may be appropriately used in consideration of the required shape and mass productivity. Extrusion molding is suitable if the principal surface size is large.

Moreover, if using a planar metallic mold instead of a roll mold, it is molded to a resin once and the resin is electroformed to form a stamper. The light control member is obtained by performing an injection molding using the planar female mold or stamper being cut. Furthermore, when using this planar metallic mold, after coating 2P resin to the planar female mold, a transparent sheet to be a base material is laminated and the 2P resin is hardened by ultraviolet. After that, the light control member can also be obtained by separating the 2P resin from the planar female mold.

Moreover, usually the convex portions are continuously arranged, however a flat part may be provided between the convex portions. The convex portion of the metallic mold is hard to be deformed by providing the flat part, which is advantageous. Moreover, since the light immediately above the linear light sources is emitted toward the front direction, it is advantageous when increasing only the luminance immediately above the linear light sources. On the contrary, as for the shape without the flat part, since all the light can be controlled by the angle of the slope of the convex portion, the distribution of the outgoing light intensity toward the front direction is uniformed.

Moreover, the convex portions are desirably the same shape. As the optical property of the light control member is uniform, an alignment is unnecessary and it is possible to quickly respond to a change in display size, the number of linear light sources and arrangement, thus the lighting device can be manufactured with high productivity.

Moreover, the light control member can be desirably used with the material usually used for a base material of an optical material. Usually a translucent thermoplastic resin is used. For example, there are methacrylate resin, polystyrene resin, polycarbonate resin, cycloolefin resin, methacrylate-styrene copolymer resin and cycloolefin-alkene copolymer resin.

Moreover, by providing a light diffusing means, the uniformity of luminance can be increased further.

As the light diffusing means, there is a method to provide random concave-convex such as crimp and emboss to the principal surface of the plate shape member, a method to disperse a small amount of light diffusion material inside the structure, a method to provide a diffusion sheet to the incident and/or emission side of the light control member and a method combining these methods.

The random concave-convex can be formed by coating a solvent which is dispersed with particulates or by transferring from a mold with concave-convex being formed. These are desirably provided to the emission surface side than the light source side and can be provided to the light source side and/or the emission surface side of the light control member. The degree of the concave-convex is that the arithmetic average roughness Ra is desirably 3 μm or less. If it is larger than this, the diffusion effect is too large and the front luminance decreases. If the incident surface is flat, when light entered from various directions enters inside the light control member, the light is collected near the front to some extent by refraction at the incident surface. As a result, the outgoing light ratio toward the front direction increases. For example, if the refractive index of the light control member is 1.55, the light is collected in the angle range within 40 degrees from the normal direction of the incident surface. If providing concave-convex to the incident surface, the light entered to the light control member is refracted and travels to wide angle, thus the effect of increasing the outgoing light ratio toward the front direction may decrease. Moreover, if providing fine concave-convex to the emission surface, by refraction at the concave-convex surface, the effect of increasing the outgoing light ratio toward the front direction may also decreases. It can be adjusted to a desirable range depending on the usage from the balance between obtained diffusibility, effect of eliminating luminance non-uniformity and front luminance.

When dispersing the light diffusion material inside the structure, the concentration of the light diffusion material can be suppressed comparatively low. This enables to suppress the decrease in the transmission factor and front luminance. Although the concentration of preferable light diffusion material differs depending on the material, the transmittance and Hayes can be used as a guide. It is desirable to use with the concentration where the transmittance is 80% or more and Hayes is 50% or less. For example, to MS polymer with 2 mm thickness, a molding plate containing 0.04 Wt % of siloxane type polymer particles (for example Tospearl 120: manufactured by GE Toshiba Silicones Co., Ltd., number average particle diameter 2 μm, CV value 3%) can be used.

The light control member of the present invention can also be made using several different materials if necessary. For example, after forming the convex portions over the film, a supporting plate may be mounted to the film surface having no convex portion formed so as to make the light control member. This enables to reduce the amount of the expensive ultraviolet curing resin by using general translucent resin except near the convex portions when using the ultraviolet curing resin for forming the convex portions. Moreover, a small amount of light diffusion material may be dispersed inside or coated to the surface. By using the light diffusion material, the diffusibility of emitting light as well as luminance uniformity can be increased. When coating the light diffusion material, it is more preferable to coat to the emission surface side. As the light diffusion material, inorganic particulates and bridged organic particulates which are used in a related art for a light diffusion plate and a diffusion sheet can be used. Diffusibility same or more than the general light diffusion plate of a related art can be achieved with smaller amount of usage and also the transparency is extremely high.

When using the supporting plate, it is not a problem if the base material part of the light control member is several kinds of plates with different refractive indexes. In this case, $a_i$ can be calculated by deriving a formula equivalent to the formula (7) in accordance with the views explained so far. However, if the variation in each refractive index is 90% or less, by approximating according to a ratio of each plate thickness, the refractive index $n_2$ can be led by the formula (7). For example, if the base material part is formed of three plates with the refractive index of n', n'' and n''' and the thickness of T', T'' and T''', $n_2$ can be approximated by the value of (n'*T'+n''*T''+n'''*T''')/T. Moreover, if light diffusion materials with different refractive indexes are dispersed, the amount of usage of the light diffusion materials is extremely small in the present invention, thus the influence of the refractive index need not to be considered.

Note that the lighting device of the present invention includes a backlight of an image display device, a lighting equipment and a luminescent device. Moreover, the image display device of the present invention includes a display module combining a lighting device and a transmissive display device and a device having at least an image display function such as television and personal computer monitor using this display module.

Moreover, as the image display device of the present invention, it is realized by a method such as using a transmissive liquid display device over a lighting device and although there is no special limitation, there is a transmissive liquid crystal panel as a transmissive display device and an image display device with excellent luminance uniformity in the display surface can be obtained.

Second Embodiment

In the configuration of the first embodiment according to the present invention, the ridge form convex portions formed to the emission surface of the light control member can be formed from a material with refractive index of 1.58 or more. As the material with high refractive index of 1.58 or more, there are for example, methacrylate resin, polystyrene resin, polycarbonate resin, cycloolefin resin, methacrylate-styrene copolymer resin, cycloolefin-alkene copolymer resin and polyester resin.

Furthermore, in order to obtain the refractive index of 1.58 or more, which is required in the present invention, various monomers can be selected. For example, as a methacrylate monomer copolymer like methacrylate resin or methacrylate-styrene copolymer resin, aromatic methacrylate like α-naphthyl methacrylate and halogenated aromatic methacrylate monomer like p-bromophenyl methacrylate and pentachlorophenyl methacrylate can be preferably used. Moreover, as a styrene type monomer copolymer like polystyrene resin or methacrylate-styrene copolymer resin, beside styrene, there are halogenated styrene like o-chlorostyrene and alkylated styrene like p-methylstyrene as a monomer that can be used. As the polyester resin, diol having bulky functional groups such as a fluorene group can be used as a copolymerized monomer. These monomers can be individually used or copolymerized.

Third Embodiment

In the first embodiment of the present invention, the light diffusion means can be provided to the light control member in order to increase the luminance uniformity, however a light beam direction conversion unit for converting the direction of light beam can be provided as an example of the light diffusion means.

Moreover, a small amount of light beam direction conversion material can be dispersed inside or coated to the surface as the light beam direction conversion unit. By using the light beam direction conversion material, the diffusibility of emitting light as well as the luminance uniformity can be increased. The same material as the light beam direction conversion material may be coated to the emission surface side, however in this case, the light beam direction conversion unit must be separately provided to the light source side than the outgoing light control unit. As the light diffusion material, inorganic particulates and bridged organic particulates which are used in a related art for a light diffusion plate and a diffusion sheet can be used. Diffusibility same or more than the general light diffusion plate of a related art can be achieved with smaller amount of usage and also the transparency is extremely high. Moreover, if the light beam direction conversion material is dispersed, the amount of usage is extremely small in the third embodiment of the present invention.

The light beam direction conversion material used by the light control member of the third embodiment according to the present invention is that to the base material part 100 parts per mass which forms the light control member, the light beam direction conversion material of 0.01 to 1 parts per mass, preferably 0.05 to 0.07 parts per mass and further preferably 0.1 to 0.5 parts per mass is contained. If the content is less than 0.01 parts per mass to the base material part 100 parts per mass, the light diffusibility is not enough and if exceeding 1 parts per mass, sufficient total light transmittance cannot be obtained, thereby disabling to achieve sufficient brightness when using the light control member to a lighting device or the like, which is not preferable.

Moreover, as for the particle diameter of the light beam direction conversion material, the average particle diameter is in the range of 1 to 50 μm and preferably in the range of 2 to 30 μm. If the average particle diameter of the light beam direction conversion material is less than 1 μm, the light control member obtained by dispersing it to the base material part selectively scatters short wavelength light. Thus transmitted light becomes yellowish, which is not preferable. On the other hand, if the average particle diameter of the light beam direction conversion material exceeds 50 μm, the light control member obtained by dispersing to the base material part will have reduced light diffusibility and the light diffusion agent is easily seen as a foreign matter when light transmits the resin, which is not preferable. As the shape of the light beam direction conversion material, ellipse to sphere shape is preferable and sphere shape is more preferable.

Note that the average particle diameter in this specification means an average particle diameter obtained by actual measurement using photographs obtained by electron microscope observation as described later.

As the light beam direction conversion material, inorganic and/or organic type transparent particulates having a different refractive index from the transparent resin of the base material is usually used. As for the difference between the refractive index of the light beam direction conversion material and that of the base material, the absolute value thereof is preferably 0.005 to 0.08 and 0.01 to 0.07 and further preferably 0.02 to 0.06. If the refractive index difference is less than 0.005, the light diffusibility is not enough and if exceeding 0.08, light diffusibility is not enough and if exceeding 0.08, sufficient total light transmittance cannot be obtained, thereby disabling to achieve sufficient brightness when using the light control member to a lighting device or the like, which is not preferable. Note that in the third embodiment of the present invention, so-called internal diffusibility can be given by the refractive index difference between the light beam direction conversion material and the base material as described above.

However by forming the surface concave-convex by embossing the light beam direction conversion material to the base material surface, so-called external diffusibility can also be given.

Moreover, the beam direction conversion material used by the third embodiment of the present invention is preferably the one with lower refractive index than the refractive index of the base material resin. If the refractive index of the light beam direction conversion material is larger than the refractive index of the base material, although the light diffusibility becomes high, the difference of the Abbe number between the base material resin and the light control member becomes large and difference in colors of diffused light is easily generated depending on the angle to view, which is not preferable. Therefore, generally the difference in the refractive index between the base material and the light control member is preferably not too large and not too small.

As the inorganic type light beam direction conversion material, there are for example calcium carbonate, barium sulfate, titanium oxide, aluminum hydroxide, silica, glass, talc, mica, white carbon, magnesium oxide and zinc oxide. They may be applied with a surface treatment with fatty acid etc., for example. As the organic type light beam direction conversion material, there are for example styrene type polymer particles, acrylic type polymer particles, siloxane type polymer particles and fluorine type polymer particles. High heat resistant light diffusion agent in which 3 mass % reduction temperature in air is 250 degrees Celsius or more and bridged polymer particles with gel fraction when dissolved in acetone is 10% or more are preferably used. Among these light beam direction conversion materials, it is preferable to use silica, glass, acrylic type polymer particles and siloxane type polymer particles and more preferable to use acrylic type polymer particles and siloxane type polymer particles. Moreover, two or more kinds of these light beam direction conversion materials can be used as necessary.

There is no limitation especially as a method of mixing the base material and the light beam direction conversion material used by the light control member of the third embodiment according to the present invention. There are following methods to be adapted for example; a method to prepare the light control member as a form of pellets etc. by mixing the light beam direction conversion material in advance to base material pellets, molding this by extrusion or injection; a method to prepare the light control member as a form of pellets etc. by adding the light beam direction conversion material when molding the base material by extrusion or injection and mold it; and a method to prepare the light control member as a form of pellets etc. by after master batching the base material and the light beam direction conversion material once, again molding the base material and the master matched product by extrusion or injection so as to have a desired composition quantity.

As for the ratio in which light entered from the light sources to the incident surface passes the light beam direction conversion unit and reaches to the outgoing light control unit, this value can be calculated by measuring the total light transmittance of the light beam direction conversion material, and if the light beam direction control of the outgoing light control unit can be predicted, the total light transmittance of the light control member can be directly measured to calculate.

Fourth Embodiment

Figure 20:
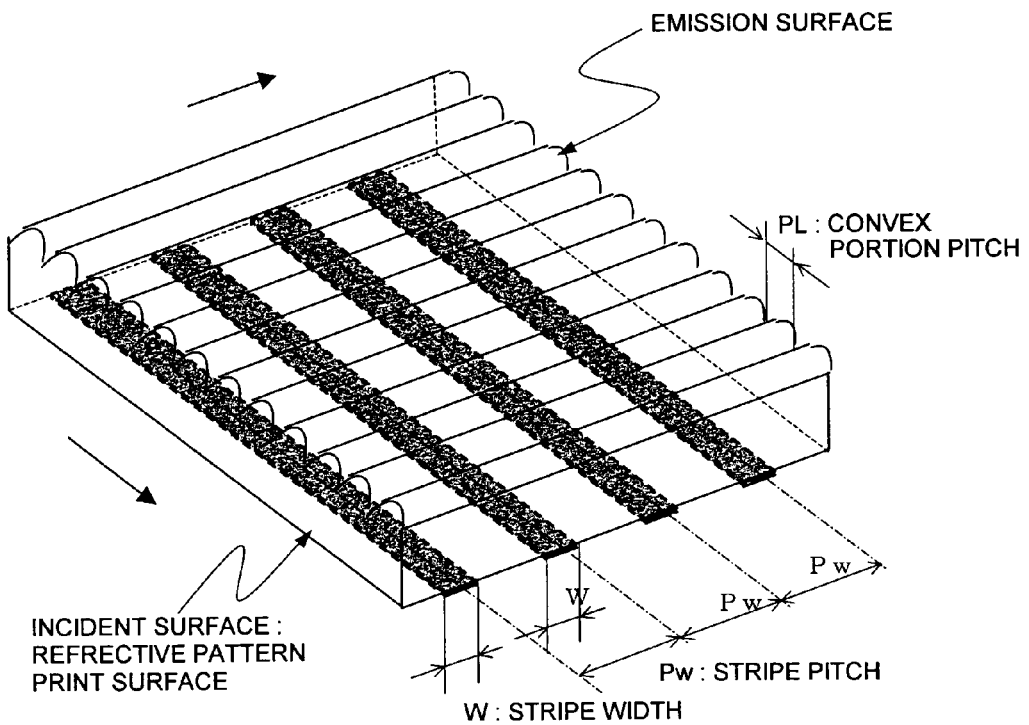
FIG. 20 is a view showing an orthogonal stripe form reflective pattern of a light control member surface according to a fourth embodiment of the present invention.
Figure 21:
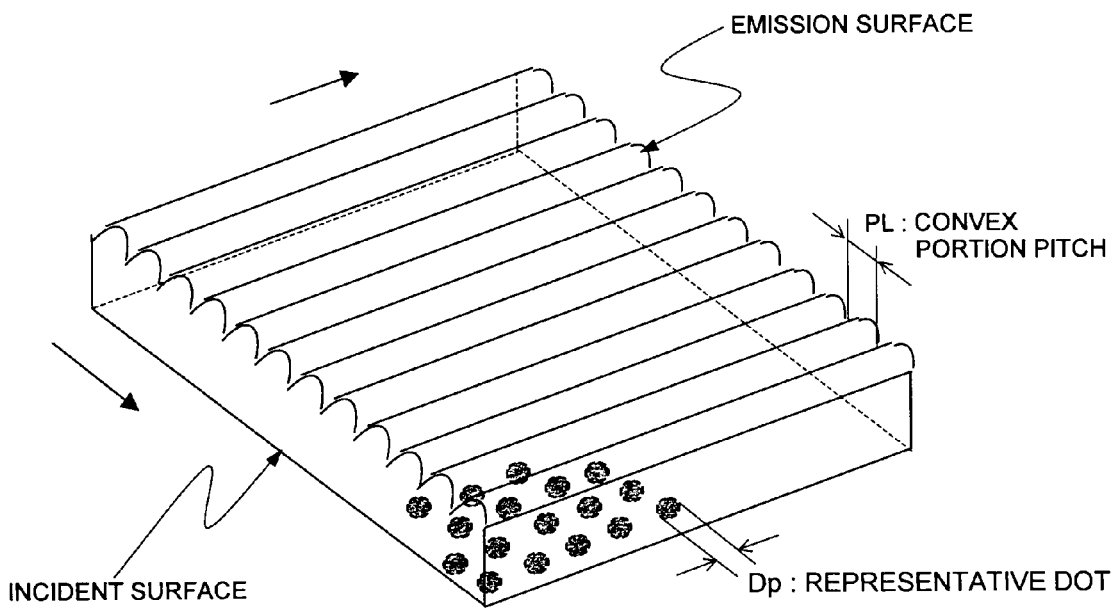
FIG. 21 is a view showing a dot form reflective pattern of a light control member surface according to the fourth embodiment of the present invention.
Figure 22:
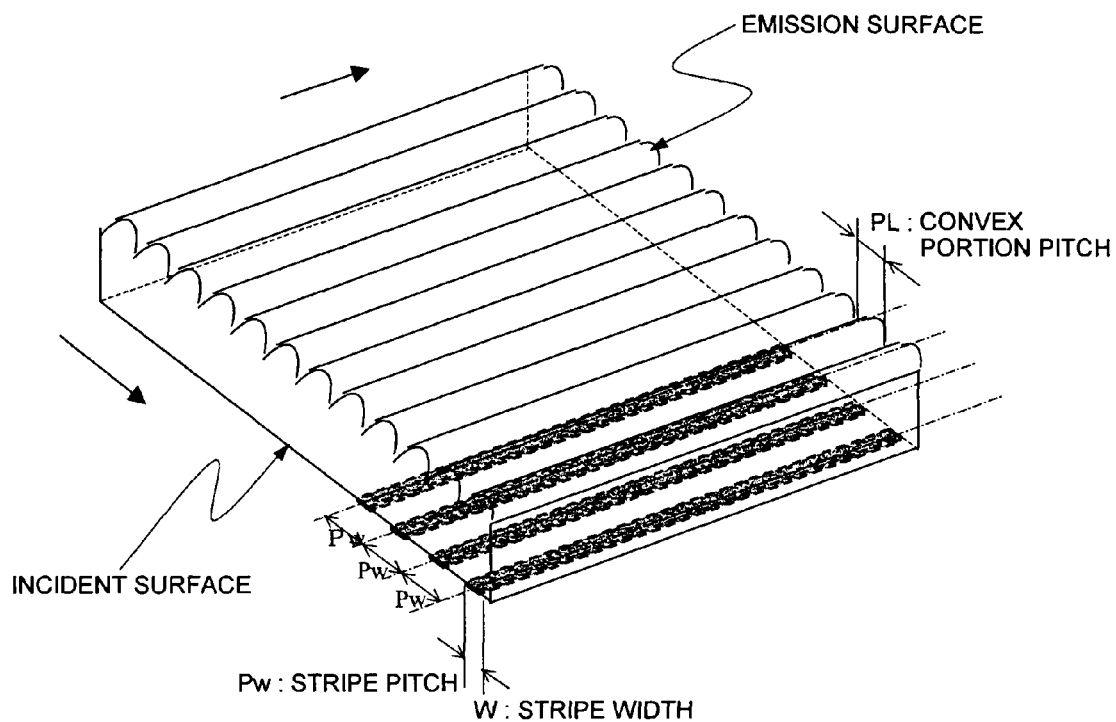
FIG. 22 is a view showing a same direction stripe form reflective pattern of a light control member surface according to the fourth embodiment of the present invention.
Figure 23:
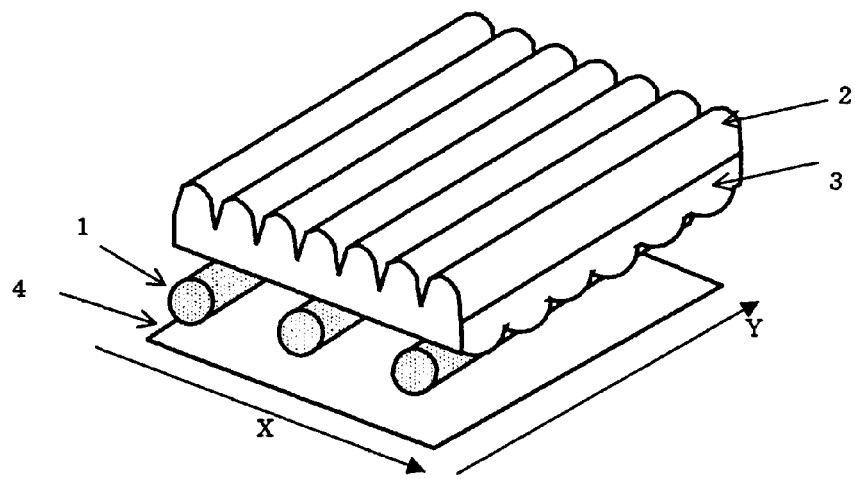
FIG. 23 is a schematic diagram of a preferable example of a lighting device according to a fifth embodiment of the present invention.

A reflective member is formed to the surface of the incident surface of the abovementioned light control member. The optical property of the incident surface is uniform because the reflective member has a regular reflective pattern, which is preferable. FIGS. 20 to 22 show examples of reflective patterns of reflective members when ridge form convex portions are formed in parallel to the emission surface of the light control member.

In this examples, stripe and dot forms are mentioned as the reflective pattern. The reflective pattern may be parallel to the ridge form convex portions of the emission surface as in FIG. 22 or may not be parallel. FIG. 20 shows an example in which the direction of the reflective pattern is orthogonal to that of the ridge form convex portions. For controlling the generation of moiré between the reflective pattern and streak form convex portions, the shape of the reflective pattern is desirable in order of orthogonal stripe, dot and same direction stripes form.

In case of the stripe pattern orthogonal to the ridge form convex portions, there is small degradation in the performance of luminance non-uniformity, which is a feature of the present invention. Moreover if the stripe width is ¼ or less of an emission lens pitch, the stripes will not be recognized as dark lines in the emission surface after transmission. Therefore, it is also advantageous for productivity as the stripe width can be printed comparatively wide.

The effect of improvement in front luminance appears by optimizing the reflection factor of reflective ink and aperture ratio of print pattern. That is, if the reflection factor of the reflective ink is low, or if the aperture ratio of the reflective pattern printing is low, not only the loss in repeated reflection between a backside reflective plate and the reflective pattern print increases to thereby reduce the front luminance, but the spread of view angle itself is lost as a result. More specifically, the effective reflection factor of the reflective pattern to incident light can be 90% or more and the aperture ratio of the portion in the incident surface not coated with the reflective ink can be 85% or more and 95% or less. Such relationship of the reflection factor and the aperture ratio indicates an appropriate range that can increase the front luminance without losing the luminance non-uniformity performance.

Fifth Embodiment

The first light beam direction control means is placed to the emission surface side of the arranged linear light sources, the principal surface of the structure forming the first light beam direction control means is parallel to the virtual flat surface where the linear light sources are arranged, a plurality of convex portions are formed to the emission surface side or the surface by the side where light enters, and a ridgeline of the ridge forms, which is the top part of the convex portions, is formed in parallel to the X direction and also arranged along the Y direction.

The reflective plate 4 placed to the backside is able to effectively use light by reflecting light traveling from the linear light sources 1 to the backside and further reflecting light reflected at the first light beam control means and the second light beam direction control means and traveling to the backside to the emission side, thus the light utilization efficiency is high.

Either of the first light beam direction control means or the second light beam direction control means is preferably in the plate shape structure, and further the member placed to the linear light sources side has preferably plate shape structure. By the member of the linear light sources side being in the plate shape structure, the mechanical strength is increased and thereby enabling to prevent from reducing the optical property caused by warpage. Moreover, when providing the light diffusion means of the plate shape member in order to increase luminance uniformity, if the first light beam direction control means and the second light beam direction control means are in the plate shape structure, they may be in the same plate.

Figure 24:
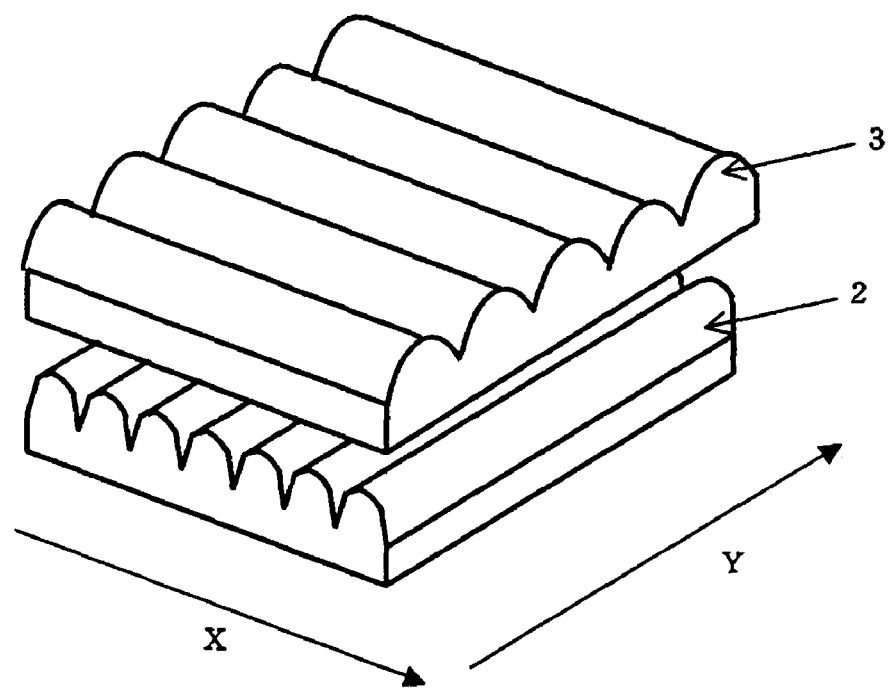
FIG. 24 is a block diagram when placing a structure having a second light beam direction control means placed to an emission surface side in the fifth embodiment of the present invention to the emission surface side of the second light beam direction control means.
Figure 25:
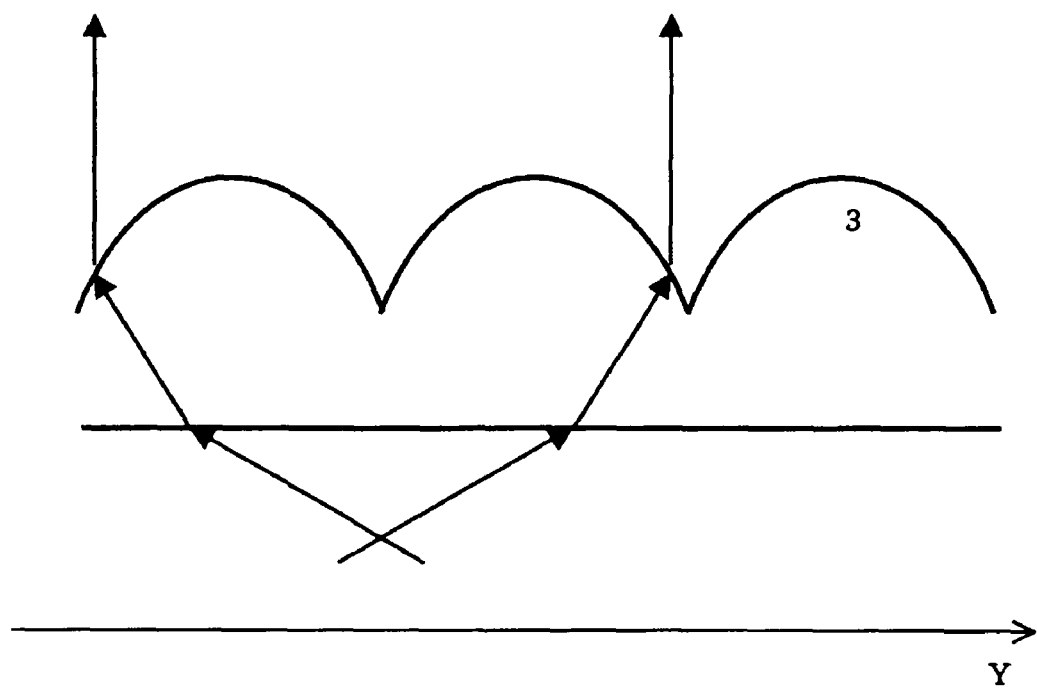
FIG. 25 is a view showing a principle of a light collection effect when placing a first light beam direction control means to the emission surface side in the fifth embodiment of the present invention.

FIG. 24 shows a configuration example in which the second light beam direction control means is in the plate shape structure and the first light beam direction control means is formed of a plurality of ridge form convex portions which are parallel to the X axis of the surface by the emission surface side. In this case, the second light beam direction control means is placed to the light sources side than the first light beam direction control means. In this configuration, the first light beam direction control means may be formed over a plate or a film.

Figure 26:
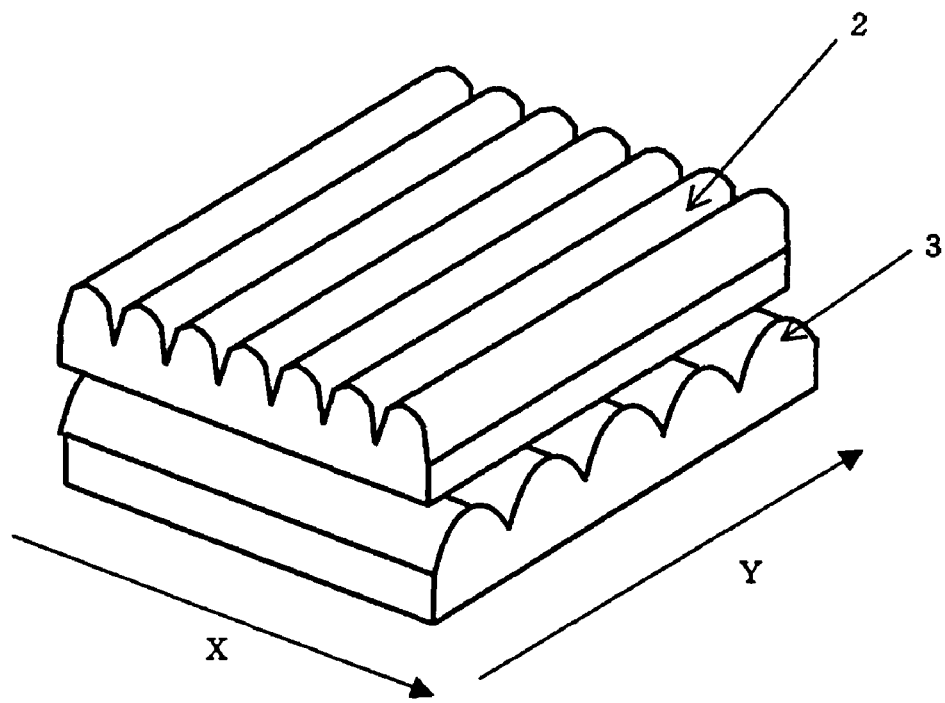
FIG. 26 is a configuration diagram when placing a plate shape structure having the second light beam direction control means placed to the emission surface side in the fifth embodiment of the present invention to an incident surface side of the first light beam direction control means.

Moreover, FIG. 26 shows a configuration example in which the first light beam direction control means is in the plate shape structure and the first light beam direction control means is formed of a plurality of ridge form convex portions which are parallel to the X axis of the surface by the emission surface side of the plate shape structure. In this case, the plate shape structure is placed to the observed side than the first bean direction control means. In this configuration, the second light beam direction control means may be formed over a plate or a film.

Figure 28:
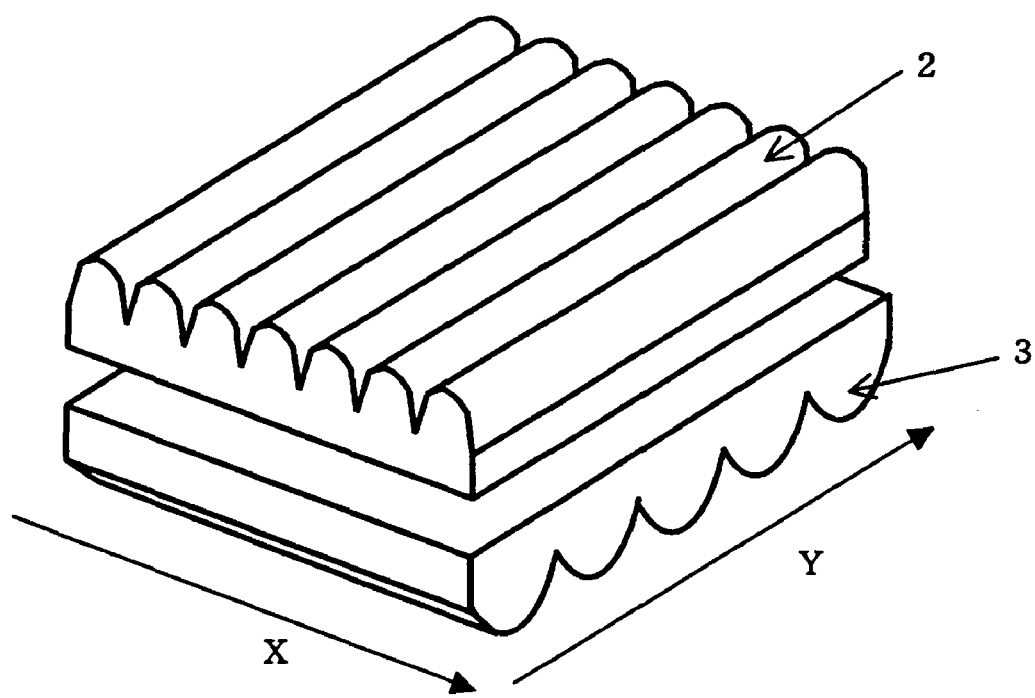
FIG. 28 is a configuration diagram when placing a plate shape structure having the second light beam direction control means placed to the incident surface side in the fifth embodiment of the present invention to the incident surface side of the second light beam direction control means.
Figure 29:
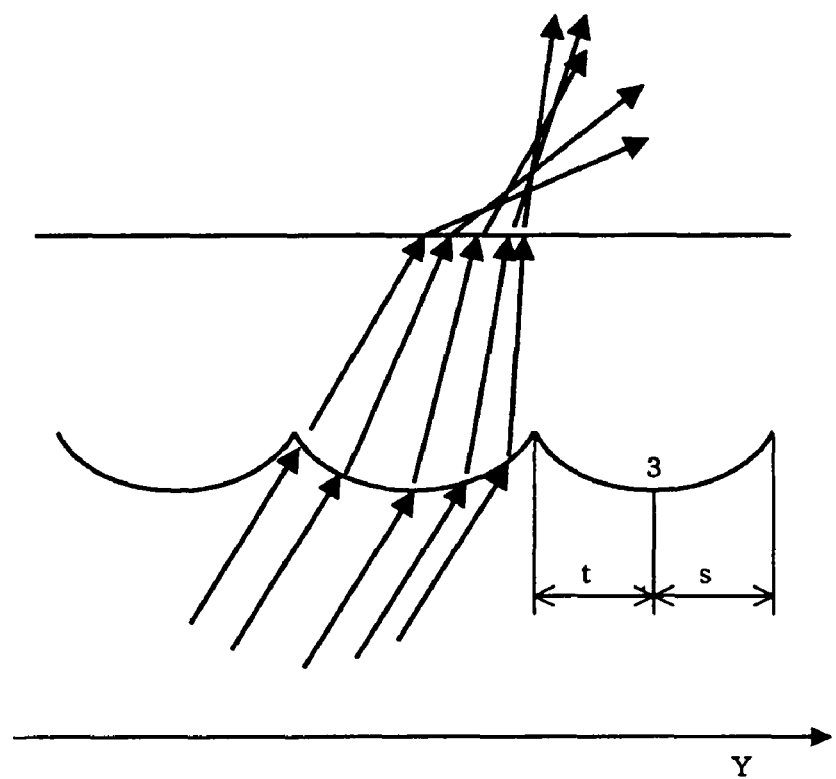
FIG. 29 is a view showing a principle of a light collection effect when placing the first light beam direction control means to the incident surface side in the fifth embodiment of the present invention.

FIG. 28 shows a configuration example in which the first light beam direction control means is in the plate shape structure and the first light beam direction control means is formed of a plurality of ridge form convex portions which are parallel to the X axis of the surface of the plate shape structure where light enters. In this case, the plate shape structure is placed to the light sources side than the first bean direction control means. In this configuration, the second light beam direction control means may be formed over a plate or a film.

Figure 30:
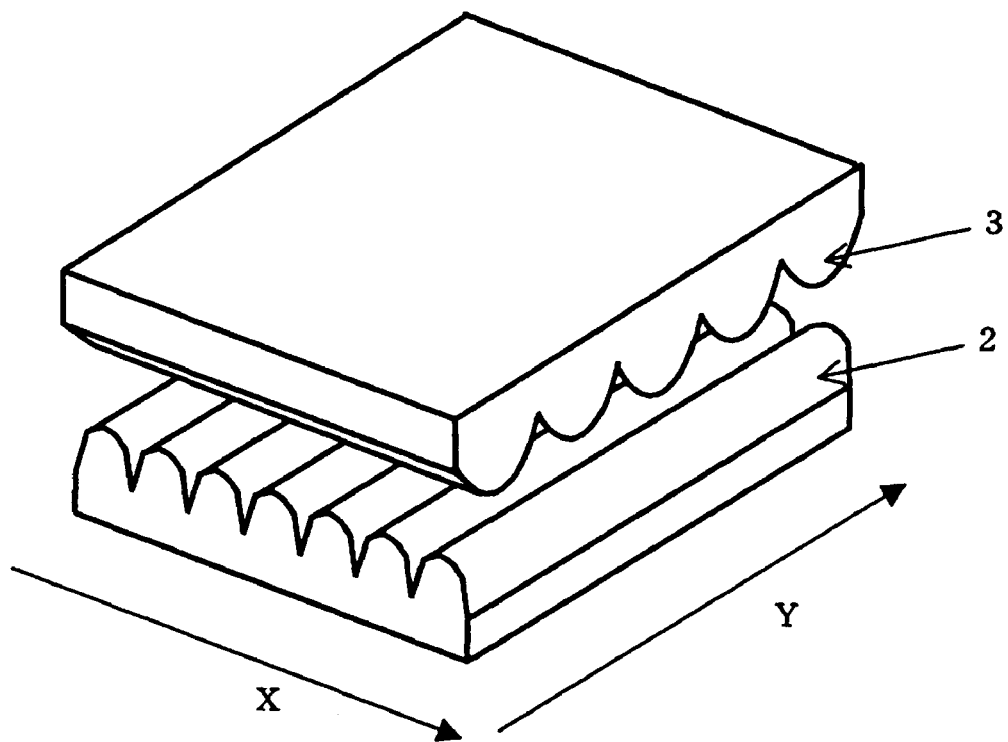
FIG. 30 is a configuration diagram when placing a structure having the second light beam direction control means placed to the incident surface side in the fifth embodiment of the present invention to the emission surface side of the second light beam direction control means.

FIG. 30 shows a configuration example in which the second light beam direction control means is in the plate shape structure and the first light beam direction control means is formed of a plurality of ridge form convex portions which are parallel to the X axis of the surface of the plate shape structure where light enters. In this case, the plate shape structure is placed to the light sources side than the first bean direction control means. In this configuration, the first light beam direction control means may be formed over a plate or a film.

The height of the convex portion of the first light beam direction control means is desirably 1 µm to 500 µm. If exceeding 500 µm, the convex portion is easily recognized when observing the emission surface and this causes to reduce the quality. Moreover, with 1 µm or less, coloring will occur by diffraction phenomenon of light and this causes to reduce the quality. Furthermore, in the image display device of the present invention provided with a transmissive liquid crystal panel as a transmissive display device, the width of the convex portion in the Y direction is desirably 1/100 to 1/1.5 of the Y direction pixel pitch of the liquid crystal. With the width more than this, moiré with the liquid crystal panel is generated and image quality will be reduced greatly.

Moreover, if the first light beam direction control means and the second light beam direction control means are convex portions, the first light beam direction control means and the second light beam direction control means can be desirably used if it is a material usually used as an optical material and generally, a translucent thermoplastic resin is used. There are for example, methacrylate resin, polystyrene resin, polycarbonate resin, cycloolefin resin, methacrylate-styrene copolymer resin and cycloolefin-alkene copolymer resin. Moreover, it is also possible to carry out 2P molding (Photo Polymerization Process) for the first light beam direction control means with an ultraviolet curing resin over a film or a sheet to be the base material.

Furthermore, if the first light beam direction control means or the second light beam direction control means is convex portions and the structure having the convex portions is plate shape, the surface area of the surface where light of the plate shape structure enters and that of the surface where light is emitted are different. If the plate shape structure expands by water absorption or contracts by dehydration, expansion rate or contraction rate differs in the surface where light enters and the surface where light is emitted due to the difference in the surface area, thereby generating warpage in the plate shape structure. The warpage can be reduced by the plate shape structure being formed of a transparent thermoplastic resin with water absorption rate of 0.5 or less under an atmosphere where the temperature is 60 degrees Celsius and humidity is 80%. If water absorption rate exceeds 0.5% under the same condition, the amount of the warpage will be excessive and this causes to reduce the appearance quality.

Moreover, if the ridge form convex portions, which are the first light beam direction control means, are formed to the surface where light of the plate shape structure enters and the ridge form convex portions, which are the second light beam direction control means, are formed to the surface where light of the same plate shape structure is emitted, the difference in the surface area of the surface where light enters and that of the surface where light is emitted becomes small, thus it is advantageous for the warpage. Further, if the direction made by the ridge form convex portions, which are the first light beam direction control means, is orthogonal to the direction made by the ridge form convex portions, which are the second light beam direction control means, the stiffness of the plate shape structure increases, which is more advantageous for the warpage.

Figure 31:
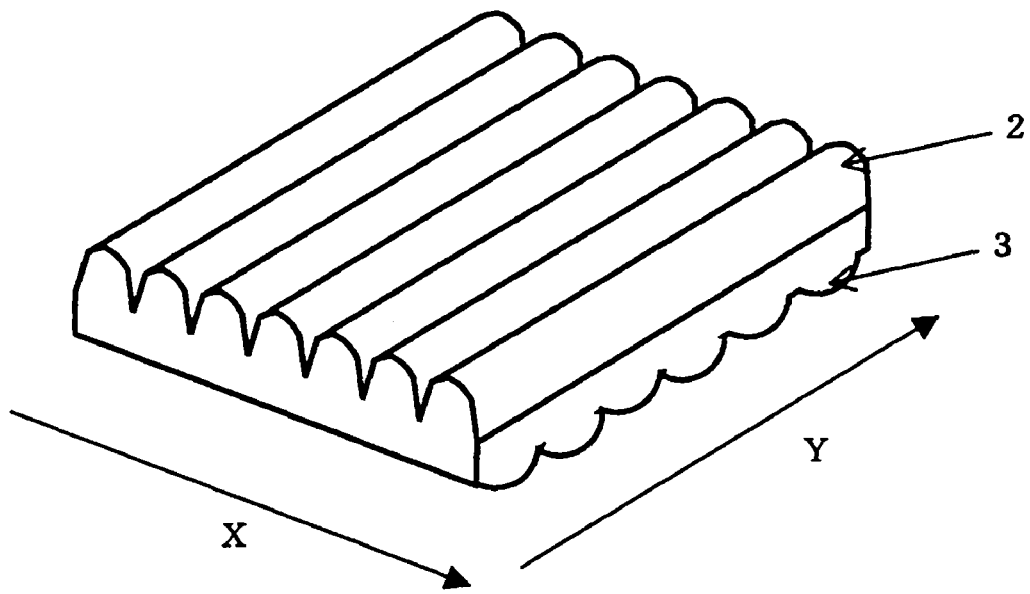
FIG. 31 is a configuration diagram when forming the first light beam direction control means and the second light beam direction means respectively to the incident surface and the emission surface of the same plate shape structure in the fifth embodiment of the present invention.

As shown in FIG. 31, if the first light beam direction control means is the convex portions formed to the surface where light of the plate shape structure enters, it is preferable that the first light beam direction control means is in the same structure as the second light beam direction control means. This removes two interfaces with air as compared to the case in which the first light beam direction control means and the second light beam direction control means are separated, thus the efficiency of emitting light can be improved.

If the first light beam direction control means and the second light beam direction control means are in the same plate shape structure, firstly the plate shape structure for forming the first light beam direction control means or the second light beam direction control means is manufactured and after that, the first light beam direction control means and the second light beam direction control means are formed by 2P molding or the like to the opposite surface thereto.

Furthermore, it is also possible to prepare a female mold of the first light beam direction control means and a female mold of the second light beam direction control means and to simultaneously mold by an injection molding etc.

Figure 32:
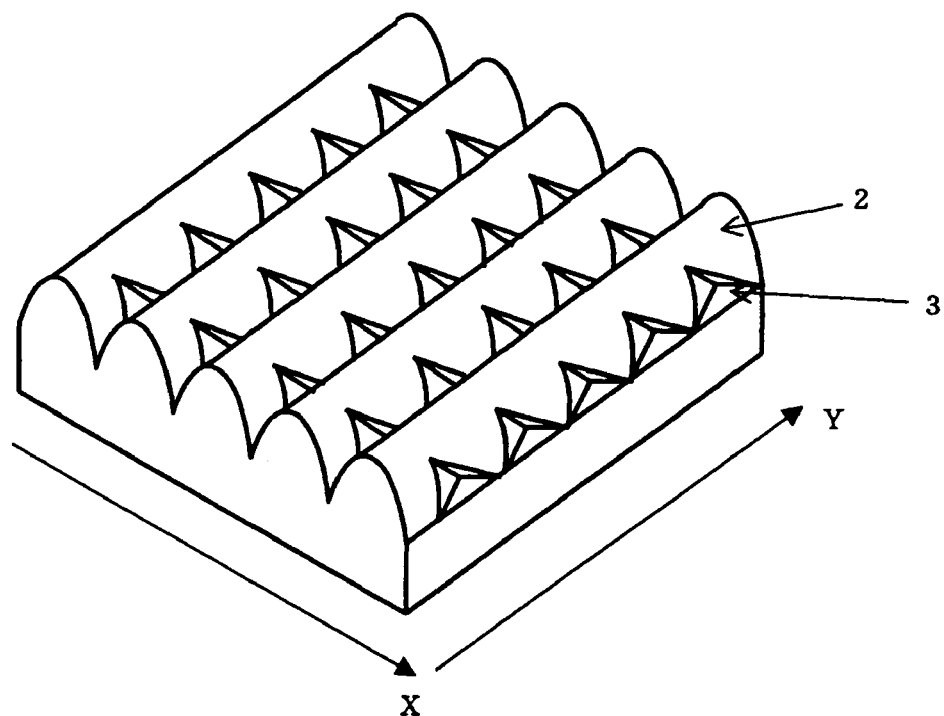
FIG. 32 is a configuration diagram when forming the first light beam direction control means and the second light beam direction means to the emission surface of the same plate shape structure in the fifth embodiment of the present invention.

FIG. 32 shows an example in which the first light beam direction control means and the second light beam direction means are convex portions formed to the surface where light of the same plate shape structure is emitted. As for the first light beam direction control means, the normal direction of the surface of the convex portions is vertical to the X direction and is a portion not vertical to the Y direction which performs direction control of light beam in the Y direction. As for the second light beam direction control means, the normal direction of the surface of the convex portions is vertical to the Y direction and is a portion not vertical to the X direction which performs direction control of light beam in the X direction.

Such configuration can be achieved by firstly manufacturing a female mold having both the first light beam direction control means or the second light beam direction control means is manufactured and then forming the configuration to the surface of the plate shape member by 2P molding or the like.

Furthermore, it is also possible to prepare a female mold and to mold by an injection molding etc. The cross-sectional shape of the second light beam direction control means which is vertical to the Y axis shown in FIG. 32 differs depending on the Y coordinate. Since the elimination principle of a lamp image in the front direction depends on the ratio occupied by the gradient of the second light beam direction control means, an average gradient distribution, which is an average distribution of the gradient of the cross-sectional shape, may be the desired gradient distribution. The desired gradient distribution indicates that it is the same as the case in which the second light beam direction control means is not in the same surface as the first light beam direction control means, which can be for example the abovementioned various shapes.

A light diffusion sheet having a light diffusion function may be provided to the emission surface side of the second light beam direction control means. More uniform front luminance distribution can be obtained from diffusion by the light diffusion sheet.

Figure 27:
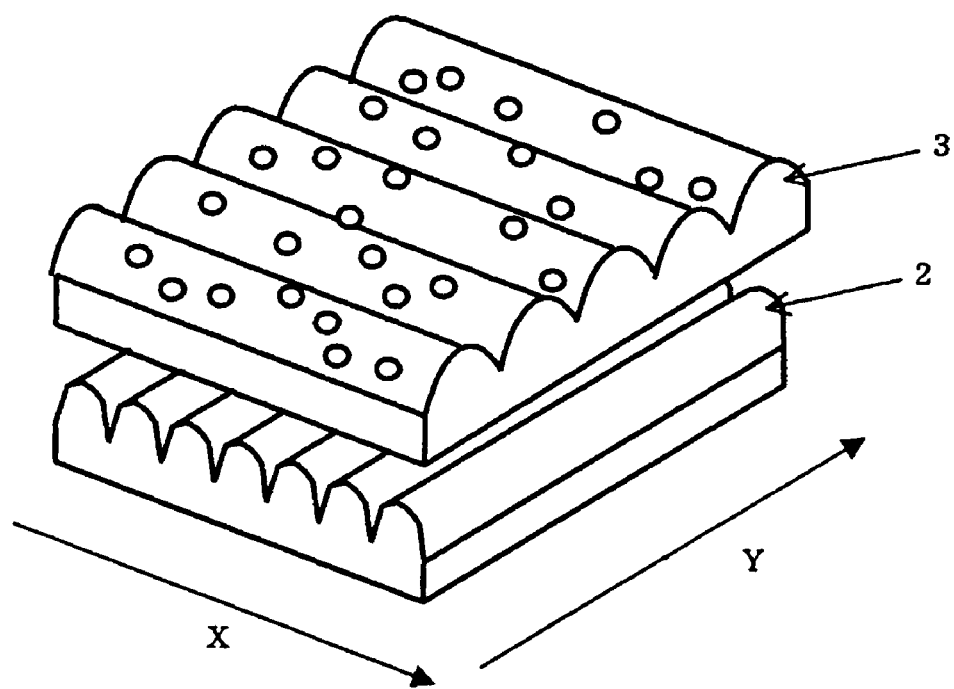
FIG. 27 is a configuration diagram when placing a structure having the second light beam direction control means placed to the emission surface side and the second light beam direction control means surface has random concave-convex in the fifth embodiment of the present invention to the emission surface side of the second light beam control means.

As shown in FIG. 27, a plurality of almost hemispherical shape fine concave-convex are formed to the surface of the first light beam direction control means and preferably placed to the emission surface side than the second light beam direction control means. As mentioned above, light entered to the second light beam direction control means from an oblique direction is emitted toward the front direction from a part of the second light beam direction control means convex portions. That is, when observing the convex portions of the second light beam direction control means in detail, fine light and dark pattern is generated in parallel to the X direction. The fine light and dark pattern can be eliminated by dispersing the gradient distribution in the Y direction by the fine concave-convex. Moreover, the fine concave-convex is desirably placed at random. When providing a LCD panel etc. over a light emitting surface, generated moiré caused by interference between pixels with periodicity and arrangement cycle of the convex portions of the second light beam direction control means can be reduced by scattering effect by the fine concave-convex placed at random.

The fine concave-convex can be obtained by after forming the convex portions of the first light beam direction control means, coating with a solvent dispersed with particulates by spray or the like or by preparing a roll female mold and molding a resin dispersed with particulates by extrusion, and further by preparing a planar female mold and 2P forming a ultraviolet curing type resin dispersed with particulates.

The difference of the refractive index of the particulate in this case and that of the convex portion Z of the first light beam direction control means is desirably 0.1 or less. Furthermore, it is more preferable to be 0.05 or less. When exceeding 0.1, light collection function deteriorates due to scattering effect by the refractive index difference.

Sixth Embodiment

A lighting device of the sixth embodiment according to the present invention includes a projection for holding a light control member, where the projection is formed of a light transmissive material, horizontal cross-section of the projection is circular shape and the diameter of the projection apical part which is in contact with the light control member is 1 mm or less.

Figure 33:
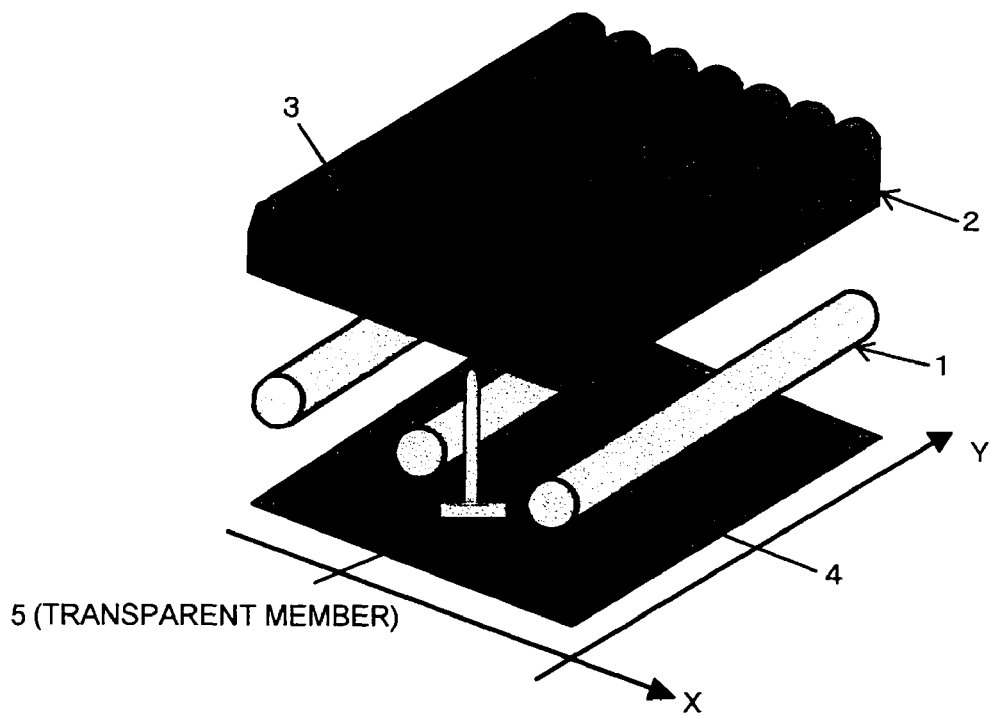
FIG. 33 is a schematic diagram showing a preferable example of a lighting device according to a sixth embodiment of the present invention.

FIG. 33 shows an example of the best mode of the lighting device provided by the present invention. It is a lighting device having a rectangular emission surface formed of X direction and Y direction which is vertical to the X direction, where linear light sources 1 are placed in one virtual flat surface, which is parallel to the X direction and the Y direction, in parallel to the Y direction and also along the X direction. A light control member 2 is placed to the emission surface side of the arranged linear light sources and also the principal surface is parallel to the virtual flat surface where the linear light sources 1 are arranged, a plurality of ridge form convex portions 3 are formed to the surface of the emission surface side, a ridge form ridgeline which is the top part of the convex portions 3 is formed in parallel to the Y direction and arranged along the X direction. A reflection plate 4 placed to the backside in parallel to the X direction and the Y direction and a projection 5 are included in the lighting device.

Figure 34:
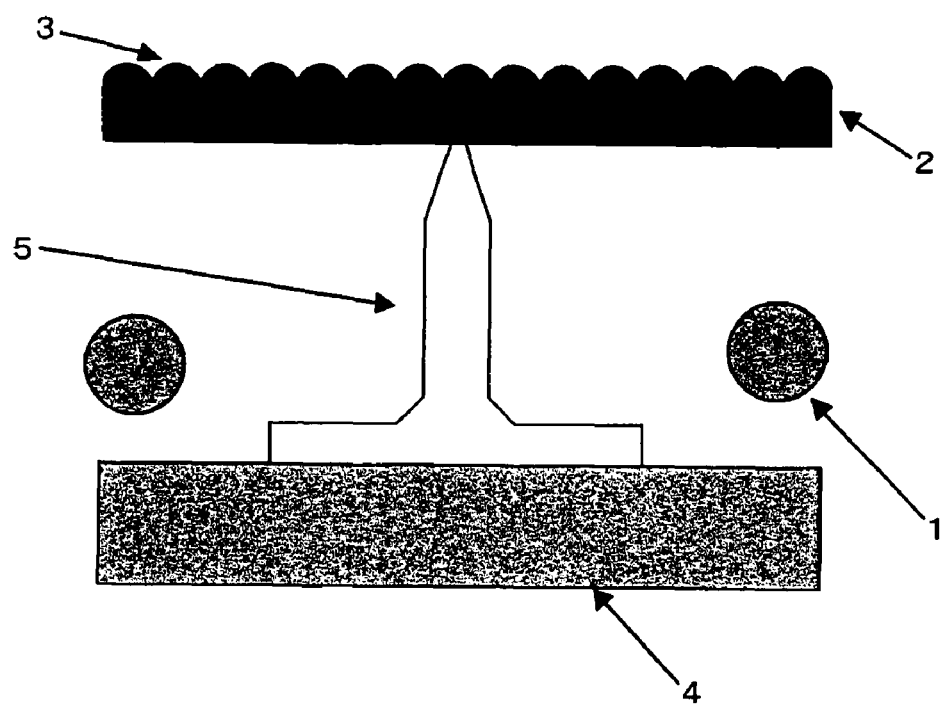
FIG. 34 is a transverse cross-sectional partial enlarged view of a backlight device for liquid crystal display according to an embodiment of the sixth embodiment of the present invention.
Figure 35:
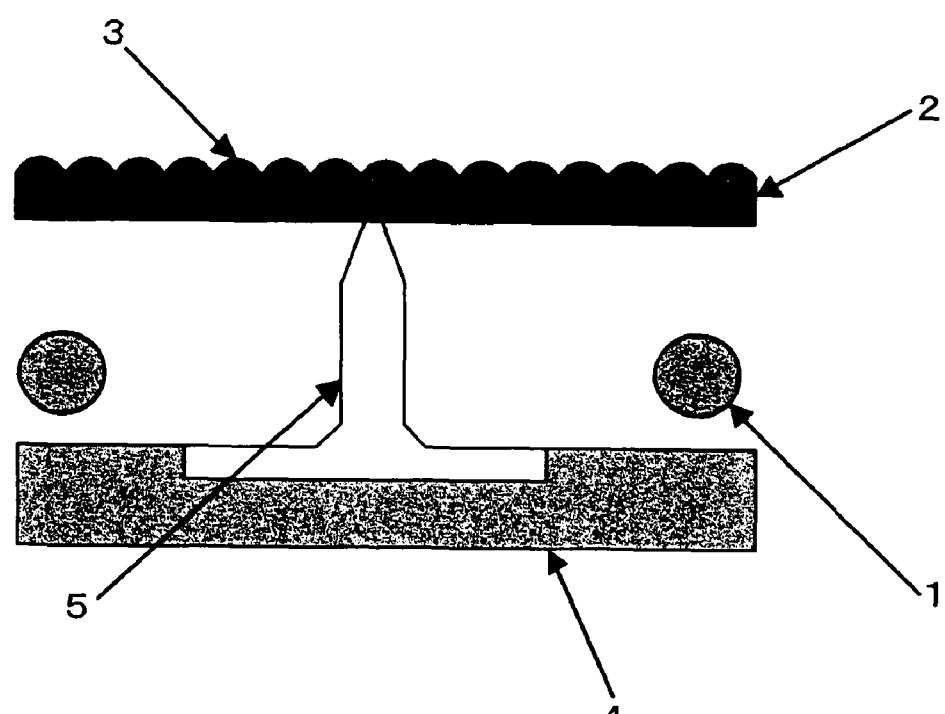
FIG. 35 is a transverse cross-sectional partial enlarged view of a backlight device for liquid crystal display according to another embodiment of the sixth embodiment of the present invention.
Figure 36:
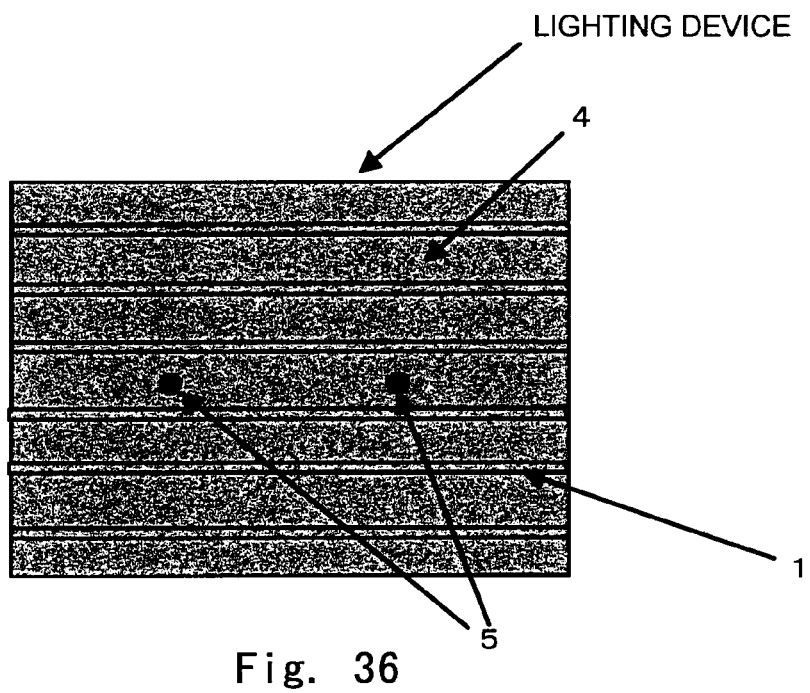
FIG. 36 is a schematic top view of the backlight device for liquid crystal display excluding a light control member according to one embodiment of the sixth embodiment of the present invention.

Next, FIGS. 34 and 35 show detailed aspect enlarged view corresponding to the part close to where the projection 5 of FIG. 33 is placed. FIG. 36 schematically shows a view of the lighting device dismounted with the light control member 2 when viewed from the top.

As a means to fix the light control member 2, the projection 5 is mounted to the central part in the longitudinal direction of the lighting device and symmetrically in the transverse direction, for example, as shown in FIG. 36. However, the position and the number of the projection 5 are changed as appropriate according to the size of the lighting device and the degree of flexure of the light diffusion plate, and a plurality of them may be provided. In the following explanation, an example is explained in which the projections 5 are mounted to the central part in the longitudinal direction of the lighting device and one each of the projections 5 are placed symmetrically in the transverse direction, which is 2 in total, as shown in FIG. 36.

Figure 37:
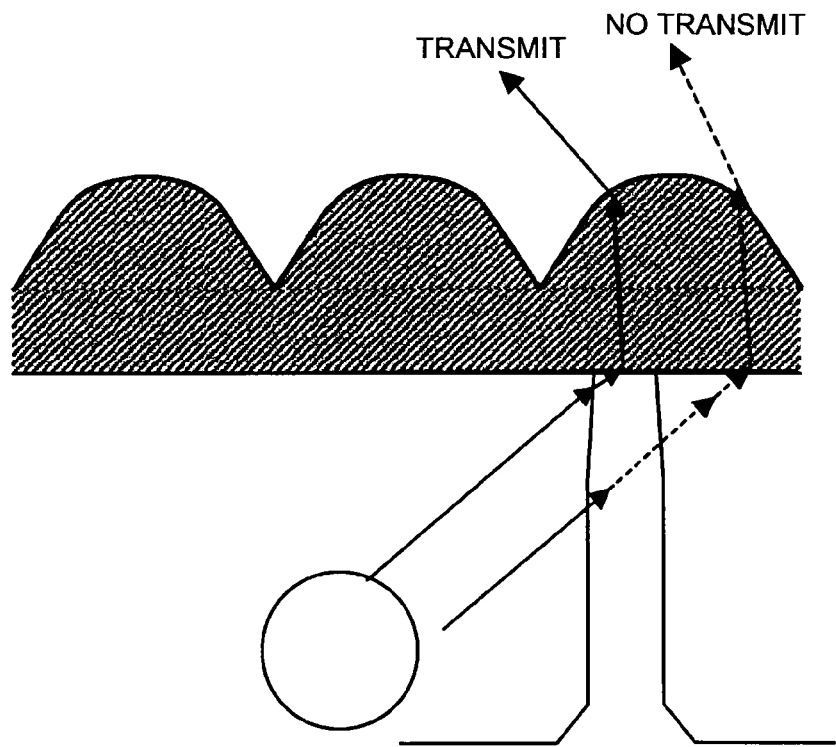
FIG. 37 is a pattern diagram explaining the traveling direction of light beam when providing a projection between a linear light source and the light control member according to the sixth embodiment of the present invention.

In FIGS. 34, 35 and 37, the flat surface is formed to the incident surface of the light control member 2, the ridge form convex portions 3 are formed to the emission surface side and a ridge form ridgeline is formed to the light control member 2 surface to the emission surface side of the lighting device in parallel to the Y direction and also along the X direction. Moreover, the projection 5 may be integrated with the reflective plate 4 by an adhesive tape or the like as shown in FIG. 34 or may be buried in the reflective plate 4 as shown in FIG. 35.

Next, a cause to make a shadow to the light control member 2 by the projection 5 is explained. A plurality of ridge form convex portions are formed to the surface of the emission surface side of the light control member 2, the ridge form ridgeline which is the top part of the convex portions is formed in parallel to the Y direction and also along the X direction. In such light control member 2, when light beam from the linear light sources 1 is blocked by the projection 5 formed of an opaque material, the light beam cannot reach to the light control member 2 as shown in FIG. 37. As a result, the shadow of the projection 5 can be seen when viewed from the outgoing light side of the light control member 2. Especially when using the light control member 2 for forming the ridge form convex portions to the emission surface side in the present invention, a problem may be generated that there is a double vision of the shadow of the projection 5 formed of an opaque material.

On the other hand, in the light diffusion plate including a large amount of light diffusive particulates which has been used instead of the light control member in related arts, as the light scattering effect is strong, even if there is a light blocked portion by the projection portion in the incident surface of the light diffusion plate, the shadow of the projection portion is hardly recognized on the light diffusion plate emission surface because of scattered light from other light incoming portion. Although the degree of the light scattering effect to enable to recognize the shadow of the projection portion is influenced by the characteristics of the light diffusive particulates, it mostly depends on the concentration of the light diffusive particulates, and the shadow of the projection portion is recognized in the light diffusion plate including light diffusive particulates of less than 1 parts per mass.

Therefore, the projection used for the lighting device of the present invention must be of the shape or the material that does not project the shadow even to the light control member with the content of the light diffusive particulates less than 1 parts per mass. Preferable shape and material of the projection are described hereinafter in detail.

It is important that the horizontal cross-sectional shape of the projection used for the lighting device of the present invention is circular shape but not necessarily a precise circular shape and it includes the case of almost circular shape. For example, an ellipse shape in which the ratio of the length of a short axis to the length of a long axis is 0.8 or more and polygon or regular hexadecagon or a more sided polygon can be considered as circular shape in the present invention. However it is needless to say that it is not limited to these shapes. In the lighting device, which is an aspect of the present invention, a part of light entered from the linear light sources to the light control member is refracted at the light control member and transmits the emission surface and a part of the light is reflected inside the light control member at the emission surface. Accordingly, if the horizontal cross-section of the projection is a shape having edges, so to say, such as a rectangle, the direction in which light beam travels drastically changes in both sides of the edge, thus the shadow of the projection is easily generated on the emission surface of the light control member. On the other hand, if the horizontal cross-section of the projection is relatively flat ellipse shape, expansion condition of light passed the projection from the linear light sources largely differs in the long axis direction and the short axis direction of the ellipse. Thus the shadow of the projection is easily generated also in this case depending on the direction to observe. That is, by making the horizontal cross-section of the projection be almost circular shape, the shadow of the projection is hardly recognized when observed from any direction, which is preferable.

Further, it is important that the projection used for the lighting device of the present invention is formed of light transmissive material. As the material to form the projection, it is preferable to form of a transparent material. If it is transparent, so to say, either thermoplastic resin or heat curing type resin can be preferably used. As specific examples thereof, there are (meta)acrylic type resin, (meta)acrylics styrene type copolymer resin, styrene type resin, aromatic vinyl type resin, olefin type resin, ethylene-vinyl acetate type copolymer resin, vinyl chloride type resin, vinylester resin, polycarbonate, fluorine resin, urethane resin, silicon resin, amide type resin, imide type resin, polyester resin, epoxy resin, phenol resin, urea resin and melamine resin, etc. If the projection is formed of an opaque material, a shadow is projected to the light diffusion plate, which is not preferable. Note that light transmittance of the light transmissive material not generating the shadow is preferably 60% of more, and more preferably 80% or more.

As the shape of the projection used for the lighting device of the present invention, the one whose cross-section is almost circular shape with diameter of about 1 to 10 mm, preferably the diameter of about 1 to 6 mm is adapted in order to hold the light control member. However, it is important that the diameter of the projection apical part which is in contact with the light control member is 1 mm or less, preferably in the range of 0.1 to 0.8 mm and more preferably in the range of 0.1 to 0.5 mm. If concave-convex portion is formed to the incident surface side of the light control member, the diameter is preferably twice or more than the pitch of the concave-convex portion in order to hold the light control member, the diameter of the apical part is preferably in the range of 0.1 to 1 mm, more preferably in the range of 0.1 to 0.8 mm and further preferably in the range of 0.1 to 0.5 mm. Since light from the linear light sources is generally diffused light, when considering a light path of light beam to be a shadow, the shadow of the projection fades by the effect of diffused light. However, in the point where the light control member and the projection are in contact, as there is almost no light diffusion effect, the shadow of the projection is recognized as it is. Therefore, the point where the projection and the light control member are in contact is usually more preferable to be smaller. Further, the apical part of the projection is not limited to be flat surface but may have gradual concave-convex in the range not influencing the contact between the concave-convex portion formed to the incident surface side and the projection apical part.

As the arrangement pattern of the projection other than the mode of placing the projection over the reflective plate 4 as shown in FIG. 34, it may be other shape or structure as long as the shadow is not projected over the light control member 2. For example, it may be buried in the reflective plate 4 as shown in FIG. 35 or both the linear light sources 1 and the light control member 2 are supported by one projection 5.

Seventh Embodiment

In the seventh embodiment, a case is described in which almost entire surface of the outgoing light side surface of the principal surface of the reflective plate is parallel to the X axis and is regular concave and/or convex stripe shape which is along the Y axis. Here, a light diffusion plate is used to explain as an example of the light control member, however it is not limited to this to be the light control member.

As a material of the light diffusion plate, a material having translucency is mainly used. A thermoplastic resin is desirable as it is easy to manufacture and light weight. As the thermoplastic resin, it is desirably used if it is material usually used as a base material of a optical material and usually translucent thermoplastic resin is used. For example, there are methacrylate resin, polystyrene resin, polycarbonate resin, cycloolefin resin, methacrylate-styrene copolymer resin and cycloolefin-alkene copolymer resin, etc.

Moreover, various particulates may be dispersed inside the light diffusion plate. This is organic and inorganic particulates known as a diffusion material and luminance non-uniformity can be eliminated by this. Further, various particulates may be dispersed inside for other purposes such as for improving formability and physicality of the plate. In order to increase light utilization efficiency, the particulates desirably absorbs little light. That is, high transparency and reflection factor are desirable. Furthermore, the amount of usage should be suppressed as much as possible for the same reason. Suppressing the amount of usage is also advantageous to increase dispersibility. As a means to suppress or reduce using the light diffusion material, the surface shape of the light diffusion plate can be used for example. Especially by providing ridge portions which are parallel to the Y axis, luminance non-uniformity caused by the linear light sources placed in parallel to the Y axis can be efficiently eliminated.

As a material of the reflective plate, there are metals such as aluminum, silver and stainless, white paint and microfoamed resin so as to increase reflection factor. A reflective member may be provided only to the surface layer by evaporating metals to the surface of a substrate such as a resin. This may be advantageous for weight saving and material price. The reflective plate is desirably the one with high reflection factor to increase light utilization efficiency. From this point of view, silver and resin PET foam are desirable. Moreover, the one which diffuses and reflects light is desirable in order to increase uniformity of emitting light. From this point of view, resin PET foam or the like is desirable.

As an example of the concave and/or convex stripe shape of the outgoing light side surface of the principal surface of the reflective plate, there are shapes such that almost entire surface is one or a plurality of concave forms, almost entire surface is one or a plurality of convex forms and one or a plurality of prism shapes. As for one shape, it is relatively easy to manufacture and for a plurality of forms, it is advantageous to make the device thinner. Necessity of arranging regularly and being the same size and same shape are desirable in light of facilitating to control outgoing light direction and increasing productivity.

The larger the gradient of the concave and/or convex stripe shape, light of lower angle can be turned to the front direction. However generally light of low angle has long light beam distance, thus the influence is not large. Further, if the gradient is increased, the reflected right may hit a different position of the reflective plate and the number of reflections may increase too much, thereby resulting to lead a loss of light. Moreover, although the uniformity can be increased by receiving light to the entire surface of the reflective plate from both directions of the X direction, if the gradient is too large, light from one direction is hard to be entered, which is not desirable.

If concave and/or convex stripe shape is prism shape, ZX cross-section of the apex angle of the prism which is placed opposite to the linear light sources is desirably 70 to 130 degrees, more preferable if 90 to 120 degrees and further preferable if 100 to 110 degrees. Furthermore, by providing a flat part between adjacent stripe shapes, the number of reflections can be adjusted and light can be easily received from any direction, which is desirable.

The size of the concave and/or concave portions is desirable that the width in the X direction is 0.1 mm to 50 mm. If it is 0.1 mm or less, it is difficult to form an accurate shape. It is more desirable to be 0.5 mm or more. Moreover, if it is 50 mm or more, the device becomes thick, which is not desirable. It is more desirable to be 20 mm or less.

Further, the thickness of the reflective plate is desirably 0.5 to 50 mm. If it is 0.5 mm or less, it is easily deformed by temperature and will have unfavorable influence to the control in the light beam direction. It is more desirable to be 1 mm or more. Moreover, if it is 50 mm or more, the device becomes thick, which is not desirable. It is more desirable to be 20 mm or less.

The concave portion and/or the convex portion can be realized by the means such as overlapping a resin sheet with shaped surface. The entire reflective plate may have the shape along the concave portion and/or the convex portion of the surface. This enables to reduce weight more than when forming the concave-convex portions to one surface of the plate and manufacture by a simple method such as deforming a metal plate. Further, manufacturing by the method to form the concave-convex to one side of the plate is convenient when creating by extrusion molding or press molding a thermoplastic resin and concave-convex shaping by an ultraviolet curing resin. More detailed shape can be manufactured easily than the method to deform a metal plate and it is advantageous to make a device thinner.

By having a plurality of regular and stripe ridge portions which are in parallel to the Y axis and along the X axis to one of the principal surface of the light diffusion plate, the lighting device will have a plurality of stripe ridge portions which are in parallel to the Y axis and along the X axis. Thus it is possible to efficiently eliminate luminance non-uniformity in the X axis direction which is remarkable in the linear light sources placed in parallel to the Y axis likewise and control the emission angle distribution in the X axis direction.

Suppose that the distance between a given linear light source M and another linear light source M' nearest to the linear light source M is D and the distance between the linear light source M and the light diffusion plate is H, in a cross-section which is parallel to the ZX flat surface which is parallel to the X axis and the z axis, total light transmittance of light entered at the angle of $\alpha = \mathrm{Tan}^{-1}\{(D/2)/H\}$ to the z axis to a given point over the incoming light surface shall be 50% or more and the total light transmittance shall be 1.05 to 5 times more than total light transmittance of light entered from the normal direction to the point over the incoming light surface. In immediately above the linear light sources where light of the linear light sources enters to the incoming light surface with the strongest energy, that is, the position corresponding between the linear light sources where total light transmittance of the light at the incident angle θ degree is reduced and light enters with the weakest energy, that means by the emission energy of light with the incident angle $\alpha = \mathrm{Tan}^{-1}\{(D/2)/H\}$ being almost equal, emission energy in the surface is uniformized to eliminate luminance non-uniformity. By reflecting a part of the light immediately above the linear light sources to the reflective plate side by the shape of the ridge portion, the ratio of the total light transmittance is adjusted.

For this purpose, the following shape is desirable for the ridge portion.

Figure 40:
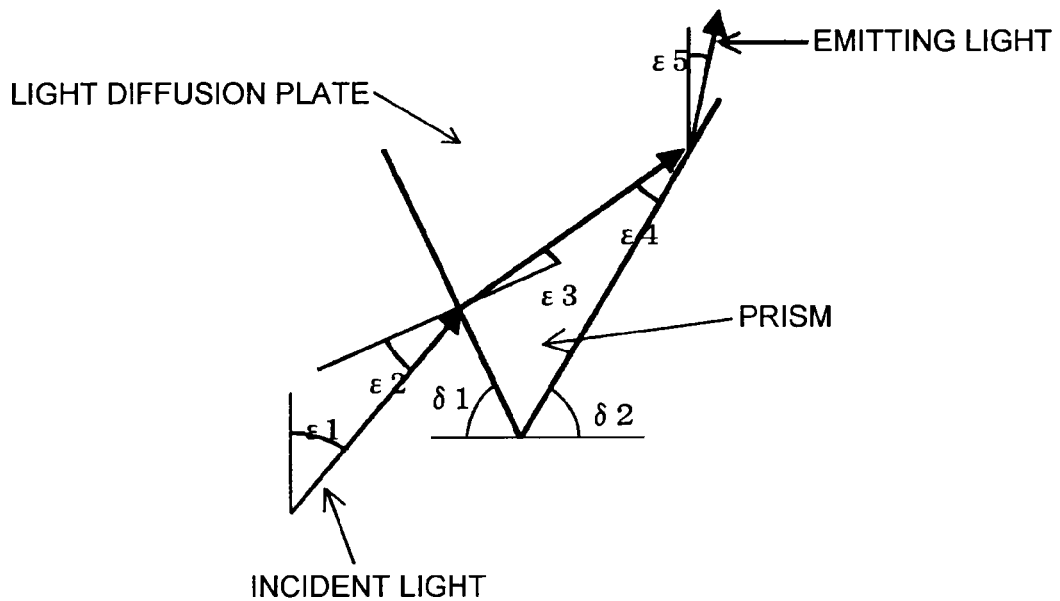
FIG. 40 is a view showing travel of light when providing a prism shape to an incoming light surface of a light diffusion plate according to the seventh embodiment of the present invention.
Figure 41:
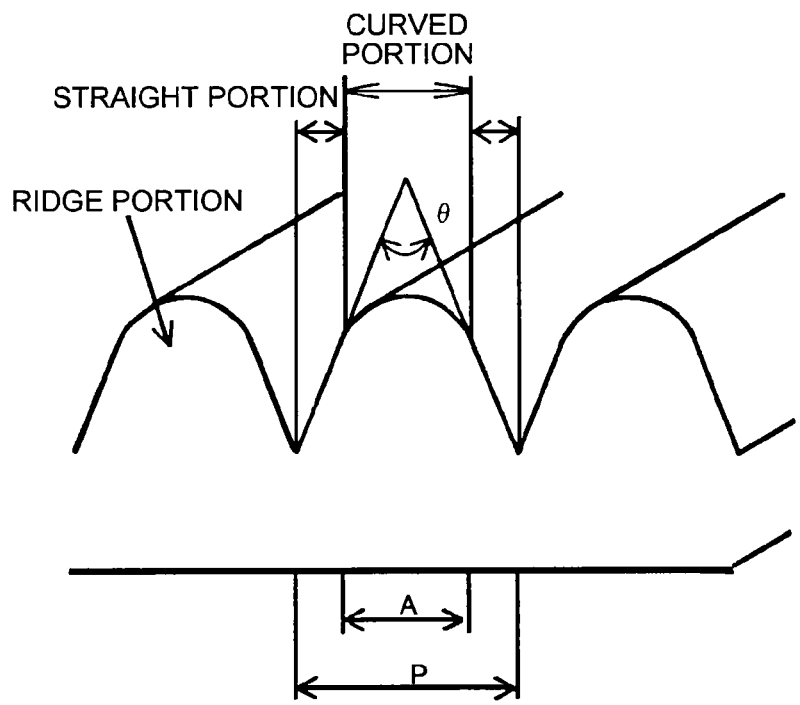
FIG. 41 is a view showing an example of a shape when providing a prism shape to an outgoing light surface of the light diffusion plate according to the seventh embodiment of the present invention.

When providing the ridge portion to the incoming light surface, the cross-section of the ZX flat surface is desirably prism shape which is a rectangular shape. The apex angle of the prism top part nearest to the linear light sources can be determined as follows. FIG. 40 shows the traveling direction of light when generating total reflection inside the prism formed to the incoming light surface of the light diffusion plate. Suppose that refractive index of the light diffusion plate is n and an incident angle of incident light to the normal direction of the incoming light surface is $\epsilon 1$. After total reflection at the prism formed to the incoming light surface, an angle $\epsilon 5$ of the traveling light to the normal direction inside the light diffusion plate can be calculated as follows.

$$\beta 2 = \epsilon 1 - \epsilon 1$$

$$\epsilon 3 = \mathrm{Sin}^{-1}\{(\sin \epsilon 2)/n\}$$

$$\epsilon 4 = \delta 1 - \epsilon 3 + \delta 2 - 90 \text{ degrees}$$

$$\epsilon 5 = 90 \text{ degrees} - (\epsilon 4 + \delta 2)$$

The emission direction of the light beam is preferably the front direction of the light diffusion plate for the purpose of the present invention. Therefore, it is preferable that traveling light 25 travels to the normal direction of emission surface inside the light diffusion plate. Accordingly, if ε1=α, it is desirable to be −20 degrees≦ε5≦20 degrees. Moreover, −10 degrees≦ε5≦10 degrees is more desirable. Furthermore, it is preferable to select δ1 and δ2 to be −5 degrees≦ε5≦5 degrees. This not only enables to eliminate luminance non-uniformity by the ridge portion and also achieves to improve the front luminance by the emission direction control in the X axis direction at the same time.

For example, suppose that the distance between the linear light sources D is 33 mm, the separated distance between the linear line sources center and the light diffusion plate H is 15 mm and the refractive index n of the light diffusion plate 4 is 1.54, it is desirable to be 55 degrees≦δ1≦72 degrees. Moreover, 59 degrees≦δ1≦67 degrees is more desirable. Furthermore, it is preferable to select 61 degrees≦δ1≦65 degrees.

The prism may be continuously formed or a flat part may be provided in between. Total light transmittance is increased and the ratio of total light transmittance can be adjusted by the flat part.

Moreover, fine concave-convex portions may be provided beside the ridge portion over the incoming light surface. This enables to further increase the uniformity by increasing the diffusibility. If the diffusion by this concave-convex portion is too strong, the effect of light beam control, which is the function of the incoming light surface of the reflective plate and the light diffusion plate deteriorates and it becomes difficult to control the front luminance and emission angle distribution, thus prism of 120 degrees or more to an apex angle which is parallel to the X axis and random concave-convex with small aspect ratio are preferable. The fine concave-convex is usually provided to the emission surface side, however it is also effective to provide different prism and random concave-convex to the flat part by the incoming light surface side and provide random concave-convex over the prism over the incoming light surface.

Moreover, when providing the ridge portion to the emission surface, the cross-sectional shape of the ZX flat surface can be determined as follows.

By forming the three-dimensional shape of the convex portion by two almost slope portions and a curved surface which makes an acute angle θ, in the almost straight portion and the curved portion, the degree of light collection and diffusion in the outgoing light surface differs from each other. Thus the light collection performance and the diffusion performance in the outgoing light surface further improves and luminance uniformity in the outgoing light surface can be increased more effectively.

Figure 42:
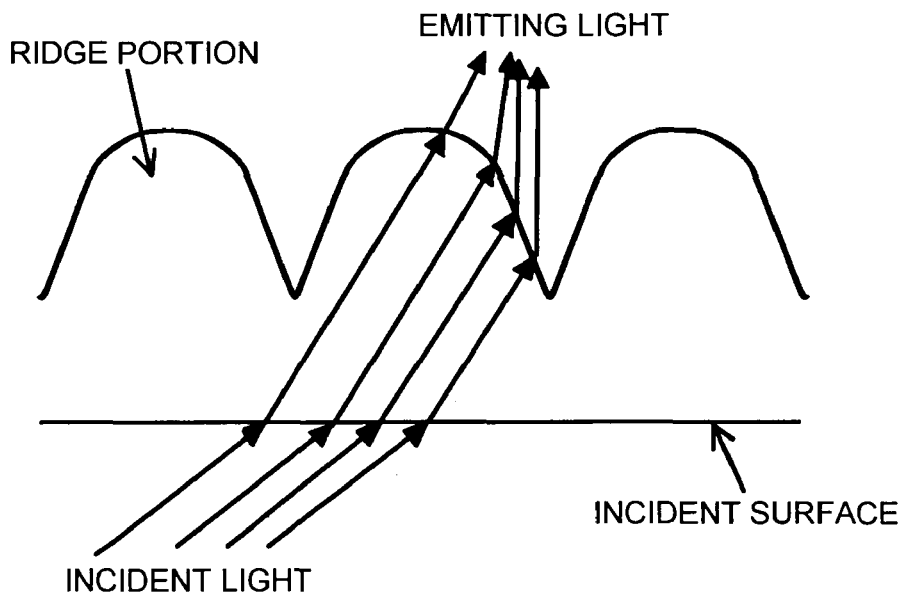
FIG. 42 is a view showing travel of light when providing a prism shape to the outgoing light surface of the light diffusion plate according to the seventh embodiment of the present invention.
Figure 43:
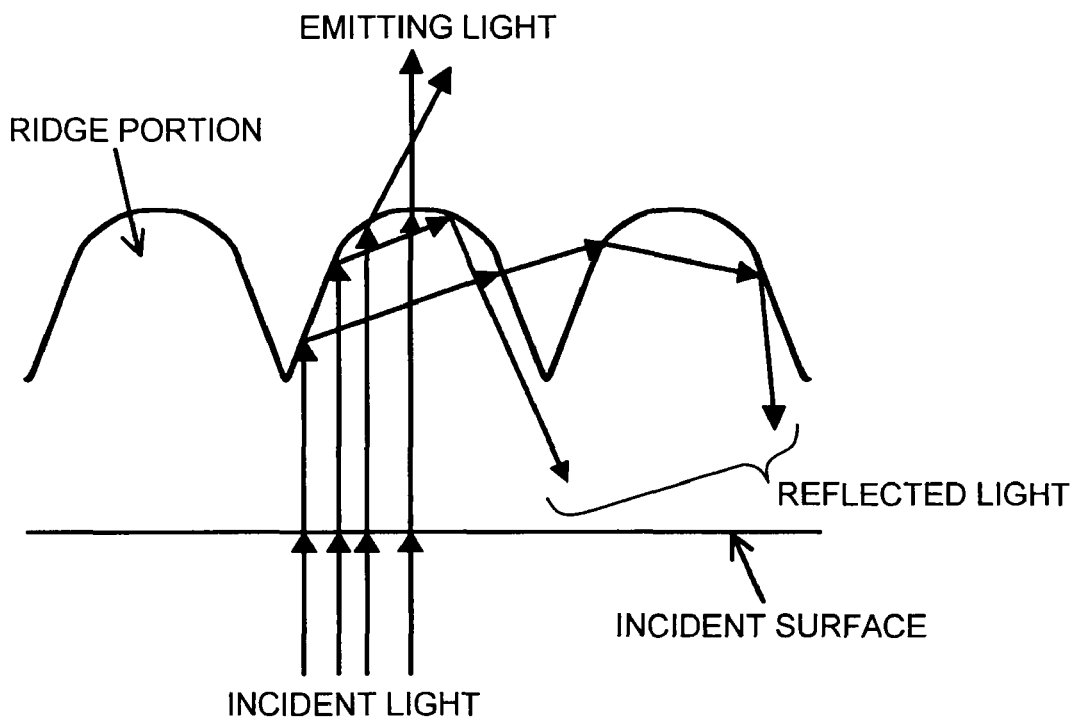
FIG. 43 is a view showing travel of light when providing a prism shape to the outgoing light surface of the light diffusion plate according to the seventh embodiment of the present invention.

Moreover with such shape as shown in FIGS. 42 and 43, since light entered from the same direction and hits the almost straight portion is refracted or reflected to the same direction, it is easy to control the outgoing light direction and enables easy optical design for achieving a desired luminance angle distribution. As shown in FIG. 42, the oblique incident light entered obliquely to the incoming light surface of the light diffusion plate can be emitted from the outgoing light surface side of the light diffusion plate near to the front direction in a cross-section almost straight portion by refraction effect. That is, this not only enables to eliminate luminance non-uniformity by the ridge portions but also achieves to improve the front luminance by the outgoing light direction control in the X axis direction at the same time.

Note that the curvature radius of the curve forming the top part of the outline may be infinite, which is a straight line. It may be continuously formed or a flat part may be provided in between. Total light transmittance is increased and the ratio of total light transmittance can be adjusted by the flat part.

Moreover, fine concave-convex may be provided beside the ridge portion over the outgoing light surface. This enables to further increase the uniformity by increasing the diffusibility. If the diffusion by this concave-convex portion is too strong, the effect of light beam control, which is the function of the incoming light surface of the reflective plate and the light diffusion plate deteriorates and it becomes difficult to control the front luminance and emission angle distribution, thus prism of 120 degrees or more to an apex angle which is parallel to the X axis and random concave-convex with small aspect ratio are preferable. The fine concave-convex is usually provided to the incoming light surface side, however it is also effective to provide different prism and random concave-convex to the flat part by the outgoing light surface side and provide random concave-convex over the prism over the outgoing light surface.

Moreover, in order to control the outgoing light direction at the ridge portion in the X axis direction, the cross-sectional shape of the ZX flat surface can be determined as follows.

Here, the cross-sectional shape design of the ridge portion for obtaining outgoing light of high quality and high luminance is described in which the luminance distribution in the front direction is uniformed while increasing the front luminance as a control of the outgoing light direction. This effect is preferable for many usages of the lighting device and the image display device, however it is possible to perform various outgoing light direction control in the X axis direction using the same thought similarly.

Firstly, uniformizing the luminance distribution in the front direction can be achieved by uniformizing the outgoing light intensity toward the front direction in the X axis direction of the linear light sources. This can be achieved by making the ratio between the minimum and maximum values of the outgoing light intensity of three adjacent linear light sources toward the front direction to be 60% or more.

Secondly, as for a path of light beam in the ZX flat surface of the linear light sources, turning light to the front by adjusting refractive index and gradient for each position of the surface is already known by the means such that the cross-sectional shape cut into the ZX flat surface is placed over the linear light sources so that the linear light sources are to be a focal point as a lenticular shape such as Fresnel lens and convex lens. However by forming the shape of the ridge portion with the distribution of the same gradient angle as the lens to turn light to the front direction, the ratio of light traveling toward the front direction does not change even if the positional relationship between the linear light sources and the ridge portion shifts along the XY flat surface. That is, the ridge portion can be configured with the shape and the size which are easy to form. Note that the width of the ridge portion and the length in the X axis direction are desirably 0.5 mm or less for the use as a liquid crystal display.

If the shape of the ridge portion is designed based on these two thoughts, the luminance in the front direction is uniform and high, and an alignment between the ridge portion and the linear light sources becomes unnecessary.

The seventh embodiment as described above provides a lighting device and an image lighting device with high luminance and light utilization efficiency by collecting light in one direction which is parallel to the linear light sources according to the shape of the reflective plates. Moreover, by making the shape of the reflective plate be regular, it is easy to deal with larger size as there is no change in optical design, decrease in luminance and luminance uniformity along with the larger size, and a precise alignment between the linear light sources and the reflective plate is not necessary. Furthermore, a lamp image which is luminance non-uniformity in the direction vertical to the linear light sources is eliminated in the light diffusion plate. This enables to obtain illuminated light with high quality and if used for the image display device, an image with high quality can be obtained. As it is possible to reduce or avoid using optical films such as a luminance improvement film, the configuration can be simplified. Moreover, as a lamp image can be efficiently eliminated by the surface shape of the optical diffusion plate, it is possible to greatly reduce or avoid the amount of usage of the light diffusion agent. Thus there is a small loss of light and consequently effects such as energy-saving, reduction in heat and light source points can be obtained. Furthermore, by making the surface shape of the light diffusion plate be regular, it is easy to deal with larger size as there is no change in optical design, decrease in luminance and luminance uniformity along with the larger size, and a precise alignment between the linear light sources and the reflective plate is not necessary.

EXAMPLE

An example concerning the first embodiment of the present invention

A mode of the example of the present invention is shown below. The configuration of the lighting device of the embodiment concerning the first embodiment of the present invention is shown in the simplified diagram of FIG. 1. Firstly, in the length 458 mm in the X direction, the length 730 mm in the Y direction and the length 35 mm in the thickness direction vertical to the X direction and the Y direction not shown, a housing made of a rectangular parallelepiped white ABS resin having a rectangle opening portion to the emission side is prepared, where the opening has the length of 698 mm in the X direction and the length of 416 mm in the Y direction.

Next, the reflective plate 4 having the reflection factor of 95% formed of resin PET foam is placed to cover the bottom portion which is in the position opposite to the opening portion by the emission side of the housing.

Next, with an interval of 2 mm, the linear light sources are placed in parallel to the reflective plate to the emission side of the reflective plate. As the linear light sources 1, a plurality of cold cathode tubes having diameter of 3 mm and length 700 mm are placed along the X direction and in parallel to the Y direction. In the examples and comparative examples except the example 7, 16 cold cathode tubes are placed with intervals of 22 mm. In the example 7, 12 cold cathode tubes are placed with intervals of 30 mm.

Next, the light control member 2 is placed to cover the opening portion. The light control member becomes parallel to the reflective plate 4 with an interval of 14 mm to the emission side of the linear light sources 1. The size of this light control member is that the length in the Y direction is 707 mm, the length in the X direction is 436 mm and the thickness not including the height of the convex portion in the thickness direction which is vertical to the X direction and the Y direction, that is a thickness T from the incident surface of the light control member to the bottom part of the convex portion is 2 mm.

H from the center of the linear light sources 1 to the light control member 2 is 15.5 mm, the distance D between centers of adjacent linear light sources 1 in the examples and the comparative examples except the example 6 is 25 mm and in the example 6, it is 33 mm.

The ridge form convex portions 3 formed to the emission surface of the light control member are formed using a metallic mold which is manufactured by cutting into groove form concave portions with the width 0.3 mm continuously in parallel. The light control member is obtained by coating an ultraviolet curing resin with refractive index 1.55, overlapping a transparent resin plate with refractive index 1.55, 436 mm length, 707 mm width and 2 mm thickness thereover, which is methyl methacrylate-styrene copolymer and irradiating with ultraviolet rays from over the transparent resin plate to harden the ultraviolet curing resin. The refractive index of the convex portion is n=1.55 and the refractive index of the base material is $n_2$=1.55. However, in the example 13, the light control member is manufactured using a forming plate containing 0.04 Wt % of siloxane type polymer particles (Tospearl 120: manufactured by GE Toshiba Silicones Co., Ltd., number average particle diameter 2 μm, CV value 3%) as particulates of the light diffusion plate.

The molding plate containing the light diffusion material is manufactured as follows.

After mixing pellets of methyl methacrylate-styrene copolymer resin which is the same material as the transparent resin plate used to prepare the light control member in other examples, the light diffusion material and 0.1 parts per mass % of 2-(5-methyl-2hydroxyphenyl) benzotriazole which is an ultraviolet absorber by a Henschel mixer, melting and kneading using an extruder to manufacture a molding plate with width 1000 mm and thickness 2 mm in extrusion resin temperature of 200 degrees Celsius. This is cut to have 436 mm length and 707 mm width.

Moreover, in the example 14, the light control member is obtained using the one embossed to one of the principal surface as a transparent plate and by forming convex portions to the surface with no emboss. The embossed surface will be the incident surface side of the light control member. The surface roughness of this surface is 3 μm in arithmetic average roughness Ra by the measuring method of JIS B 0601-1994.

The shape of the groove portion of the metallic mold is manufactured by aligning each area −N to N with N, f(X), X min and X max which are indicated in the table 1 and a gradient Φ and width $a_i$ in the X direction determined thereby, and each area −N to N having a determined gradient Φ and width $a_i$ in the X direction are aligned according to the order of the areas indicated in the table 1 likewise.

In the examples 1 to 10 and the examples 13 and 14, all areas of each convex portion are approximated to a curve by least square method. As points to be used for approximation, two both ends of the convex portion and all the contact points (2N) in each area are used.

The evaluation result in this state is shown in the table 1.

TABLE 1

| | D | f(X) | N | $X_{min}$ | $X_{max}$ | Curve Approximation | Area No. | $g(X)_{min}/g(X)_{max}$ | $G(X)_{min}/G(X)_{max}$ | Front Outgoing Light Ratio (%) |
|---|---|---|---|---|---|---|---|---|---|---|
| Example 1 | 25 | cos α | 50 | −25 | 25 | Curve Approximation | Type 1 | 87% | 95% | 66% |

TABLE 1-continued

| | D | f(X) | N | $X_{min}$ | $X_{max}$ | Curve Approximation | Area No. | $g(X)_{min}/g(X)_{max}$ | $G(X)_{min}/G(X)_{max}$ | Front Outgoing Light Ratio (%) |
|---|---|---|---|---|---|---|---|---|---|---|
| Example 2 | 25 | $\cos^2\alpha$ | 50 | −25 | 25 | Curve Approximation | Type 1 | 92% | 97% | 68% |
| Example 3 | 25 | $\cos^3\alpha$ | 50 | −25 | 25 | Curve Approximation | Type 1 | 79% | 95% | 68% |
| Example 4 | 25 | Gaussian distribution[Note 1] | 50 | −25 | 25 | Curve Approximation | Type 1 | 67% | 92% | 65% |
| Example 5 | 25 | $(1/D) \cdot X$ | 50 | −25 | 25 | Curve Approximation | Type 1 | 83% | 97% | 68% |
| Example 6 | 33 | $\cos^2\alpha$ | 50 | −33 | 33 | Curve Approximation | Type 1 | 86% | 91% | 63% |
| Example 7 | 25 | $\cos^2\alpha$ | 50 | −25 | 25 | Curve Approximation | Type 2 | 78% | 94% | 59% |
| Example 8 | 25 | $\cos^2\alpha$ | 50 | −50 | −50 | Curve Approximation | Type 1 | 87% | 98% | 58% |
| Example 9 | 25 | $\cos^2\alpha$ | 50 | −75 | 75 | Curve Approximation | Type 1 | 88% | 98% | 53% |
| Example 10 | 25 | $\cos^2\alpha$ | 50 | −12.5 | 12.5 | Curve Approximation | Type 1 | 60% | 99% | 62% |
| Example 11 | 25 | $\cos^2\alpha$ | 25 | −25 | 25 | Straight Line | Type 3 | 77% | 95% | 61% |
| Example 12 | 25 | $\cos^2\alpha$ | 11 | −25 | 25 | Straight Line | Type 1 | 74% | 94% | 67% |
| Example 13 | 25 | $\cos^3\alpha$ | 50 | −25 | 25 | Curve Approximation | Type 1 | 85% | 99% | 68% |
| Example 14 | 25 | $\cos^3\alpha$ | 50 | −25 | 25 | Curve Approximation | Type 1 | 85% | 99% | 60% |
| Comparative Example 1 | 25 | — | — | — | — | — | — | 5% | 33% | 88% |
| Comparative Example 2 | 25 | — | — | — | — | — | — | 85% | 98% | 41% |
| Comparative Example 3 | 25 | — | — | — | — | — | — | 5% | 20% | — |

[Note 1] Gaussian distribution $f(X) = e^{\left(\frac{(X-\mu)^2}{2\sigma^2}\right)}$ ($\sigma = 10, \mu = 0$)

<Convex Portion Area No.>
Type 1: Area no. i aligned from side to side of convex portion in ascending or descending order
Type 2: Aligned in order of area no. 0, −1, −2 . . . −N and then N, N − 1, . . . 1
Type 3: 51 area aligned in the following area no. order <−25, −24, . . . , −14, −13, −6, −5, . . . , −2, −1, −12, −11, . . . , −8, −7, 0, 7, 8, . . . , 11, 12, 1, 2, . . . , 5, 6, 13, 14, . . . , 24, 25>
<Front Outgoing Light Ratio>
Ratio of light outtput in a range of an angle within 30 degrees from normal direction of emission surface to all outgoing light The distribution of outgoing light intensity toward the front direction is evaluated by measuring the distribution of front luminance. The distribution of front luminance is measured by moving a luminance meter by 1 mm in the X direction while keeping the distance between the luminance meter and a measuring point constant which in the emission surface side of the light control member. Moreover, measurement of the outgoing light ratio toward the front direction is measured by firstly measuring luminance of the measuring point with different angles. At this time, the angle is changed along the normal direction of the principal surface of the light control member and the cross-section which is parallel to the X axis direction. At this time, the distance between the luminance meter and the measuring point in the emission surface side of the light control member is kept constant. Next, the obtained luminance value for each angle is converted into a value of energy so as to calculate the ratio of energy emitted within 30 degrees of the front direction, which is the normal direction of the principal surface of the light control member, to all emission energy.

Then, a transmissive display device is placed to the emission side of the lighting device of the example 1 to be an image display device and this is observed from the front. As a result, a bright image without non-uniformity can be obtained.

Comparative Example

As the comparative example 1, a prism sheet is placed so that prisms are in parallel to the linear light sources, where the prism sheet has ridge form prisms having an apex angle of 90 degrees formed to the emission surface. As a result of observing from the front direction, reduction in the luminance becomes large in the immediately above portion of the linear light sources and luminance non-uniformity becomes larger in the surface.

Figure 13:
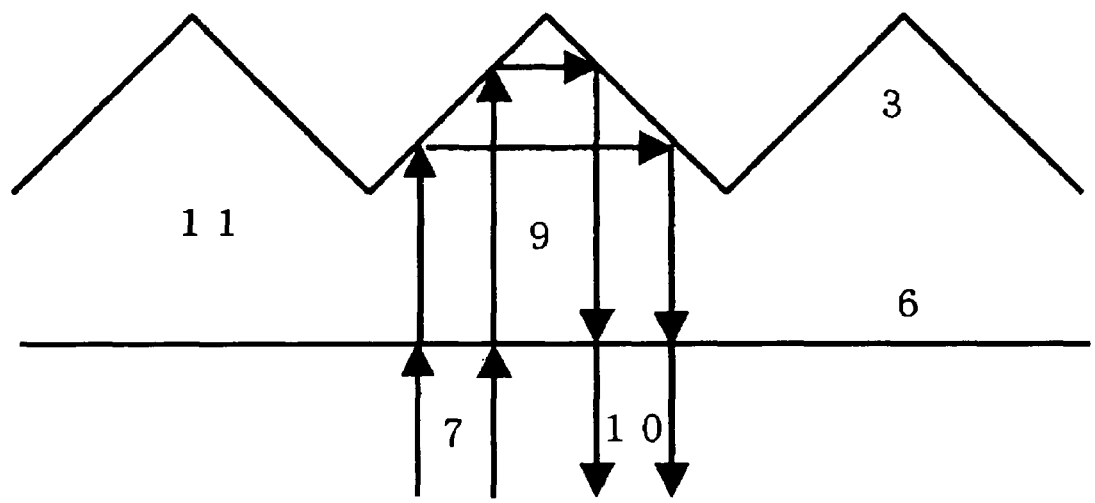
FIG. 13 is a view showing how light travels when light from a linear light source vertically enters to a smooth surface of a prism sheet of a comparative example 1.
Figure 14:
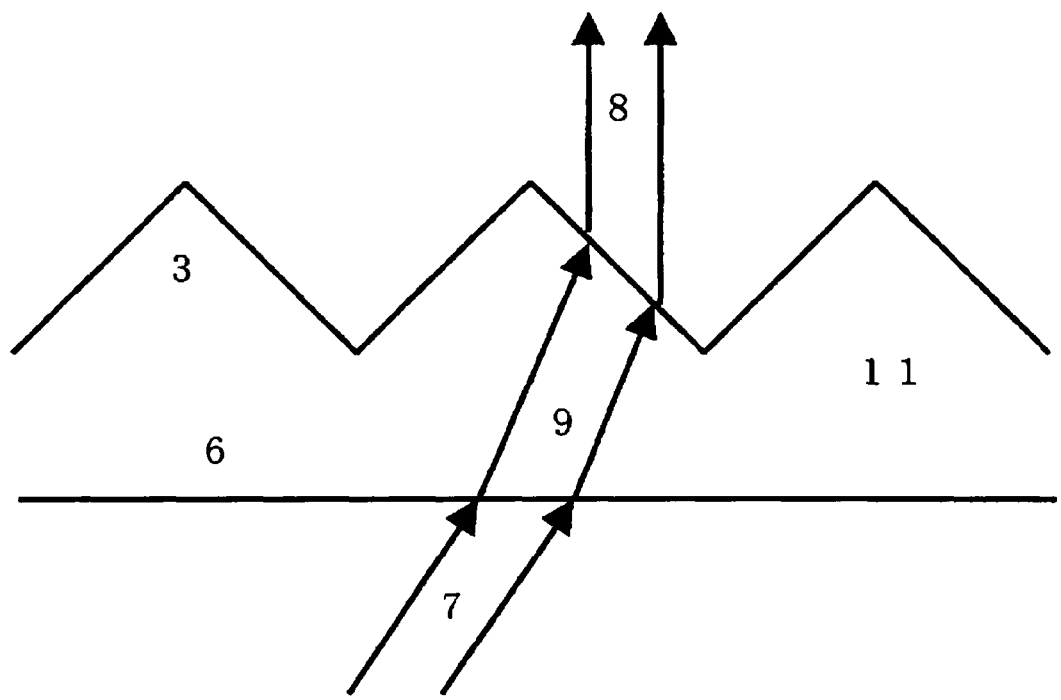
FIG. 14 is a view showing how light travels when light from a linear light source enters from an oblique direction the smooth surface of a prism sheet of the comparative example 1.
Figure 15:
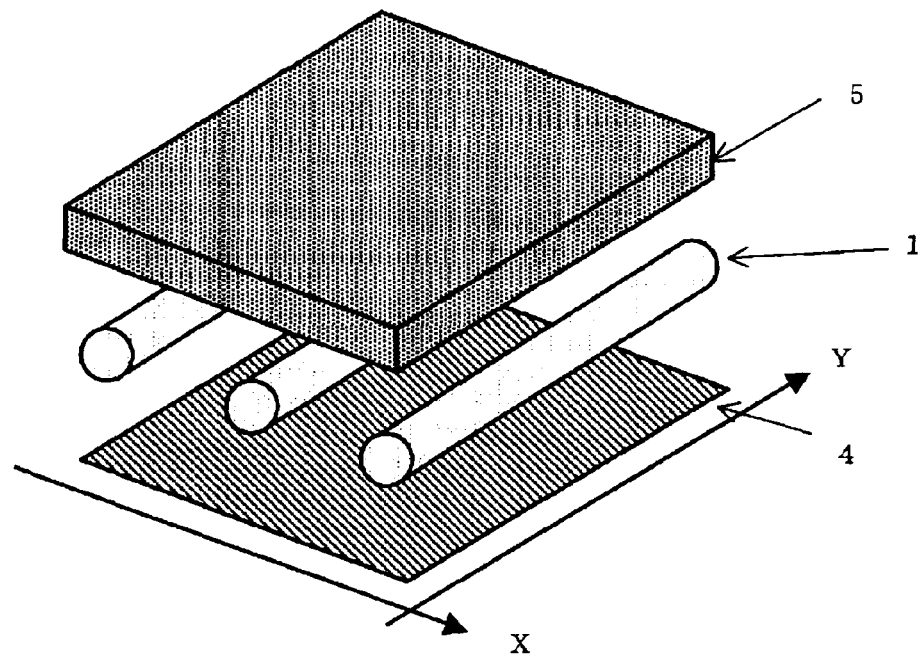
FIG. 15 is a schematic diagram of a direct type lighting device according to a related art.

The principle of the light control of this sheet is shown in FIGS. 13 and 14. As shown in FIG. 13, light 7 entered to the incident surface of a prism sheet 11 from the normal direction is totally reflected and returns to the light source side as reflected light 10, thus the total light transmittance in this area is principally 0 and actual measurement value is 5%, which is extremely low. On the other hand, as shown in FIG. 14, since the light 7 entered from an oblique direction is refracted at the convex portion and travels near the front, high total light transmittance is exhibited. It is 90% in the configuration performed. Luminance non-uniformity is not eliminated in this example.

Moreover, a transmissive liquid crystal panel is placed to the emission side of this lighting device to be an image display device and this is observed from the front. As a result, the obtained image has remarkable luminance non-uniformity.

As a comparative example 2, an evaluation when using a light diffusion plate containing normal particulates instead of the light control member is performed.

The light diffusion plate is manufactured using 1.9 parts per mass % of siloxane type polymer particles (Tospearl 2000B: manufactured by GE Toshiba Silicones Co., Ltd., number average particle diameter 5 μm, CV value 8%) in a similar way as the molding plate used to prepare the light control member in the example 13.

A lighting device is manufactured with the configuration formed by replacing the light control member of the lighting device in the example 1 and compared. When measuring the brightness of the light diffusion plate from the front direction while the cold cathode tubes are turned on, luminance is high in the immediate above portion of the cold cathode tubes and luminance is low between the adjacent cold cathode tubes (obliquely upward portion). Accordingly, a difference of the luminance is large in the immediate above portion and obliquely upward portion of the cold cathode tubes, luminance uniformity in the front direction, which is the image display surface, largely decreases.

Moreover, a transmissive liquid crystal panel is placed to the emission side of this lighting device to be an image display device and this is observed from the front. As a result, it can be seen that the obtained image is quite dark as compared to when using the lighting device of the example 1.

As a comparative example 3, a lighting device is prepared with the configuration formed by using the same molding plate as the molding plate used to prepare the light control member in the example 13 and replacing with the light control member of the lighting device of the example 13 to compare. In this case, a lamp image is remarkable, the ratio $G(X)_{min}/G(X)_{max}$ is 20% and luminance non-uniformity is not eliminated.

Example Concerning the Second Embodiment of the Present Invention

In the example concerning the first embodiment of the present invention, the light control member is prepared using a material with refractive index 1.55. Instead of this material, a material with refractive index 1.58 is used. The evaluation result of the light control member in the example concerning the second embodiment of the present invention is shown in the table 2. Here, as for the examples 15 to 28 and the comparative examples 1 and 2, the light control member is manufactured in a similar way as the examples 1 to 14 concerning the first embodiment of the present invention. On the other hand, in the comparative example 4, a material with refractive index 1.55 is used as the convex portion and a base material, and the light control member is manufactured in a similar way as the example 15 as for others. As shown in the table 2, when comparing the examples 15 to 28 and the comparative examples 1, 2 and 4, a bright image without luminance non-uniformity is obtained.

TABLE 2

| | D | f(X) | N | $X_{min}$ | $X_{max}$ | Curve Approximation | Area No. | $g(X)_{min}/g(X)_{max}$ | $G(X)_{min}/G(X)_{max}$ | Front Outgoing Light Ratio (%) |
|---|---|---|---|---|---|---|---|---|---|---|
| Example 1 | 25 | cos α | 50 | −25 | 25 | Curve Approximation | Type 1 | 87% | 95% | 66% |
| Example 16 | 25 | cos²α | 50 | −25 | 25 | Curve Approximation | Type 1 | 92% | 97% | 68% |
| Example 17 | 25 | cos³α | 50 | −25 | 25 | Curve Approximation | Type 1 | 79% | 95% | 68% |
| Example 18 | 25 | Gaussian distribution[Note 1] | 50 | −25 | 25 | Curve Approximation | Type 1 | 67% | 92% | 65% |
| Example 19 | 25 | (1/D)·X | 50 | −25 | 25 | Curve Approximation | Type 1 | 83% | 97% | 68% |
| Example 20 | 33 | cos²α | 50 | −33 | 33 | Curve Approximation | Type 1 | 86% | 91% | 63% |
| Example 21 | 25 | cos²α | 50 | −25 | 25 | Curve Approximation | Type 2 | 78% | 94% | 59% |
| Example 22 | 25 | cos²α | 50 | −50 | −50 | Curve Approximation | Type 1 | 87% | 98% | 58% |
| Example 23 | 25 | cos²α | 50 | −75 | 75 | Curve Approximation | Type 2 | 88% | 98% | 53% |
| Example 24 | 25 | cos²α | 50 | −12.5 | 12.5 | Curve Approximation | Type 3 | 60% | 99% | 62% |
| Example 25 | 25 | cos²α | 25 | −25 | 25 | Straight Line | Type 3 | 77% | 95% | 61% |
| Example 26 | 25 | cos²α | 11 | −25 | 25 | Straight Line | Type 1 | 74% | 94% | 67% |
| Example 27 | 25 | cos³α | 50 | −25 | 25 | Curve Approximation | Type 2 | 85% | 99% | 68% |
| Example 28 | 25 | cos³α | 50 | −25 | 25 | Curve Approximation | Type 3 | 85% | 99% | 60% |
| Comparative Example 1 | 25 | — | — | — | — | — | — | 5% | 33% | 88% |

TABLE 2-continued

| | D | f(X) | N | $X_{min}$ | $X_{max}$ | Curve Approximation | Area No. | $g(X)_{min}/g(X)_{max}$ | $G(X)_{min}/G(X)_{max}$ | Front Outgoing Light Ratio (%) |
|---|---|---|---|---|---|---|---|---|---|---|
| Comparative Example 2 | 25 | — | — | — | — | — | — | 85% | 98% | 41% |
| Comparative Example 4 | 25 | cos α | 50 | −25 | 25 | Curve Approximation | Type 1 | 87% | 95% | 66% |

Note 1)Gaussian distribution $f(X) = e^{\left(\frac{(X-\mu)^2}{2\sigma^2}\right)}$ ($\sigma = 10, \mu = 0$)

<Convex Portion Area No.>
Type 1: Area no. i aligned from side to side of convex portion in ascending or descending order
Type 2: Aligned in order of area no. 0, −1, −2 . . . −N and then N, N − 1, . . . 1
Type 3: 51 area aligned in the following area no. order <−25, −24, . . . , −14, −13, −6, −5, . . . , −2, −1, −12, −11, . . . , −8, −7, 0, 7, 8, . . . , 11, 12, 1, 2, . . . , 5, 6, 13, 14, . . . , 24, 25>
<Front Outgoing Light Ratio>
Ratio of light output in a range of an angle within 30 degrees from normal direction of emission surface to all outgoing light The evaluation result regarding the shape or the like of the convex portion of the light control member prepared in this way is shown in the table 3. As shown in the table 3, the comparative example 4 is to be compared here, which is described later. As shown in the table 3, in the example 15, the gradient angle of the trough part in the convex portion of the light control member is 67 degrees and the angle made by the trough part is 46 degrees. On the other hand, in the comparative example 4, the gradient angle of the trough part is 71 degrees and the angle made by the trough part is 38 degrees.

Therefore, the angle made by the trough part of the convex portion can be smaller in the example 15 than the comparative example 4. Accordingly, in the comparative example 4, as for the cutting performance of a planar female mold, the groove apex part did not collapse in the example 15 but a part of the groove apex part collapsed in the comparative example 4. Furthermore, as for detachability from the female mold at the time of injection molding, it was easily separated in the example 15 but an external force was required to separate in the comparative example 4.

allel light is irradiated to the incident surface of the light beam conversion capability measuring member from the normal direction and the ratio of light which has changed the outgoing light direction is measured by a Hayes meter. Moreover, usually the light beam direction control of the outgoing light control unit can be predicted by calculation. In this case, the ratio to convert the direction of light entered to the incident surface from the normal direction can also be calculated by the light beam direction conversion unit by directly measuring luminance angle distribution of the light control member. In this example and the comparative example, the Hayes meter (HR-100; manufactured by Murakami Color Research Laboratory) is used by the technique conformed to the method (JIS K7136).

As for the ratio that light which entered to the incident surface of the light control member from the light sources passes the light beam direction conversion unit to reach the outgoing light control unit, total light transmittance of the light beam conversion capability measuring member was measured and this value is considered as the ratio. The light

TABLE 3

| | Refraction Factor n | Gradient Angle of Convex Portion Trough Part | Angle by Trough Part of Convex Portion | Cutting Ability of Planar Female Mold | Detachability of Female Mold at Injection Molding |
|---|---|---|---|---|---|
| Example 15 | 1.60 | 67 degrees | 46 degrees | Satisfactory | Satisfactory |
| Comparative Example 4 | 1.55 | 71 degrees | 38 degrees | Unsatisfactory | Unsatisfactory |

Example Concerning the Third Embodiment of the Present Invention

The measuring method and the evaluation method of physical properties in the example are explained below. The ratio for the light beam direction conversion unit to convert the direction of light entered to the incident surface from the normal direction is measured as follows. To the light control member to be measured, a light beam conversion capability measuring member is separately prepared which has the configuration not provided with an outgoing light control unit. If the outgoing light control unit is a convex portion formed over the emission surface of the light control member, the emission surface of the light beam conversion capability measuring member is a flat surface parallel to the incident surface. Parbeam conversion capability measuring member is prepared by the same method as the light control member used in the example except that the outgoing light control unit is not provided.

The light diffusion agent used for the example and the comparative example is observed using a scanning electron microscope (SEM) and by measuring particle diameters of 200 particles using the obtained photograph, number average particle diameter and the standard deviation to the number average particle diameter are computed.

Moreover, as an index of the particle diameter distribution, coefficient of variation (CV value) indicated by percentage (%) is calculated with the following formula.

CV=(standard deviation to average particle diameter/average particle diameter)×100

The following example and the comparative example were evaluated using the lighting device of the following configuration. The convex portion by the side of the emission surface of the light control member is half-cylinder shape with 0.3 mm width arranged in parallel over the emission surface, and are formed by an injection molding using a metallic mold which provided with the grooved parallel concave portions. The detailed cross-sectional shape of the convex portions is made by approximating an outer shape obtained by areas −50 to 50 being aligned in order with $f(X)=\cos^2\alpha$, $N=50$, $X_{min}=-25$ and $X_{max}=25$ to a curve by least square method using all the peaks.

The principal surface size of the light control member is 707 mm×436 mm and 2 mm in thickness. The material of the reflective plate is resin PET foam with reflection factor of 95%. A housing of 458 mm×730 mm×35 mm which is made of a rectangular parallelepiped white ABS resin having a rectangle opening portion to the emission side is prepared, where the opening portion has the length of 698 mm in the X direction and the length of 416 mm in the Y direction.

Next, the reflective plate is placed to cover the bottom part which is in the position opposite to the opening portion by the emission side of the housing.

Next, with an interval of 2 mm, the linear light sources are placed in parallel to the reflective plate to the emission side of the reflective plate. As the linear light sources 1, a plurality of cold cathode tubes having diameter of 3 mm and length 700 mm are placed along the X direction and in parallel to the Y direction. 16 cold cathode tubes are placed with intervals of 22 mm.

Next, the light control member is placed to cover the opening portion.

The distance from the center of the linear light sources to the light control member is 15.5 mm and the distance between the centers of adjacent linear light sources is 25 mm.

Example 29

After mixing methacrylate-styrene type copolymer resin pellets (TX-800S: manufactured by DENKI KAGAKU KOGYO KABUSHIKI KAISYA, refractive index nD:1.55) and 0.25 parts per mass % of methyl methacrylate type polymer particles (MBXR-8N: manufactured by Sekisui Plastics Co., Ltd., number average particle diameter 8 μm, CV value 25%) by a Henschel mixer, a light control member of width 340 mm×length 270 mm and thickness 2 mm is manufactured by an injection molding (extrusion resin temperature 280 degrees Celsius). The abovementioned lighting device was assembled using this light control member and evaluated. The evaluation result is shown in FIG. 19.

Example 30

A light control member is prepared in a similar way as the example 29 except that 0.13 parts per mass of methyl methacrylate type polymer particles (MBXR-8N: manufactured by Sekisui Plastics Co., Ltd., number average particle diameter 8 μm, CV value 25%) is used. The abovementioned lighting device was assembled using this light control member and evaluated. The evaluation result is shown in FIG. 19.

Example 31

After mixing styrene type copolymer resin pellets (G-100C: manufactured by Toyo Styrene Co., Ltd., refractive index nD:1.59) and 0.5 parts per mass % of methyl methacrylate type polymer particles (SMX-8V: manufactured by Sekisui Plastics Co., Ltd., number average particle diameter 8 μm, CV value 22%) by a Henschel mixer, a light control member of width 340 mm×length 270 mm and thickness 2 mm is manufactured by an injection molding (extrusion resin temperature 280 degrees Celsius). The above-mentioned lighting device was assembled using this light control member and evaluated. The evaluation result is shown in FIG. 19.

Example 32

A light control member is prepared in a similar way as the example 31 except that 0.25 parts per mass % of methyl methacrylate type polymer particles (MBXR-8N: manufactured by Sekisui Plastics Co., Ltd., number average particle diameter 8 μm, CV value 25%) is used. The abovementioned lighting device was assembled using this light control member and evaluated. The evaluation result is shown in FIG. 19.

Example 33

A light control member of width 340 mm×length 270 mm and thickness 2 mm is manufactured by an injection molding (extrusion resin temperature 280 degrees Celsius) for methacrylate styrene type copolymer resin pellets (TX-800S: manufactured by DENKI KAGAKU KOGYO KABUSHIKI KAISYA, refractive index nD:1.55). At this time, a crimp surface was formed to the incident surface side by a forming metallic mold. The abovementioned lighting device was assembled using this light control member and evaluated. The evaluation result is shown in FIG. 19.

Comparative Examples 5 to 8

In the comparative examples 5 and 6, a plate of width 340 mm×length 270 mm and thickness 2 mm which is dispersed with a light beam direction conversion material in the base material is used instead of a light control member.

The comparative examples 7 and 8 use a plate of width 340 mm×length 270 mm and thickness 2 mm with the crimp surface formed to the incident surface side instead of a light control member.

Note that the devices in the comparative examples 5 to 8 do not have convex portions to the emission side but have flat surface.

The evaluation results of these comparative examples 5 to 8 are shown in FIG. 19.

Example Concerning the Fourth Embodiment of the Present Invention

The example concerning the fourth embodiment of the present invention is almost the same as the example concerning the first embodiment of the present invention, however in any cases of the examples 34 to 36 and the comparative examples 9 to 11, 16 cold cathode tubes are placed with intervals of 22 mm.

Next, the light control member is placed to cover the opening portion. The light control member becomes parallel to the reflective plate 4 with an interval of 14 mm to the emission side of the linear light sources 1. The size of this light control member is that the length in the Y direction is 707 mm in the Y direction, the length in the X direction is 436 mm and the thickness not including the height of the convex portion in the thickness direction which is vertical to the X direction and the Y direction, that is a thickness T from the incident surface of the light control member to the bottom part of the convex portion is 2 mm.

The shape of the groove portion of each metallic mold in the examples 34 to 36 is common in N, f(X), $X_{min}$ and $X_{max}$, indicated in the table 4. Then each area −N to N having a gradient Φ and width $a_i$ determined thereby in the X direction are aligned in order of the areas indicated in table 4 and all areas of each convex portion are approximated to a curve by least square method. As points to be used for approximation, two both ends of the convex portion and all the contact points (2N) in each area are used.

Furthermore, in the example 34 as shown in FIG. 20, stripe reflective pattern printing is formed in a direction orthogonal to the ridge form convex portions 3 of the emission surface side to the flat incident surface side of the light control member 2. Note that in the examples 34 to 36, screen printing method is used as a coating method of the reflective member and urethane type ink containing Ti oxide is used as an ink of the reflective member. The reflection factor of the reflective member of the light control member using this ink is 95%.

In the example 35 as shown in FIG. 21, dot reflective pattern printing is formed to the flat incident surface side of the light control member 2. The coating method of the reflective member and the ink of the reflective member are the same as the example 34.

In the example 36 as shown in FIG. 22, stripe reflective pattern printing is formed in the same direction as the ridge form convex portions 3 formed the emission surface side to the flat incident surface side of the light control member 2. The printing method, the reflective ink and width and pitch of each stripe are same as the example 35.

As the comparative examples 9 to 11, to the flat incident surface side of a prism sheet where ridge form prisms with apex angle of 90 degrees are formed to the emission surface, reflective pattern printing equivalent to the examples 34 to 36 is formed and prisms are placed in parallel to the linear light sources. As a result of observing from the front direction, in the immediate above portion of the linear light sources, decrease in luminance is large and luminance non-uniformity in the surface is also large.

The evaluation result in this state is shown in the table 4. Moreover, the table 5 simply summarizes characteristics of the ridge form convex portions of the emission surface side and the reflective pattern. As shown in the table 4, when comparing the examples 34 to 36 and the comparative examples 9 to 11, it can be seen that a bright image without luminance non-uniformity can be obtained.

TABLE 4

| | D | f(x) | N | $X_{min}$ | $X_{max}$ | Curve Approximation | Convex Portion Area No. | $g(X)_{min}/g(X)_{max}$ | $G(X)_{min}/G(X)_{max}$ | Front Outgoing Light Ratio (%) |
|---|---|---|---|---|---|---|---|---|---|---|
| Example 34 | 25 | $\cos^3\alpha$ | 50 | −25 | 25 | Curve Approximation | Note) 1 | 92% | 96% | 68% |
| Example 35 | 25 | $\cos^3\alpha$ | 50 | −25 | 25 | Curve Approximation | Note) 2 | 92% | 96% | 67% |
| Example 36 | 25 | $\cos^3\alpha$ | 50 | −25 | 25 | Curve Approximation | Note) 3 | 92% | 96% | 65% |
| Comparative Example 9 | 25 | — | — | — | — | — | — | 5% | 33% | 85% |
| Comparative Example 10 | 25 | — | — | — | — | — | — | 5% | 33% | 85% |
| Comparative Example 11 | 25 | — | — | — | — | — | — | 5% | 33% | 85% |

Note)
1 Convex portion area no.: Aligned in order of area no. 0, −1, −2, −2, N − 1, ... 1

Front outgoing light ratio is a ratio of light output in a range of an angle within 30 degrees from normal direction of emission surface to all outgoing light

TABLE 5

| | Emission Surface Convex Shape | | Incident Surface Side Reflective Pattern Print | | | | | Aperture Ratio (%) | Ink Reflection Factor (%) |
| | | | Stripe | | | Dot | | | |
| | Shape | Pitch | Direction | Width | Pitch | Arrangement | Diameter | | |
|---|---|---|---|---|---|---|---|---|---|
| Example 34 | Ellipse | 300μ | Orthogonal | 50μ | 300μ | — | — | 83% | 95% |
| Example 35 | Ellipse | 300μ | — | — | — | Lattice | 20μ | 83% | 95% |
| Example 36 | Ellipse | 300μ | Parallel | 50μ | 300μ | — | — | 83% | 95% |
| Comparative Example 9 | Prism | 300μ | Orthogonal | 50μ | 300μ | — | — | 83% | 95% |
| Comparative Example 10 | Prism | 300μ | — | — | — | Lattice | 20μ | 83% | 95% |
| Comparative Example 11 | Prism | 300μ | Parallel | 50μ | 300μ | — | — | 83% | 95% |

Embodiment Concerning the Fifth Embodiment of the Present Invention

The second light beam direction control means of the examples 37 to 39, 41 to 49 and 51 is manufactured by the following procedure. The ridge form convex portion 2 formed to the emission surface are formed using a metallic mold which is manufactured by cutting into groove form concave portions with 0.3 mm width continuously in parallel. An ultraviolet curing resin with refractive index 1.55 is coated to a cutting surface of the metallic mold, a transparent resin film with refractive index of 1.549, 436 mm length, 707 mm width and 0.1 mm thickness is overlapped thereover (except the example 51), which is methyl methacrylate-styrene copolymer, and ultraviolet rays are irradiated from over the transparent resin film to harden the ultraviolet curing resin.

Moreover, the first light beam direction control means of the examples 37 to 39, 41 to 49 and 51 is manufactured by the following procedure. The first light beam direction control means 3 is formed using a metallic mold which is manufactured by cutting into groove form concave portions with the width 0.3 mm continuously in parallel. An ultraviolet curing resin with refractive index 1.55 is coated to a cutting surface of the metallic mold, a transparent resin film with refractive index of 1.549, 436 mm length, 707 mm width and 0.1 mm thickness is overlapped thereover, which is methyl methacrylate-styrene copolymer, and ultraviolet rays are irradiated from over the transparent resin film to harden the ultraviolet curing resin.

A plate shape structure was obtained by optically adhering a film having the first light beam direction control means formed to one side, a film having the second light beam direction control means formed to one side or both films having the first light beam direction control means and the second light beam control means formed to both sides through an adhesive agent to a resin plate surface of 2 mm in thickness. A transparent acrylic plate was used except in the example 51.

In the example 51, a member having the first light beam direction control means is manufactured using a forming plate containing 0.04 Wt % of siloxane type polymer particles (Tospearl 120: manufactured by GE Toshiba Silicones Co., Ltd., number average particle diameter 2 μm, CV value 3%) as particulates of the light diffusion plate instead of the transparent resin plate.

The first light beam direction control means and the second light beam direction control means of the examples 40 and 50 were manufactured by the following procedures. Firstly, a female mold which is the first light beam direction control means turned over is manufactured by cutting into groove form concave portions with width 0.1 mm in parallel. Grooved concave portions of 0.3 mm are continuously produced in a direction which is orthogonal to this for the female mold which is the second light beam direction control means turned over by a cutting process.

An ultraviolet curing resin with refractive index 1.55 is coated to a cutting surface of the metallic mold, a transparent resin film with refractive index of 1.549, 436 mm length, 707 mm width and 0.1 mm thickness is overlapped thereover, which is methyl methacrylate-styrene copolymer, and ultraviolet rays are irradiated from over the transparent resin film to harden the ultraviolet curing resin. After that, the film having the first light beam direction control means and the second light beam direction control means formed thereto are optically adhered through an adhesive agent to a transparent acrylic plate with 2 mm thickness.

As the comparative examples 12 to 15, the result in which a light control member having only the second light beam direction means is placed is shown in the table 6. As a result of observing from the front direction, luminance in the front direction decreases.

The table 6 shows configuration of each example and each comparative example and result of luminance measurement.

TABLE 6

| | Second Light Beam Direction Control Means | | | | | | |
|---|---|---|---|---|---|---|---|
| | D | f(X) | N | $X_{min}$ | $X_{max}$ | Curve Approximation | Area No. |
| Example 37 | 25 | cos α | 50 | −25 | 25 | Curve Approximation | Type 1 |
| Example 38 | 25 | cos α | 50 | −25 | 25 | Curve Approximation | Type 1 |
| Example 39 | 25 | cos α | 50 | −25 | 25 | Curve Approximation | Type 1 |
| Example 40 | 25 | cos α | 50 | −25 | 25 | Curve Approximation | Type 1 |
| Example 41 | 25 | cos α | 50 | −25 | 25 | Curve Approximation | Type 1 |
| Example 42 | 25 | cos α | 50 | −25 | 25 | Curve Approximation | Type 1 |
| Example 43 | 25 | Gaussian distribution[Note 1] | 50 | −25 | 25 | Curve Approximation | Type 1 |
| Example 44 | 25 | ±(1/D)·X | 50 | −25 | 25 | Curve Approximation | Type 1 |
| Example 45 | 33 | cos α | 50 | −33 | 33 | Curve Approximation | Type 1 |
| Example 46 | 25 | cos α | 50 | −25 | 25 | Curve Approximation | Type 2 |
| Example 47 | 25 | cos α | 50 | −50 | −50 | Curve Approximation | Type 1 |
| Example 48 | 25 | cos α | 50 | −75 | 75 | Curve Approximation | Type 1 |
| Example 49 | 25 | cos α | 50 | −12.5 | 12.5 | Curve Approximation | Type 1 |
| Example 50 | 25 | cos α | 25 | −25 | 25 | Straight Line | Type 3 |
| Example 51 | 25 | cos α | 11 | −25 | 25 | Straight Line | Type 1 |
| Comparative Example 12 | 25 | cos α | 50 | −25 | 25 | Curve Approximation | Type 1 |
| Comparative Example 13 | 25 | Gaussian distribution[Note 1] | 50 | −25 | 25 | Curve Approximation | Type 1 |
| Comparative Example 14 | 33 | cos α | 50 | −33 | 33 | Curve Approximation | Type 1 |

TABLE 6-continued

| Comparative Example 15 | 25 | cos α | 25 | −25 | 25 | Straight Line | | | Type 3 |

| | First Light Beam Direction Control Means | | | | | | | |
|---|---|---|---|---|---|---|---|---|
| | Surface with First Light Beam Direction Control Means | Shape | Max Gradient Angle (deg) | Configuration | Arrangement | $g(X)_{min}/g(X)_{max}$ | $G(X)_{min}/G(X)_{max}$ | Front Luminance (cd/m²) |
| Example 37 | Incident Surface | C = 35, K = −1.2, A4 = −2000 | 37 | Configuration 1 | Arrangement 1 | 88% | 95% | 11.043 |
| Example 38 | Incident Surface | C = 35, K = −1.2, A4 = −2000 | 37 | Configuration 2 | Arrangement 1 | 94% | 98% | 10.475 |
| Example 39 | Incident Surface | C = 10, K = 0, A4 = 0 | 30 | Configuration 1 | Arrangement 1 | 94% | 98% | 9.982 |
| Example 40 | Emission Surface | Prism with apex angle 90 degrees | 45 | Configuration 1 | Arrangement 3 | 81% | 96% | 8.517 |
| Example 41 | Emission Surface | C = 150, K = −1.5, A4 = 500 | 59 | Configuration 2 | Arrangement 1 | 81% | 96% | 9.473 |
| Example 42 | Emission Surface | C = 150, K = −1.5, A4 = 500 | 59 | Configuration 3 | Arrangement 2 | 81% | 96% | 9.673 |
| Example 43 | Incident Surface | C = 10, K = 0, A4 = 0 | 30 | Configuration 3 | Arrangement 2 | 68% | 93% | 8.963 |
| Example 44 | Emission Surface | C = 120, K = −1.2, A4 = −4000 | 57 | Configuration 1 | Arrangement 1 | 85% | 98% | 9.767 |
| Example 45 | Emission Surface | C = 140, K = −1.8, A4 = 900 | 57 | Configuration 2 | Arrangement 1 | 87% | 92% | 7.180 |
| Example 46 | Emission surface | C = 40, K = −3, A4 = 0 | 34 | Configuration 3 | Arrangement 2 | 79% | 95% | 7.689 |
| Example 47 | Incident Surface | C = 8, K = 0, A4 = 0 | 24 | Configuration 1 | Arrangement 1 | 89% | 99% | 8.984 |
| Example 48 | Incdient Surface | C = 8, K = 0, A4 = 0 | 24 | Configuration 2 | Arrangement 1 | 90% | 99% | 8.266 |
| Example 49 | Incident Surface | C = 35, K = −1.2, A4 = −2000 | 37 | Configuration 3 | Arrangement 2 | 62% | 99% | 9.323 |
| Example 50 | Emission Surface | C = 150, K = −1.5, A4 = 500 | 59 | Configuration 1 | Arrangement 3 | 79% | 97% | 7.662 |
| Example 51 | Incident Surface | C = 10, K = 0, A4 = 0 | 30 | Configuration 3 | Arrangement 2 | 75% | 95% | 9.195 |
| Comparative Example 12 | — | — | — | — | — | 92% | 97% | 7.814 |
| Comparative Example 13 | — | — | — | — | — | 67% | 92% | 7.388 |
| Comparative Example 14 | — | — | — | — | — | 86% | 91% | 5.912 |
| Comparative Example 15 | — | — | — | — | — | 77% | 95% | 7.108 |

Configuration 1: First light beam direction control means is formed to plate shape structure and second light beam direction control means is also formed to the same plate shape structure
Configuration 2: First light beam direction control means is formed to plate shape structure and second light beam direction means is formed to a different structure
Configuration 3: Second light beam direction control means is formed to plate shape structure and first light beam direction control means is formed to a different structure
Arrangement 1: To emission surface side, arranged in order of linear light source, first light beam control means and second light beam control means
Arrangement 2: To emission surface side, arranged in order of linear light source, second light beam control means and first light beam control means
Arrangement 3: First light beam direction control means and second light beam direction control means are formed to the same surface of the same structure
When indicating C, K and A4, the unit first light beam direction control means follows the following formula h is height from bottom surface of structure and hmax represents maximum height $$h = h_{max} - \frac{CY^2}{1 + \sqrt{1 - (K+1)C^2 Y^2}} + A_4 Y^4$$

<Convex Portion Area No.>
Type 1: Area no. i aligned from side to side of convex portion in ascending or descending order
Type 2: Aligned in order of area no. 0, −1, −2 . . . −N and then N, N − 1, . . . 1
Type 3: 51 areas aligned in the following area no. order <−25, −24, . . . , −14, −13, −6, −5, . . . , −2, −1, −12, −11, . . . , −8, −7, 0, 7, 8, . . . , 11, 12, 1, 2, . . . , 5, 6, 13, 14, . . . , 24, 25>
*Note 1)* Gaussian distribution $$f(X) = e^{-\left(\frac{(X-\mu)^2}{2\sigma^2}\right)} \quad (\sigma = 10, \mu = 0)$$

As the comparative example 16, an evaluation is performed when using a light diffusion plate containing normal particulates instead of the light control member. In this case, luminance of the front direction decreases. Moreover, a transmissive liquid crystal panel is placed to the emission side of this lighting device to be an image display device and this is observed from the front. As a result, it can be seen that the obtained image is quite dark as compared to when using the lighting device of the example 37.

Moreover, after manufacturing a female mold having concave-convex of the emission surface and concave-convex of the incident surface in the example 39, under the atmosphere of the temperature 60 degrees Celsius and humidity 80%, plate shape structures with 2 mm in thickness shown in FIG. 31 are manufactured by an injection molding using a material with water absorption rate of 0.4% and a material with water absorption rate of 2%. As a result of leaving the two plate shape structures in the atmosphere of the temperature 45 degrees Celsius and humidity 90% Rh, the amount of warpage of the plate shape structure manufactured using the material having water absorption rate 2% was 1.9 mm, while the amount of warpage of the plate shape structure manufactured with the material having water absorption rate 0.4% was 0.8 mm. The amount of warpage here is the maximum height of the surface opposite to a flat plate from the flat plate when an object to be measured is placed over the flat plate.

Example Concerning the Sixth Embodiment of the Present Invention

As an example concerning the sixth embodiment of the present invention, the basic structure of a backlight unit mounted to a commercially available liquid crystal display (manufactured by Sony Corporation, Product name KDL-L32HVX) was used to evaluate. The configuration of the backlight unit is explained with reference to FIG. 33. In a rectangular parallelepiped housing having an opening portion with the length in the X direction 438 mm and the length in the Y direction 758 mm and the length 19 mm in the thickness direction which is vertical to the X direction and the Y direction, the reflective plate 4 with the length in the X direction 714 mm and the length in the Y direction 398 mm is placed to the emission side so as to cover the bottom part placed at a position opposite to the opening portion by the emission side of the housing.

Then, linear light sources are placed in parallel to the reflective plate to the emission side of the reflective plate with an interval of 3 mm. The linear light sources 1 are 16 cold cathode tubes with diameter of 3 mm and length of 700 mm, which are placed along the X direction and in parallel to the Y direction with intervals of 21.5 mm.

Next, the light control member 2 concerning the sixth embodiment of the present invention is placed to cover the opening portion. The light control member is placed in parallel to the reflective plate 4 with an interval of 13 mm to the emission side of the linear light sources 1. The size of the light control member is that the length in the Y direction is 732 mm, the length in the X direction is 407 mm and the thickness not including the height of the convex portion in the thickness direction which is vertical to the X direction and the Y direction, that is a thickness T from the incident surface to the bottom part of the convex portion of the light control member was 2 mm.

H from the center of the linear light sources 1 to the light control member 2 is 14.5 mm, the distance D between centers of adjacent linear light sources 1 is 25.0 mm.

(Manufacturing the Light Control Member)

The light control member used in the example concerning the sixth embodiment of the present invention is characterized that the flat surface is formed to the incident surface side of the light control member opposite to the linear light sources and the ridge form convex portions calculated from the formulas (2) to (8) are formed to the emission surface side. The light control member was manufactured as follows.

(1) Firstly, concave groove shapes with 0.3 mm width which are made by approximating the shape calculated from the formulas (2) to (8) where $f(x)=\cos \alpha$, $N=50$, $X_{min}=-25.0$ and $X_{max}=25.0$ to a curve are continuously formed in parallel by cutting process and a metallic mold is manufactured. Next, an ultraviolet curing resin with refractive index of 1.55 is coated to a cutting surface of the metallic mold, a (meth) acrylate methylstyrene copolymer transparent resin plate of length 407 mm, width 732 mm and thickness 2 mm (resin used: manufactured by Denki Kagaku Kogyo Kabushiki Gaisya Product name "TX polymer" TX-800S, refractive index: 1.549) is overlapped thereover which is manufactured by an extrusion molding and ultraviolet rays are irradiated from over the transparent resin plate to harden the ultraviolet curing resin so as to obtain a light control member (B-1) having ridge form convex portions formed thereto. When measuring $g(X)_{min}/g(X)_{max}$ for the obtained light control member (B-1), it was 0.87.

(2) For the metallic mold manufactured in the abovementioned (1), an ultraviolet curing resin with refractive index 1.55 is coated to a cutting surface of the metallic mold, a (meth)acrylate styrene type copolymer transparent resin plate of length 407 mm, width 732 mm and thickness 2 mm which is manufactured by adding 0.15 parts per mass of light diffusion particulates (manufactured by GE Toshiba Silicones Co., Ltd. Product name "Tospearl" 2000B, refractive index: 1.420) to the (meth)acrylate styrene copolymer transparent resin plate is overlapped thereover and ultraviolet rays are irradiated from over the transparent resin plate to harden the ultraviolet curing resin so as to obtain a light control member (B-2) having ridge form convex portions formed thereto. When measuring $g(X)_{min}/g(X)_{max}$ for the obtained light control member (B-2), it was 0.92.

(3) Furthermore, for the metallic mold manufactured in the abovementioned (1), an ultraviolet curing resin with refractive index 1.55 is coated to a cutting surface of the metallic mold, a (meth)acrylate styrene system copolymer transparent resin plate of length 407 mm, width 732 mm and thickness 2 mm which is manufactured by adding 1.0 parts per mass of light diffusion particulates (manufactured by GE Toshiba Silicones Co., Ltd. Product name "Tospearl" 2000B, refractive index: 1.420) to the (meth)acrylate styrene system copolymer transparent resin plate is overlapped thereover and ultraviolet rays are irradiated from over the transparent resin plate to harden the ultraviolet curing resin so as to obtain a light control member (B-3) having ridge form convex portions formed thereto. When measuring $g(X)_{min}/g(X)_{max}$ for the obtained light control member (B-3), it was 0.95.

(Evaluating a Shadow of a Projection and Measuring Luminance)

(a) The shadow by a projection is visually evaluated and the result is shown in the table 7.

(b) The front luminance indicating the brightness of a lighting device is measured by a luminance meter (manufactured by TOPCON Corporation BM-5) and the result is shown in the table 7.

Example 52

Figure 38A:
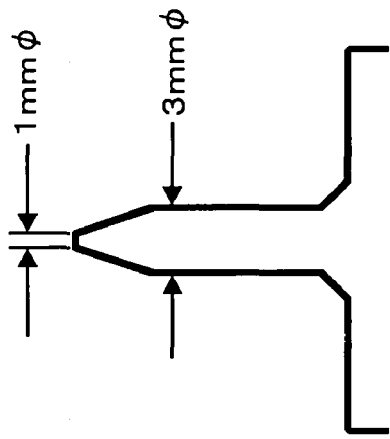
FIG. 38A is a view showing the shape of a projection according to an example 52.

Instead of the projections accompanied to the backlight unit mounted to the liquid crystal display (manufactured by Sony Corporation, Product name KDL-L32HVX), projections having a horizontal cross-sectional shape of circular shape diameter 3 mm and an apical diameter of 1 mmσ as shown in FIG. 38A manufactured by cutting with a lathe using an acrylic resin (manufactured by Kuraray Co., LTD Product name "Paraglas" transparent plate 6 mmt) are attached and fixed using double-sided tape to the lighting device. The mounted position was middle position of the linear light sources as shown in FIG. 36.

When combined with the light control member (B-1), a shadow caused from the projection could not be visually recognized in the position where the projection and the light control member are in contact. Moreover, as shown in the table 7, the measured luminance was a high value and improvement effect of luminance non-uniformity was also good.

Example 53

An evaluation is performed in a similar way as the example 52 using the projections of the example 52 and combining with the light control member (B-2). A shadow caused from the projection could not be visually recognized in the position where the projection and the light control member are in contact as in the example 52. Moreover, as shown in the table 7, the measured luminance is comparatively high value and improvement effect of luminance non-uniformity was also good.

Comparative Example 17

An evaluation is performed using projections (white and opaque: the shape is same as the example 52) accompanied to the backlight unit mounted to the liquid crystal display (manufactured by Sony Corporation, Product name KDL-L32HVX) and combining the light control member (B-1). As a result, a shadow caused from the projection was clearly generated in the position where the projection and the light control member are in contact.

Comparative Example 18

Combined with the light control member (B-3) using the projections of the comparative example 17. As the light control member (B-3) contains a large amount of light diffusive particulates compared to the light control member (B-1) of the comparative example 17, a shadow caused from the projections cannot be visually recognized in the position where the projection and the light control member are in contact, however the measured luminance was low value as shown in the table 7. That is, it can be said that luminance and image quality are not balanced.

Comparative Example 19

Figure 38B:
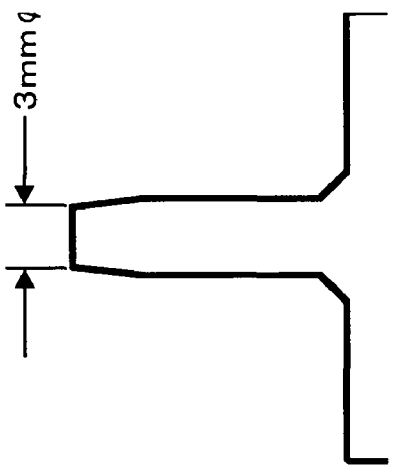
FIG. 38B a view showing the shape of a projection according to a comparative example 19.
Figure 39:
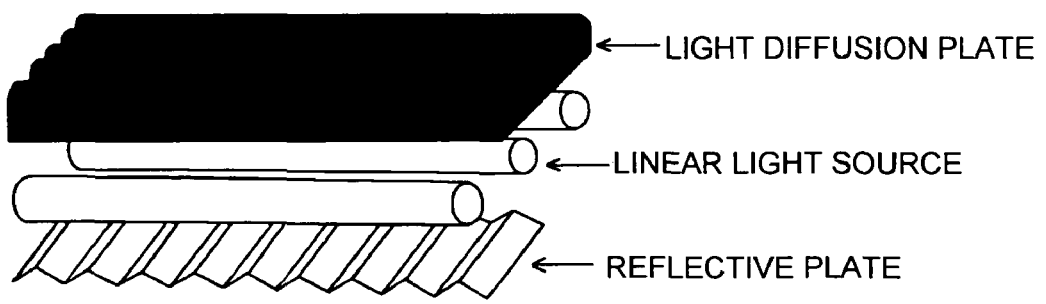
FIG. 39 is a configuration example of a lighting device according to a seventh embodiment of the present invention.

Instead of the projections accompanied to the backlight unit mounted to the liquid crystal display (manufactured by Sony Corporation, Product name KDL-L32HVX), projections having a horizontal cross-sectional shape of circular shape diameter 3 mm as shown in FIG. 38B manufactured by cutting with a lathe using an acrylic resin (manufactured by Kuraray Co., Ltd. Product name "Paraglas" transparent plate 6 mmt) are attached and fixed using double-sided tape to the lighting device. The mounted position was middle position of the linear light sources as shown in FIG. 36.

When combined with the light control member (B-1), a shadow caused from the projections is clearly recognized in the position where the projection and the light control member are in contact. That is, it can be seen that the apical diameter of the projection exceeding 1 mmσ has a bad influence to the image quality.

TABLE 7

| Item | Example 52 | Example 53 | Comparative Example 17 | Comparative Example 18 | Comparative Example 19 |
|---|---|---|---|---|---|
| Front Luminance (c d/cm$^2$) | 7830 | 7430 | 7830 | 6930 | 7830 |
| Luminance Surface Uniformity | Good | Good | Good | Good | Good |
| Projection Shadow | None | None | Recognized | None | Recognized |
| Light Control Plate | B-1 | B-2 | B-1 | B-3 | B-1 |
| Light Diffusive Particulate Content (parts per mass) | None | 0.15 | None | 1.0 | None |
| Projection Apical Part Diameter (mm) | 1 | 1 | 1 | 1 | 3 |
| Projection Optical Transparency | Transparent | Transparent | Opaque | Opaque | Transparent |

Example Concerning the Seventh Embodiment of the Present Invention

A light diffusion plate with convex portions to one side and a principal surface size thereof is 707 mm×436 mm and 2 mm thickness is obtained by using a metallic mold provided with groove form parallel concave portions and molding a methyl methacrylate-styrene copolymer by an extrusion. The shape of the convex portion is half-cylinder shape with the width 0.3 mm and depth 0.2 mm.

As for the reflective plate, a methyl methacrylate-styrene copolymer is molded by an injection using a metallic mold provided with the groove form parallel concave portion and a resin plate with convex portions to one side and a principal surface size of 695 mm×412 mm and 2 mm thickness is obtained. The shape of the convex portion is prism shape with the width 1 mm and an apex angle of 40 degrees. An adhesive agent is thinly coated over this prism and resin PET foam with 0.5 mm thickness is placed and applied with pressure to be bonded so as to be the reflective plate. The reflection factor of the reflective plate is 95%.

In the length 458 mm in the X direction, the length 730 mm in the Y direction and the length 35 mm in the thickness direction vertical to the X direction and the Y direction, a housing made of a rectangular parallelepiped white ABS resin having a rectangle opening portion to the emission side is prepared, where the opening has the length of 698 mm in the X direction and the length of 416 mm in the Y direction.

Next, the reflective plate is placed to cover the bottom part which is in the position opposite to the opening portion by the emission side of the housing.

Next, with an interval of 2 mm, the linear light sources are placed in parallel to the reflective plate to the emission side of the reflective plate. As the linear light sources 1, a plurality of cold cathode tubes having diameter of 3 mm and length 700 mm are placed along the X direction and in parallel to the Y direction. 16 cold cathode tubes are placed with intervals of 22 mm.

Next, the light control member is placed to cover the opening portion. The distance from the center of the linear light sources to the light control member is 15.5 mm and the distance between the centers of adjacent linear light sources is 25 mm.

As front luminance, the luminance of ±15 degrees or less to the front direction was measured. The procedure of measurement is shown below. Firstly, a luminance meter is installed to the position of 500 mm from the measuring point of the lighting device. Next, in the surface which is parallel to the x axis, the distance from the measuring point to the luminance meter is kept to be 500 mm, position and gradient of the luminance meter are changed while keeping the measuring point of the luminance meter from moving so as to measure luminance at each angle. The angle is from −15 to 15 degrees to the normal direction of the diffusion plate and the interval of the angle is 1 degree. Moreover, the field of view of the luminance meter was 1 degree. Next, an average of the luminance measurement value is calculated at each of the angles to be luminance of ±15 degrees. When measuring the front luminance of the example by this method, it is 8250 cd/m².

Moreover, by overlapping a liquid crystal display device over the light diffusion plate, a liquid crystal display device which is an image display device can be obtained. In this image display device, an image with high luminance and high quality can be confirmed.

As a comparative example, a lighting device is prepared under the same conditions except that the reflective plate is made by molding a methyl methacrylate-styrene copolymer by an injection, thinly coating an adhesive agent to one of principal surface of a resin plate, where the principal surface size with smooth principal surface is 695 mm×412 mm and 2 mm thickness, placing a resin PET foam of 0.5 mm thickness and applying with pressure to be bonded. When measuring front luminance likewise, it was 7420 cd/m². Moreover, by overlapping a liquid crystal display device over the light diffusion plate, a liquid crystal display device which is an image display device can be obtained. When checking the image, the image is dark as compared to the example.

INDUSTRIAL APPLICABILITY

The lighting device according to the present invention is useful for forming a display device such as a liquid crystal display.

The invention claimed is:
1. A lighting device comprising:
a rectangular emission surface formed of a X direction and a Y direction, the Y direction being vertical to the X direction; and
a reflective plate, a plurality of linear light sources and a plate shape light control member,
wherein the reflective plate is placed in parallel to the X direction and the Y direction,
the linear light sources are placed in one virtual flat surface, the virtual flat surface being in parallel to the X direction and the Y direction by the emission surface side of the reflective plate,
the linear light sources in a longitudinal direction are parallel to the Y direction and also arranged at a regular interval along the X direction,
the light control member is placed by the emission surface side of the arranged linear light sources and a principal surface is parallel to the virtual flat surface where the linear light sources are arranged,
the principal surface of the light control member is formed of an incident surface opposite to the linear light sources for receiving light from the linear light sources and an emission surface for outputting light received to the incident surface,
the emission surface has a plurality of ridge form convex portions to a surface thereof,
a ridge form ridgeline of a top part of the convex portions is formed in parallel to the Y direction and also arranged along the X direction,
with a distance between centers of the linear light sources being D, a distance between a center of any of the linear light sources and the light control member being H and a function representing an outgoing light intensity of light entered from one linear light source to the light control member to a normal direction of the emission surface at a position coordinate X (light source position shall be X=0) in the X direction being f(X), with $g(X)=f(X-D)+f(X)+f(X+D)$  (1), in a range of $-D/2 \leq X \leq D/2$, a ratio $g(X)_{min}/g(X)_{max}$ between $g(X)_{min}$ and $g(X)_{max}$ is 0.6 or more, $g(X)_{min}$ being the minimum value of $g(X)$ and $g(X)_{max}$ being the maximum value of $g(X)$, $X_{min}$, a minimum value of X, is in a range of $-3.0D \leq X_{min} \leq -0.5D$, $X_{max}$, a maximum value of X, is in a range of $0.5 \leq X_{max} \leq 3.0D$ (where $X_{min}$ and $X_{max}$ are coordinates of both ends when a value of f(X) declines centering near one linear light source in which the value of f(X) is X=0 and becomes practically 0), and a cross-sectional shape of a given convex portion in the X direction is formed of areas −N to N with (2N+1) number of different gradients represented by following formulas:

$\delta=(X_{max}-X_{min})/(2N+1)$  (2)

$Xi=i\times\delta$  (3)

$\alpha i=\text{Tan}^{-1}(Xi/H)$  (4)

$\beta i=\text{Sin}^{-1}((1/n)\sin \alpha_i)$  (5)

$\gamma i=\text{Sin}^{-1}((1/n_2)\sin \alpha_i)$  (6)

$a_i \propto f(Xi+T\cdot\tan \gamma_i)\cdot\cos \Phi_i\cdot\cos \beta_i/\cos \alpha_i/\cos(\Phi_i-\beta_i)$  (7)

$\Phi_i=\text{Tan}^{-1}((n\cdot\sin \beta_i)/(n\cdot\cos \beta i^{-1}))$  (8)

where
N: Natural number
i: Integer from −N to N
n: Refractive index of a convex portion of the light control member
$n_2$: Refractive index of a base material of the light control member
$a_i$: Width of an area i in the X direction
$\Phi_i$: A gradient of a slope to an emission surface of the area i
T: Thickness from the incident surface to a bottom part of a convex portion of the light control member.
2. The lighting device according to claim 1, wherein the areas −N to N indicating cross-sectional shapes of the convex portions in the X direction are aligned in order of position coordinate of a X axis.

3. The lighting device according to claim 1, wherein the cross-sectional shape of the convex portion in the X direction is a shape made by approximating shapes of at least one pair of adjacent two areas among the areas with (2N+1) number of different gradients forming the convex portion to a curve.

4. The lighting device according to claim 1, wherein in a cross-section parallel to the X direction and a normal direction of the principal surface of a light control member, a ratio of light output in a range of 30 degrees from a normal direction of the emission surface is 50% or more of all outgoing light.

5. The lighting device according to claim 1, wherein the convex portions are formed of a material with a refractive index of 1.58 or more.

6. The lighting device according to claim 1, further comprising:
   a light beam direction conversion unit provided to the light control member for converting a light beam direction,
   wherein the light beam direction conversion unit converts a direction of 80% to 10% of light entered to an incident surface from a normal direction, and
   80% or more of light entered to the incident surface from the linear light sources passes the light beam direction conversion unit and reaches to a convex portion formed to the emission surface.

7. The lighting device according to claim 1, wherein the incident surface further comprises a reflective member formed to the incident surface, and
   5 to 20% of light from the linear light sources is reflected to the light source side.

8. The lighting device according to claim 1, wherein the light beam control member includes other convex portions different from the convex portions, the other convex portions functioning as a first beam direction control means,
   the convex portions function as a second light beam direction control means to the other convex portions,
   the reflective plate is placed in parallel to the X direction and the Y direction to a side opposite to an light emitting surface for the linear light sources,
   the first light beam direction control means is placed by the emission surface side than the virtual flat surface having the linear light sources placed thereto so that light from the light sources is received to both of the first light beam direction control means and the second light beam direction control means,
   the first light beam direction control means refracts received light, collects light dispersed in a Y axis direction and lets it pass to the emission surface side, and
   the second light beam control means reflects and refracts received light to increase positional uniformity in a X axis direction of light and lets it pass to the emission surface side.

9. The lighting device according to claim 1, further comprising a projection in contact with the light control member for holding the light control member,
   wherein the projection is formed of a light transmissive material, a horizontal cross-section of the projection is circular shape and a diameter of a projection apical part in contact with the light control member is 1 mm or less.

10. The lighting device according to claim 1, wherein the reflective plate, the linear light sources and the light control member are placed toward the front direction in order of the reflective plate, the linear light sources and the light control member,
   wherein a periphery of principal surfaces of the reflective plate and the light control member are rectangles parallel to the XY flat surface, and
   almost an entire surface of an outgoing light side surface of the principal surface of the reflective plate is regular concave and/or convex form stripe shape, the stripe shape being parallel to the X axis and along the Y axis.

11. A light control member included in the lighting device according to claim 1.

12. An image display device comprising a transmissive display device provided to an emission surface side of the lighting device according to claim 1.

* * * * *